(12) United States Patent
Ichikawa et al.

(10) Patent No.: US 6,401,228 B1
(45) Date of Patent: Jun. 4, 2002

(54) DATA DECODING APPARATUS AND METHOD AND DATA REPRODUCTION APPARATUS

(75) Inventors: Takahiro Ichikawa, Saitama; Shigeharu Sato, Chiba; Kazuhiro Yasuda; Satoru Kimura, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/295,282

(22) Filed: Apr. 20, 1999

Related U.S. Application Data

(63) Continuation of application No. 08/798,172, filed on Feb. 10, 1997, now Pat. No. 5,917,836.

(30) Foreign Application Priority Data

Feb. 19, 1996 (JP) ............................................. 8-055471

(51) Int. Cl.[7] .............................................. G11B 20/18
(52) U.S. Cl. ....................................... 714/755; 714/756
(58) Field of Search ................................. 714/755, 756

(56) References Cited

U.S. PATENT DOCUMENTS

| | | | |
|---|---|---|---|
| 4,730,321 A | * 3/1988 | Machado | ...................... 371/38 |
| 5,329,537 A | * 7/1994 | Alard et al. | ................... 371/43 |
| 5,422,895 A | * 6/1995 | Nguyen et al. | ............. 371/37.5 |
| 5,499,224 A | * 3/1996 | Sanada | .......................... 369/48 |
| 5,506,823 A | * 4/1996 | Sanada | .......................... 369/48 |
| 5,699,369 A | * 12/1997 | Guha | ........................... 371/41 |
| 5,734,787 A | * 3/1998 | Yonemitsu et al. | ......... 386/111 |
| 5,917,836 A | * 6/1999 | Ichikawa et al. | .......... 371/37.4 |

* cited by examiner

Primary Examiner—Paul P. Gordon
(74) Attorney, Agent, or Firm—Frommer Lawrence & Haug LLP; William S. Frommer; Dennis M. Smid

(57) ABSTRACT

A data decoding apparatus and the method and a data reproduction apparatus which reduces capacity of a memory used for decoding and speedily accesses to data to be read. In a data decoding apparatus (50) and the method which decodes coded data (S2) which is recorded in a recording medium (2), the coded data (S2) read from the recording medium (2) is stored in a memory used for decoding (51), data information of data to be read is detected from decoded data which is generated in the middle of decoding the coded data (S2), the data information is stored in a data information storage means and the output of decoded data (S10) is controlled on the based on the data information, thereby the output of the decoded data (S10) is controlled based on the data information independent of decoding of the coded data (S2).

4 Claims, 43 Drawing Sheets

```
MEMORY
FRAME    DATA ARRAY ON MEMORY 0        00 01 02 03 ···        ··· A8 A9    (ECC DECODER 29)
1                                             C12 write(00,01,02,03~A9)
                                              OUT read (00,01,02,03~A9)
```

| MEMORY FRAME | LIST OF DATA ON MEMORY | |
|---|---|---|
| 0 | | 01'03'05'··· A9'-> EFM write(00',01'~A8',A9') |
| 1 | 00'02'04'··· A8'01 03 05 ··· A9 -> | C1 read (00',02'~01,03~A9) |
| 2 | 00 02 04 ··· A8 | |
| 3 | | |

FIG. 3 (RELATED ART)

| MEMORY FRAME | LIST OF DATA ON MEMORY | |
|---|---|---|
| 0 | 00' | |
| 1 | 01' | |
| 2 | 02' | |
| 3 | 03' | |
| ⋮ | | |
| 168 | A8' | (ECC DECODER 25) C1 write |
| 169 | 00 01 02 03 ··· A8 A9' | |
| 170 | | C2 read (00',01',02',03',~A9') |

FIG. 4 (RELATED ART)

| MEMORY FRAME | LIST OF DATA ON MEMORY | |
|---|---|---|
| 0 | 00'01 02 03 ··· A8 A9 | C12 read(00',01,02,03,~A9) |
| 1 | 01' | |
| 2 | 02' | |
| 3 | 03' | |
| ⋮ | | |
| 168 | A8' | (ECC DECODER 27) |
| 169 | A8 A9' | C2 write(00'~A9') |
| 170 | | |

FIG. 5 (RELATED ART)

```
FRAME      DATA ADDRESS              :→ INFORMATION
  0        00 01 02 03 04 ···        A9 AA AB AC AD AE AF
  1        B0 B1 B2 B3 B4 ···
  2
  3
  ⋮              ⋮                         ⋮
  N              ···                  ···M···
  ⋮              ⋮                         ⋮
 184
 185
```
FIG. 10
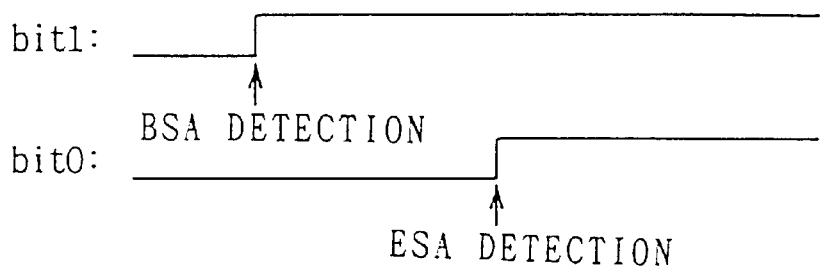
FIG. 19A
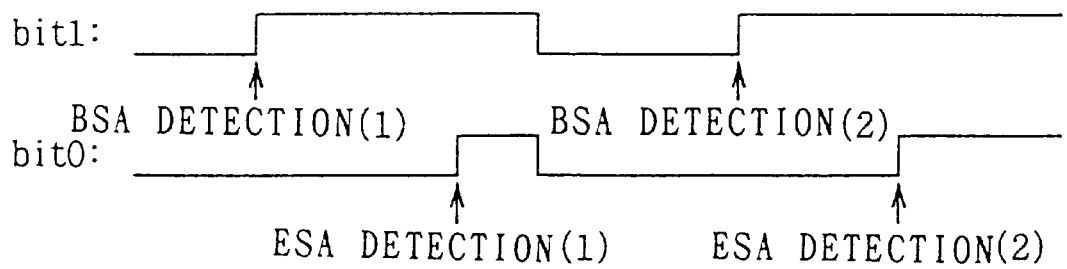
FIG. 19B

| MEMORY FRAME | LIST OF DATA ON MEMORY | |
|---|---|---|
| 1 | 00 01 02 03 04 ⋯ | A9 -->"OUT" |
| 2 | 00 01 02 03 04 ⋯ | A9 -->"C12 read" |
| 3 | 00 01 02 03 04 ⋯ | A9 |
| 4 | 00' | |
| 5 | 01' | |
| 6 | 02' | |
| 7 | 03' | |
| ⋮ | | |
| 172 | A8' | |
| 173 | | A9' --> "C2 read"(00',01'⋯A8',A9') |
| 174 | 00 01 02 03 04 ⋯ | A9 --> "C11 read" |
| ⋮ | | |
| 182 | 00 01 02 03 04 ⋯ | A9 --> "EFM write" |
| ⋮ | | |
| 186 | | | xxxREQ = 1 INDICATES THAT THERE IS A REQUEST FOR xxx JOB.
xxxACK = 1 INDICATES THAT A REQUEST FOR xxx JOB HAS BEEN ACCEPTED.

| | |
|---|---|
| EFM+ | |
| WRITE OF SECTOR SYNC PATTERN<br>WRITE OF EFM+ DEMODULATED OUTPUT | 1<br>170 |
| C11 (FIRST C1) | |
| (C11R)<br>READ OF C11<br>(C11W)<br>ERROR CORRECTION OF C11<br>WRITE OF C11 CORRECTION RESULTS<br>(SUB)<br>READ OF SECTOR SYNC PATTERN<br>READ OF HEADER DATA<br>WRITE OF SECTOR INFORMATION | 170<br><br>8+8<br>1<br><br>1<br>20<br>1+(14) |
| C2 | |
| (C2R)<br>READ OF C2<br>(C2W)<br>ERROR CORRECTION OF C2<br>WRITE OF C2 CORRECTION RESULTS | 170<br><br>14+14<br>1 |
| C12 (SECOND C1) | |
| (C12R)<br>READ OF C12<br>(C12W)<br>ERROR CORRECTION OF C12<br>WRITE OF C12 CORRECTION RESULTS | 170<br><br>8+8<br>1 |
| OUT | |
| READ OF SECTOR INFORMATION<br>READ OF C11 CORRECTION RESULTS<br>READ OF C2 CORRECTION RESULTS<br>READ OF C12 CORRECTION RESULT<br>OUT | 1<br>1<br>1<br>1<br>170 |
| TOTAL | 948 |

FIG. 14

| | |
|---|---|
| BIT 7 | SECTOR SYNC PATTERN (1: EXISTED) |
| BIT 6 | SYNC CODE (1: EXISTED) |
| BIT 5 | SECTOR SYNC (1: ACKNOWLEDGED) |
| BIT 4 | CRC RESULT (0: OK) |
| BIT 3 | C1 RESULT (0: OK) |
| BIT 2 | SECTOR ADDRESS SEQUENCE (1: OK) |
| BIT 1 | START SECTOR DETECTION (1: DETECTED) |
| BIT 0 | END SECTOR DETECTION (1: DETECTED) |

FIG. 35A SCSY 
FIG. 35B main-FMSY 
FIG. 35C SUB 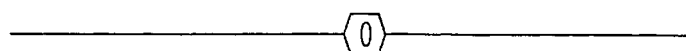
FIG. 35D MWEN 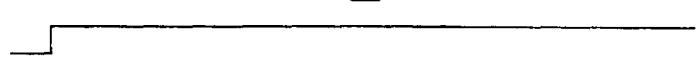
FIG. 35E EFM+W Frame 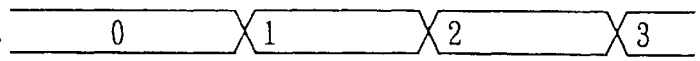
FIG. 35F PI1 Frame 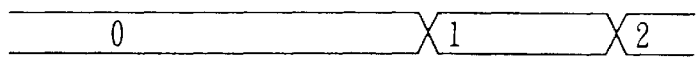

| bit7 | INTERPOLATION FLAG GENERATION MODE SETTING |
|---|---|
| bit6 | ECC BLOCK (1: LEADING SECTOR) |
| bit5 | START SECTOR DETECTION (1: DETECTED) |
| bit4 | END SECTOR DETECTION (1: DETECTED) |
| bit3 | DESCRAMBLE INITIALIZATION ADDRESS (BIT 3) |
| bit2 | DESCRAMBLE INITIALIZATION ADDRESS (BIT 2) |
| bit1 | DESCRAMBLE INITIALIZATION ADDRESS (BIT 1) |
| bit0 | DESCRAMBLE INITIALIZATION ADDRESS (BIT 0) |

FIG. 42

FIG. 39A SCSY
FIG. 39B main-FMSY
FIG. 39C SUB
FIG. 39D SI[BIT 6]
FIG. 39E block-top
FIG. 39F MWEN
FIG. 39G EFM+W Frame
FIG. 39H PI1 Frame
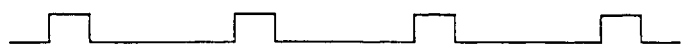
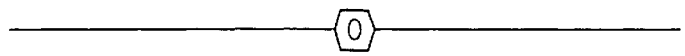
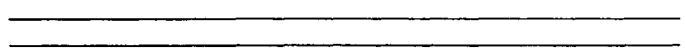
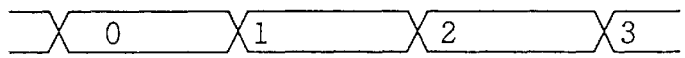
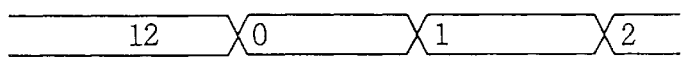
FIG. 40A SCSY
FIG. 40B main-FMSY
FIG. 40C SUB
FIG. 40D SI[BIT 6]
FIG. 40E block-top
FIG. 40F MWEN
FIG. 40G EFM+W Frame
FIG. 40H PI1 Frame
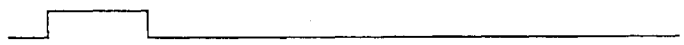
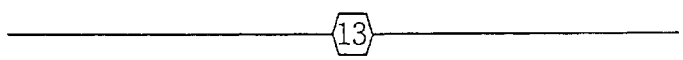
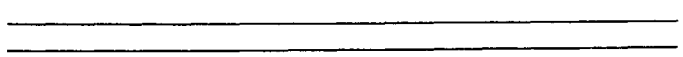
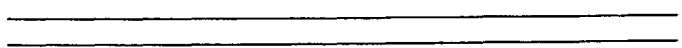
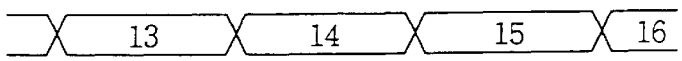
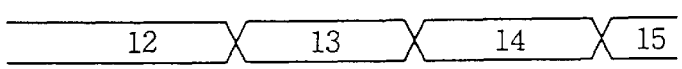

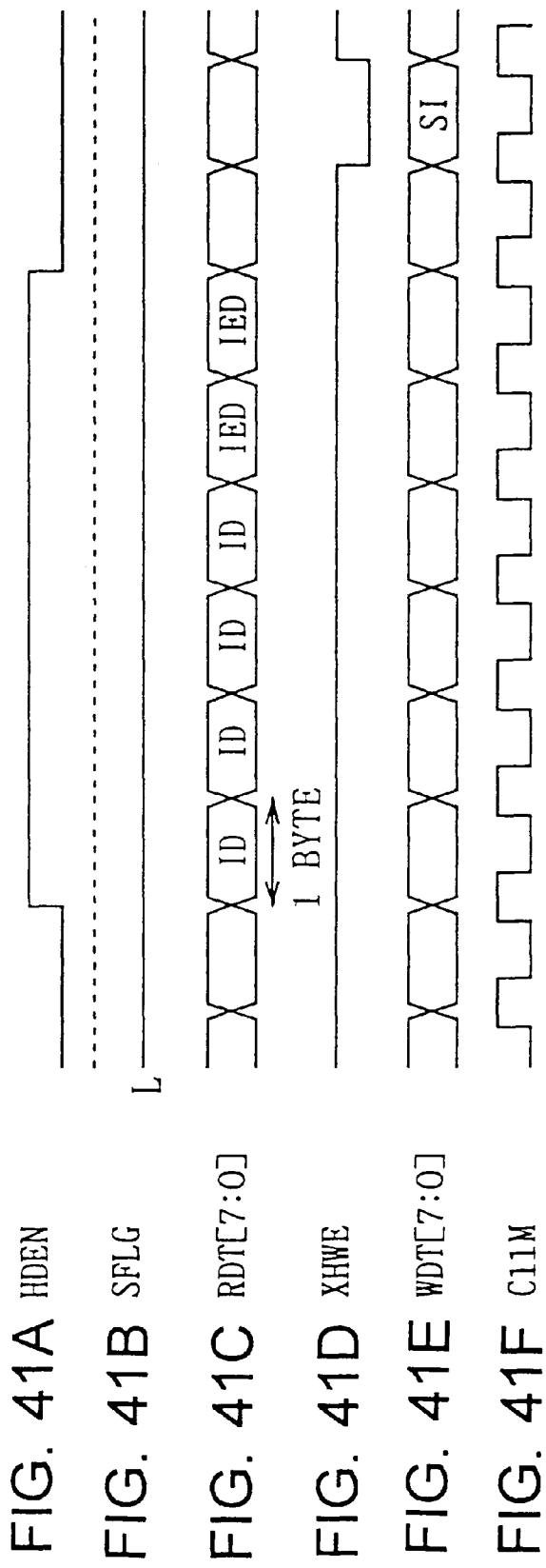

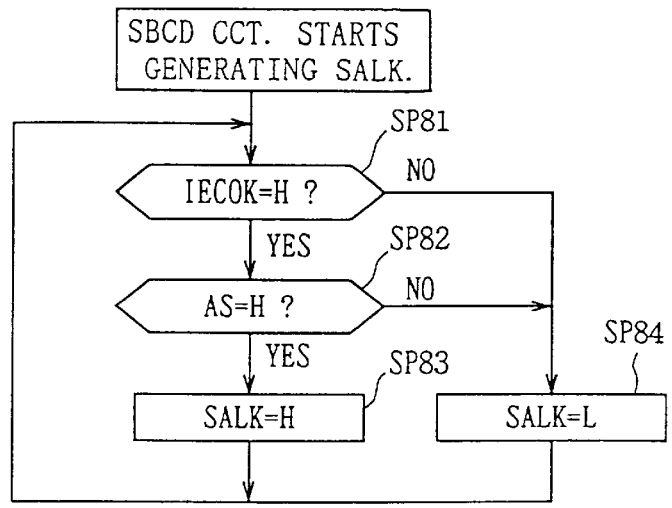
FIG. 46
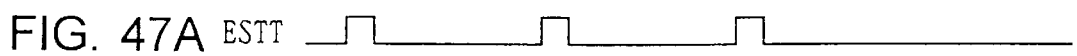
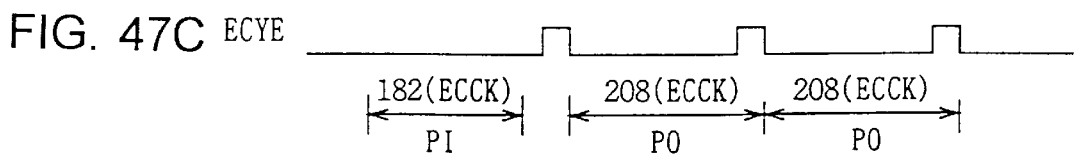
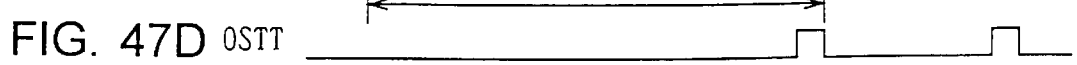

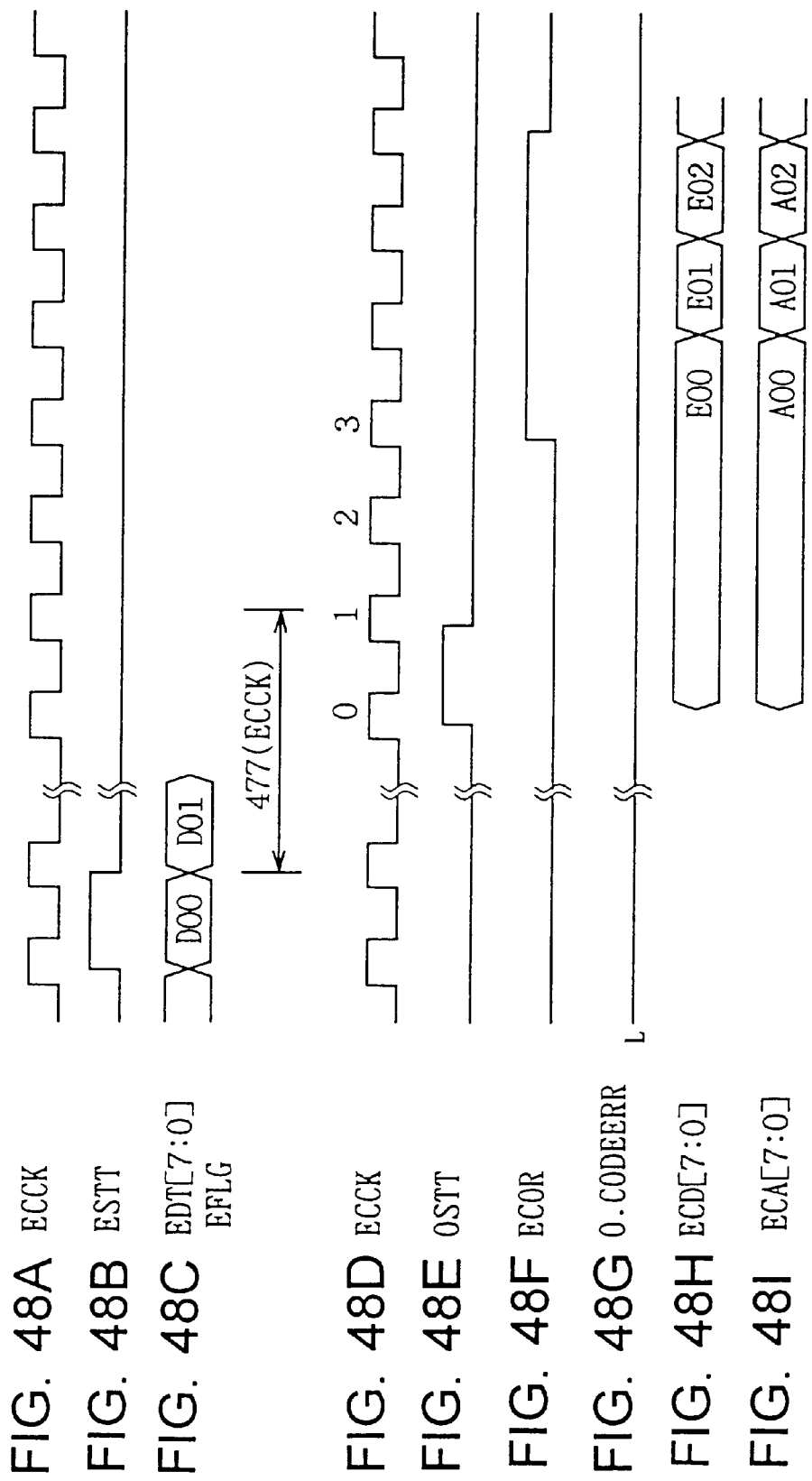

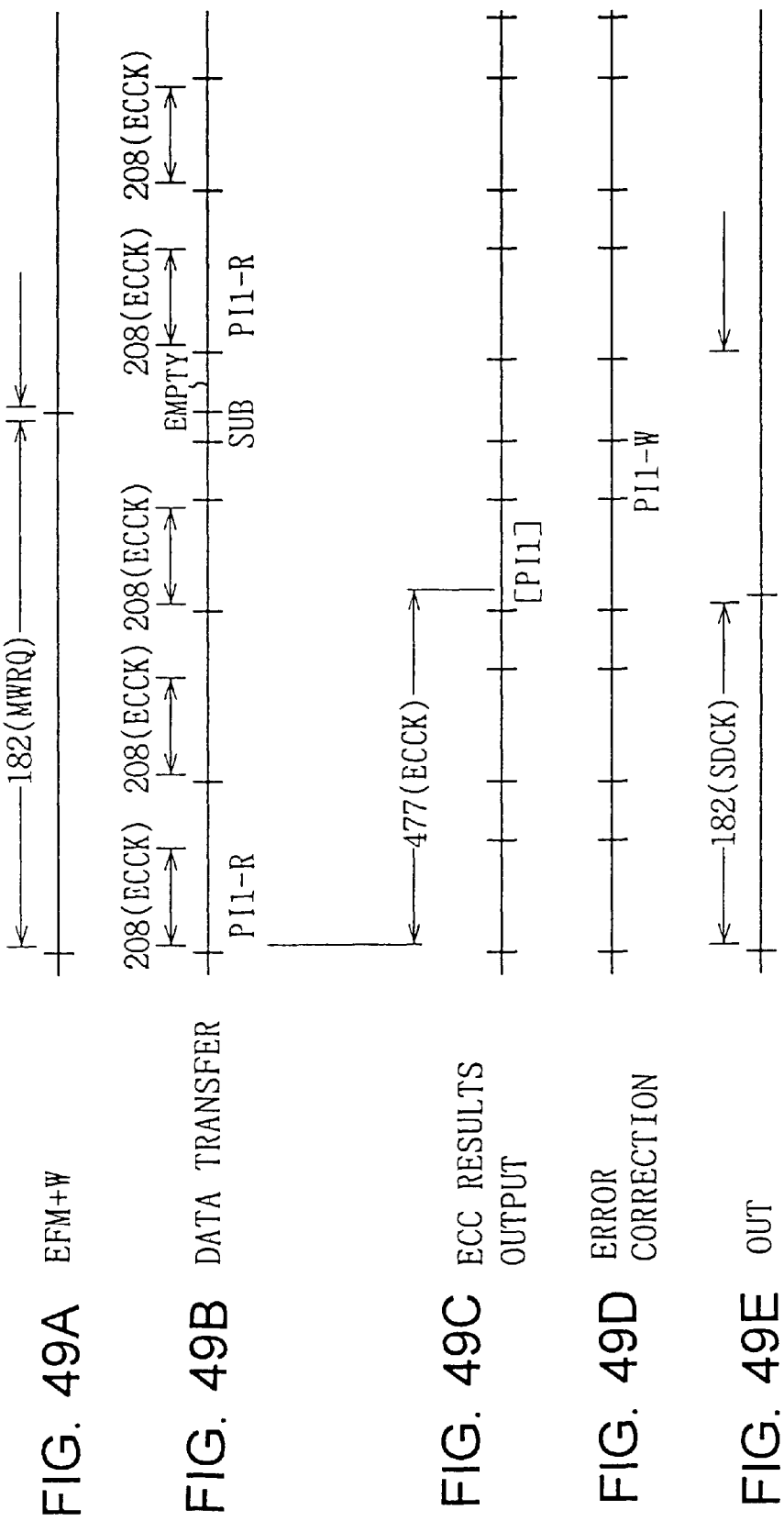

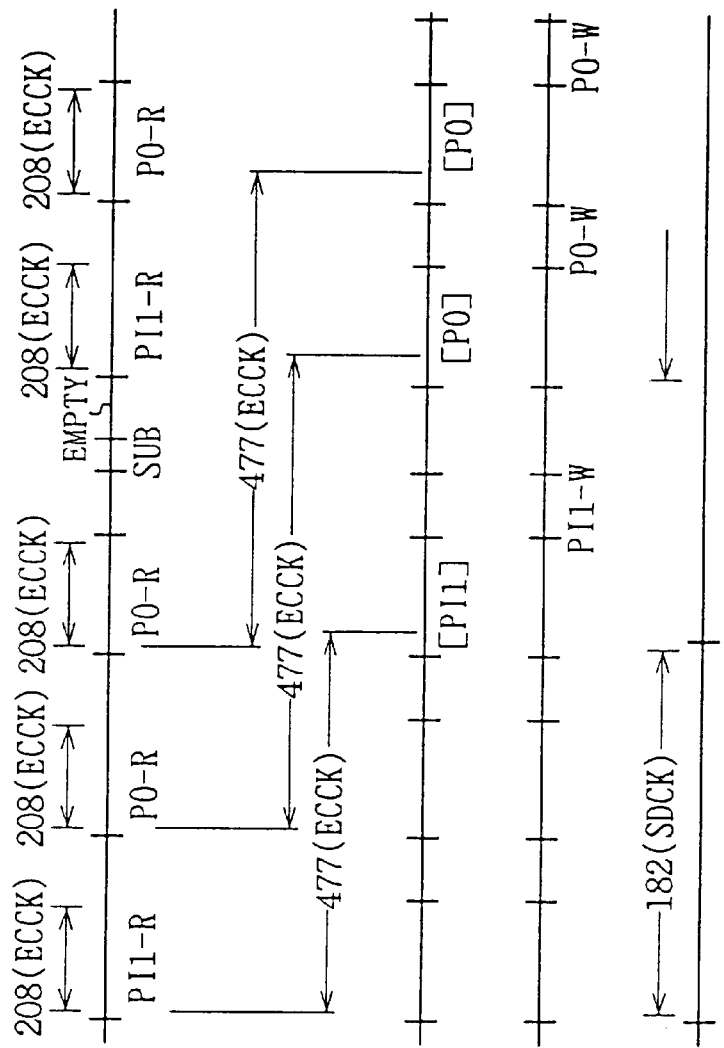

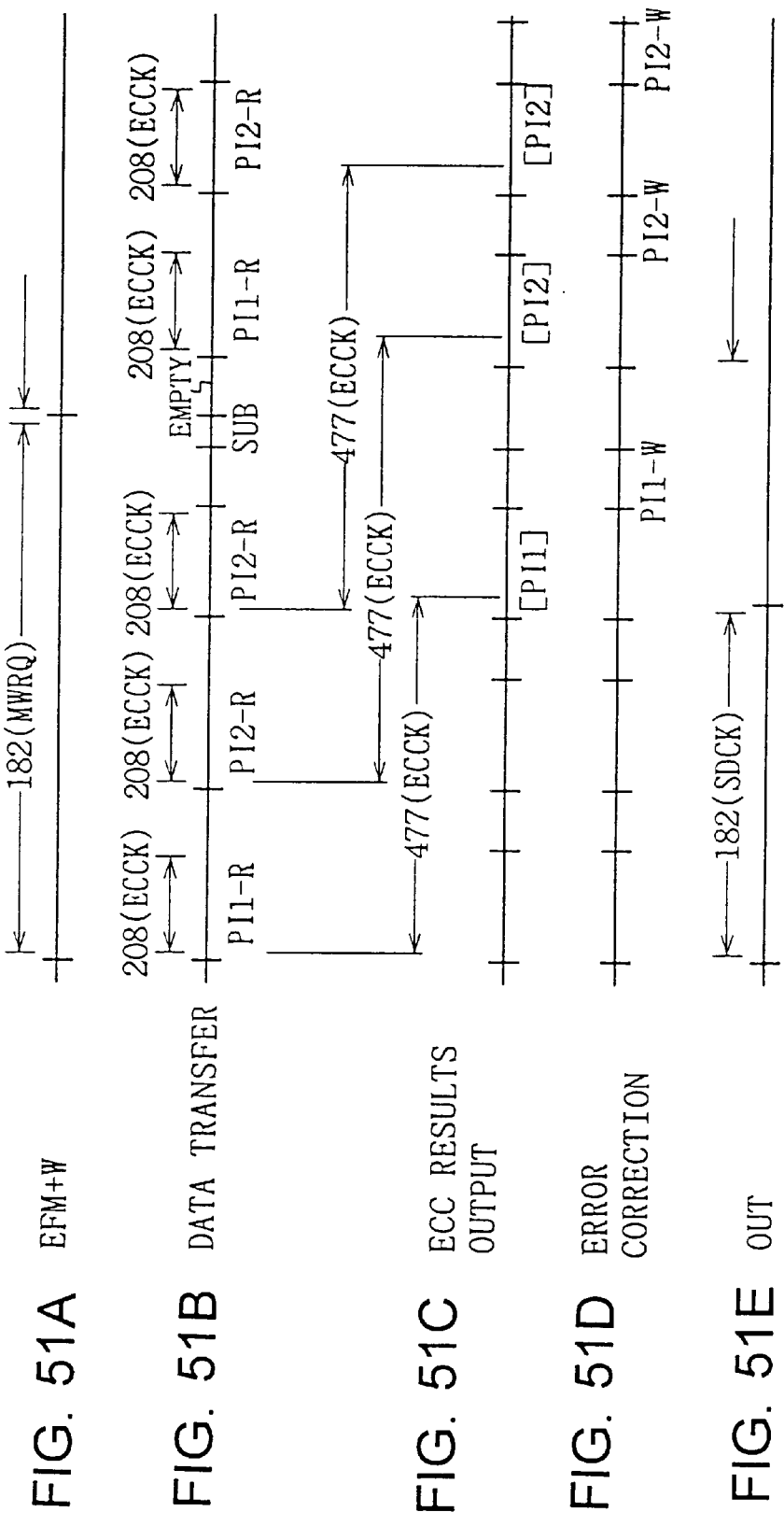

| | |
|---|---|
| bit7 | UNCORRECTABLE (1:UNCORRECTABLE) |
| bit6 | PO (0:PI/1:PO) |
| bit5 | PI2 (0:PI1/1:PI2) |
| bit4 | NUMBER OF CORRECTIONS (POSITION OF $2^4$) |
| bit3 | NUMBER OF CORRECTIONS (POSITION OF $2^3$) |
| bit2 | NUMBER OF CORRECTIONS (POSITION OF $2^2$) |
| bit1 | NUMBER OF CORRECTIONS (POSITION OF $2^1$) |
| bit0 | NUMBER OF CORRECTIONS (POSITION OF $2^0$) |

FIG. 54

| | |
|---|---|
| (EFM write)<br>WRITE OF EFM+-DEMODULATED DATA | 182 × 208 = 37856 |
| (PI1 SEQUENCE)<br>READ OF PI SEQUENCE<br>ERROR CORRECTION OF PI SEQUENCE<br>WRITE OF PI SEQUENCE<br>    CORRECTION RESULTS | 208 × 208 = 43264<br>(10+10) × 208 = 4160<br>1 × 208 = 208 |
| (PO SEQUENCE)<br>READ OF PO SEQUENCE<br>ERROR CORRECTION OF PO SEQUENCE<br>WRITE OF PO SEQUENCE<br>    CORRECTION RESULTS | 208 × 172 = 35776<br>(16+16) × 172 = 5504<br>1 × 172 = 172 |
| (PI2 SEQUENCE)<br>READ OF PI SEQUENCE<br>ERROR CORRECTION OF PI SEQUENCE<br>WRITE OF PI SEQUENCE<br>    CORRECTION RESULTS | 208 × 208 = 43264<br>(10+10) × 208 = 4160<br>1 × 208 = 208 |
| (ID SEQUENCE)<br>READ OF ID SEQUENCE<br>WRITE OF SECTOR INFORMATION | 6 × 208 = 1248<br>1 × 208 = 208 |
| (ID + USER DATA OUT)<br>READ OF SECTOR INFORMATION<br>READ OF CORRECTION RESULTS<br>    INFORMATION<br>READ OF PI SEQUENCE | 1 × 208 = 208<br>3 × 208 = 624<br><br>182 × 208 = 37856 |
| TOTAL FOR 1 ECC BLOCK | 1074     214716 |
| AVERAGE PER MAIN FRAME | 215132/208 = 1033 |

FIG. 56

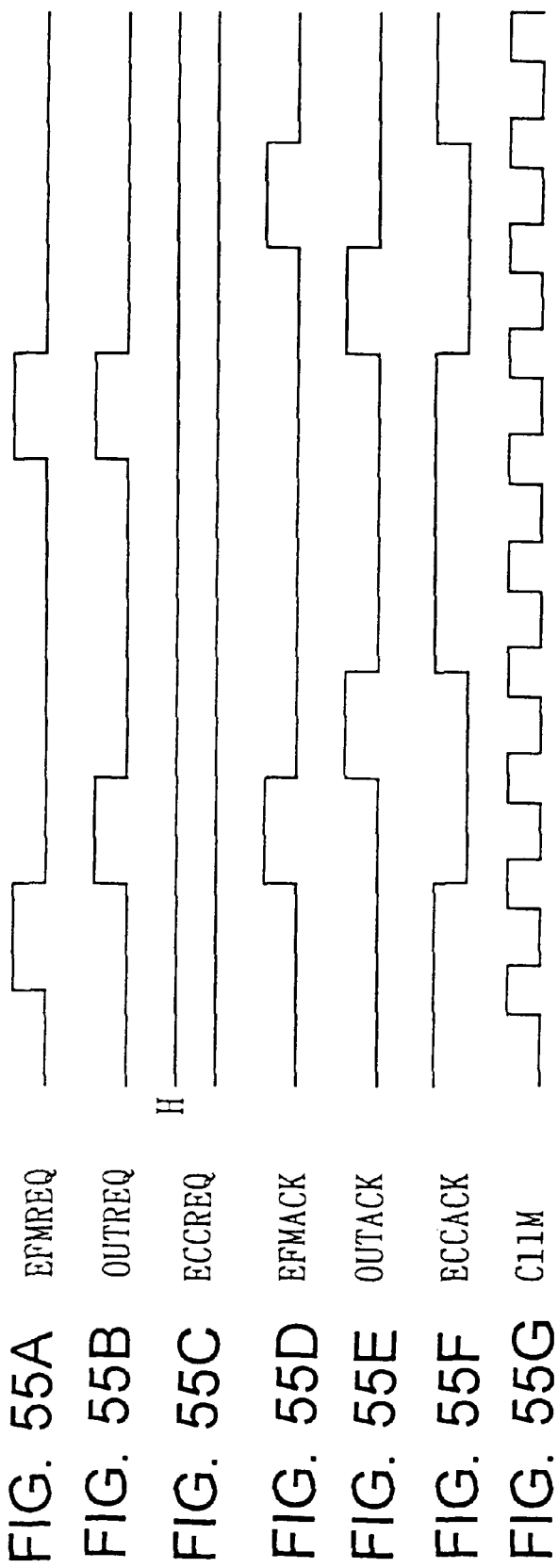

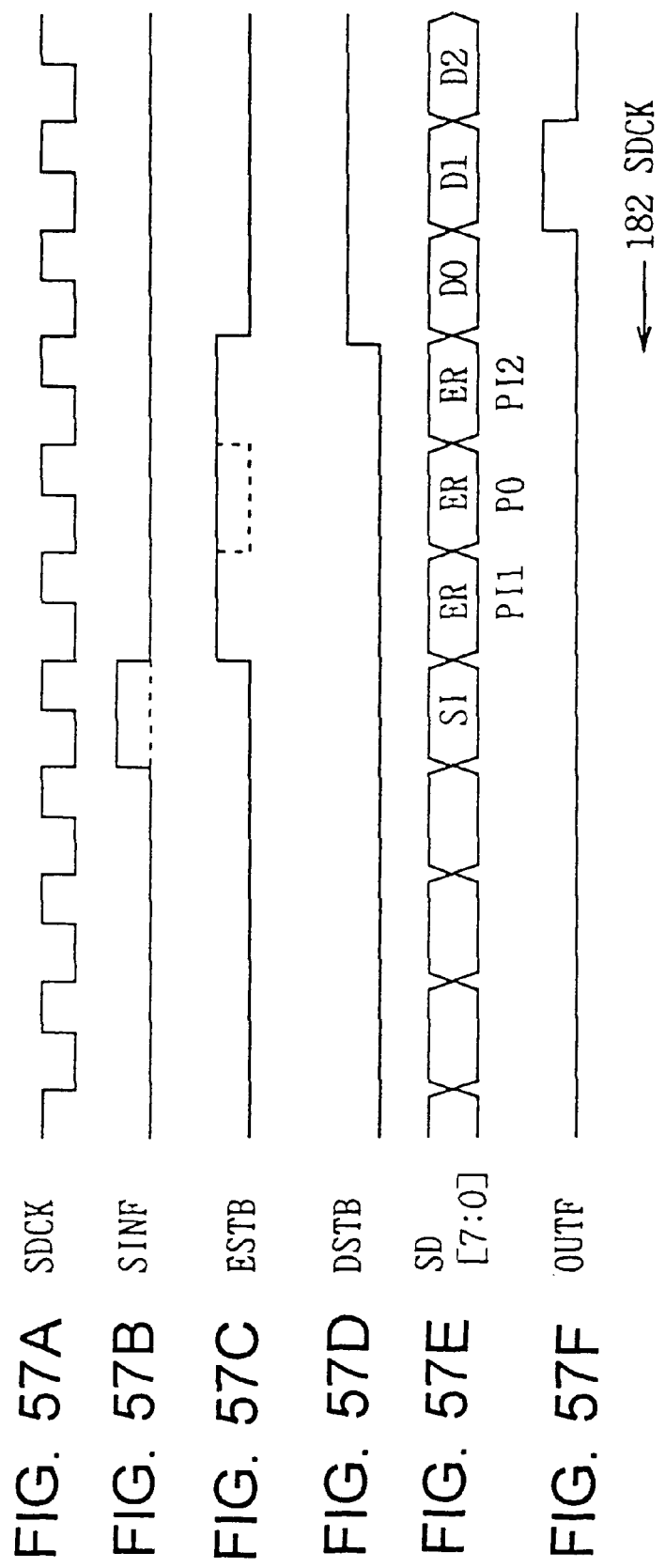

DATA DECODING APPARATUS AND METHOD AND DATA REPRODUCTION APPARATUS

This application is a continuation of Ser. No. 08/798,172 filed Feb. 10, 1997 now U.S. Pat. No. 5,917,836 issued Jun. 29, 1999.

BACKGROUND OF THE INVENTION

1. Field of the Invention

This invention relates to a data decoding apparatus and method and data reproduction apparatus, and more particularly, is applicable to such apparatus that reproduces moving pictures digitalized and recorded in a disc.

2. Description of the Related Art

There have been discs on which moving pictures are digitalized and recorded at a variable rate according to, for example, the moving pictures expert group (MPEG) standard.

The MPEG specifies three types of pictures for picture data: I pictures (Intra-Pictures) that are intra-frame coded pictures, P pictures (Predictive-Pictures) that are inter-frame forward predictive coded pictures, and B pictures (Bidirectionally predictive-Pictures) that are bidirectionally predictive coded pictures. These three types of pictures form a group of pictures (GOP).

Although the MPEG standard is also applied to voice data, for example, the additive transform acoustic coding (ATAC) is also used to digitalize and compressing-code voice data. ATRAC is a trademark.

FIG. 1 shows a data decoding apparatus 1 for reproducing data recorded on a disc at a variable rate. The data decoding apparatus 1 uses a pickup 3 to irradiate an optical disc 2 with laser beams to reproduce data recorded thereon from reflected beams. A reproduced signal S1 output from the pickup 3 is input to and demodulated in a demodulating circuit 6 in a decoding circuit system 5 controlled by a system controller 4. The data, demodulated by the demodulating circuit 6, is input to an error correction code (ECC) circuit 8 via a sector detection circuit 7, in which error detection's and corrections are carried out.

If the sector detection circuit 7 has not properly detected the sector numbers or addresses assigned to the sectors of the optical disc 2, a sector number error signal is output to a track jump determination circuit 9. If uncorrectable data has been found, the ECC circuit 8 outputs an error signal to the track jump determination circuit 9. Error-corrected data is sent out from the ECC circuit 8 to a ring buffer memory 10 and recorded thereon.

A ring buffer control circuit 11 then reads the address of each sector from the output from the sector detection circuit 7, and specifies the write address (hereinafter, referred to as a write pointer WP) on the ring buffer memory 10 which corresponds to the first address.

The ring buffer control circuit 11, controlled by the system controller 4, specifies a read address (hereinafter, referred to as a read pointer RP) for the data that has been written to the ring buffer memory 10, based on a code request signal R10 from a multiplexed data separation circuit 13 located beyond the ring buffer control circuit, and reads data from the read pointer RP to supply it to the multiplexed data separation circuit 13.

A header separation circuit 14 in the multiplexed data separation circuit 13 separates a pack header and a packet header from the data supplied from the ring buffer memory 10, and supplies them to a separation circuit control circuit 15. The separation circuit control circuit 15 sequentially and cyclically switches and connects the input terminal G and output terminals (switched terminals) H1 and H2 of a switching circuit 16 according to the stream ID (identifier) information of the packet header supplied from the header separation circuit 11, and correctly separates the time-division-multiplexed data to supply it to a code buffer.

A video code buffer 17 then generates a code request R1 to the multiplexed data separation circuit 13 using the remaining amount of internal code buffer. The video code buffer 17 stores received data. It also receives a code request R1 from a video decoder 18 and outputs the data therein. The video decoder 18 reproduces a video signal from the data supplied and outputs it from its output OUT1.

An audio code buffer 19 generates a code request R2 to the multiplexed data separation circuit 13 using the remaining amount of internal code buffer. The audio code buffer 19 stores received data. It also receives a code request R2 from an audio decoder 20 and outputs the data therein. The audio decoder 20 reproduces an audio signal from the data supplied and outputs it from its output OUT2.

As described above, the video decoder 18 requests data from the video code buffer 17, the video code buffer 17 requests data from the multiplexed data separation circuit 13, and the multiplexed data separation circuit 13 requests data from the ring buffer control circuit 11.

In this case, the data flows from the ring buffer memory 10 in the direction opposite to that of the requests.

Data decoding carried out by the demodulating circuit system 5 is described. The reproduced signal S1 read from the disc 2 is converted into a binary signal by the demodulating circuit 6 using RF processing. Then a rough servo-mechanism acts on the reproduced signal S1 based on the measurement result of the mark length of the signal S1. When the sector detection circuit 7, as an interface to the system controller 4, detects an EFM+ sync header, a PLL (Phase Locked Loop) servomechanism acts on the sync header. When several sync headers are subsequently and continuously detected, data S2, which has been EFM+-demodulated, is deinterleaved.

As shown in FIG. 2, the EFM+-demodulated data S2 is sent out to the ECC circuit 8, stored in a RAM 24, and then ECC-decoded by ECC decoders 25, 27, and 29 for three sequences C11 (the first C1 sequence), C2, and C12 (the second C1 sequence) including C1/C2 convolutional Reed and Solomon codes (CIRC Plus).

The ECC circuit 8 carries out ECC-decoding by, for example, writing the EFM+-demodulated data S2 to the RAM 24 in the order of 00, 01, . . . , A8, and A9 (EFM+ Write) and once two frames of EFM+ demodulated data has been stored in the RAM 24, transferring the data in frame 1 to the ECC decoder 25 in the order of 00', 02', . . . , A8', 01, 03, . . . , A9 to ECC-decode the deinterleaved C1 sequence of data, as shown in FIG. 3.

Errors are corrected by reading the error positions and correction patterns from the ECC decoder 25, reading the erroneous data from the RAM 24 (C1 read), exclusively logically adding this data to the correction patterns, and writing the resultant data back to the RAM 26 (C1 Write), as shown in FIG. 4. The ECC decoder 25 ECC-decodes the C1 sequence of data over a C2 code sequence length.

Once the C1 sequence data has been ECC-decoded over a C2 code sequence length, the C2 sequence of data can then be ECC-decoded. The data on the RAM 26 is read on the order of 00', 01', 02', 03', . . . , A9 '(C2 read), and the ECC decoder 27 ECC-decodes this C2 sequence of data. An uncorrectable error flag for each frame can be transferred to the next ECC decoder in synchronism with the data so as to execute erasure corrections. The C1 uncorrectable error flag is used to apply an erasure correction to the C2 sequence of data. The error correction operation is as in C1.

As shown in FIG. 5, once the results of the ECC-decoding of the C2 sequence of data have been written to the RAM 28 (C2 Write) and the C2 sequence of data has been ECC-decoded over a C1 code sequence length, the C12 sequence of data can then be ECC-decoded, and the ECC-decoder 29 ECC-decodes the C12 sequence of data read in the order of 00', 01, 02, 03, . . . , A9 (C12 read).

The C2 uncorrectable error flag is used to apply an erasure correction to the C12 sequence of data. Once the error correction of the C12 data has been finished, the results of the ECC-decoding of the C12 sequence of data is written to a RAM 30 in the order of 00, 01, 02, 03, . . . , A9, as shown in FIG. 6. The decoded ECC C11, C2, and C12 sequence of data is thus stored in the RAM 30 and then read in the order of 00, 01, 02, 03, . . . , A9 (OUT read). The data is then descrambled and sent out to the ring buffer memory 10 to write required sector data thereto.

A desired sector, to which output data requested to be read belongs, is detected by picking up a sector address from the reproduction data stored in a different memory from the memory which is used for the ECC decoding. That is, a memory (RAM 24) used for deinterleaving data which is interleaved at a previous stage and memories (RAM 26, 28, and 30) used for ECC decoding are assigned so that the sector address is positioned at the head for each sector address, in order to detect the sector address. In this way, the sector address is detected from the reproduction data read out on the memory, and is used as position information at the time of access to the optical disc 2 by the system controller 4.

In actual, the ring buffer control circuit 11 compares and determines the detected sector address with the desired sector address set by the system controller 4. If the detected sector address coincides to the desired sector address, an ECC decoded data S10 which has been ECC decoded at the ECC circuit 8 is written in the ring buffer memory 10.

In this ECC decoding method, after a sector ahead of the sector by several sectors is detected at the disc access taking interleave of the ECC into account, the EFM+-demodulated reproduction data is written so that the start frame of the memory used for ECC decoding corresponds to the head of the sector, and the ECC decoding is carried out to write the decoded data in the ring buffer memory 10.

In the case where the interleaved coded data is decoded, the time lag for time required for the ECC decoding occurs between the sector address recognition for the disc access by the system controller 4 and the sector address which is output after data of the sector is ECC decoded. Therefore, there is a problem that since the sector is not ECC decoded at the time of recognizing the sector address during the disc access due to the time lag, it can not be determined whether or not the ECC decoded data S10 is certainly written in the ring buffer memory 10.

In addition, in the case where the interleaved coded data is decoded, there is a problem that since a memory for detecting a desired sector and a storage medium such as a memory used for the ECC decoding are necessary separately, the capacity of a memory becomes comparatively large.

Further, to recognize the sector, the deinterleaved data is first written in a RAM 24 being a memory used for decoding in an arbitrary sector unit. At this time, the reproduction data read out from an optical disc 2 is stored so that the head of the sector corresponds to the head of the memory, so that the capacity of the memory has to have N times capacity of the sector.

Further, at the stage of writing data in the ring buffer memory 10, since the head of the decoded data is not always the head of the sector, the desired sector has to be detected again from the ECC decoded data S10 stored in a memory (RAM 30) used the ECC decoding. Therefore, other circuit for recognizing data of the desired sector address has to be provided in addition to a circuit for recognizing the sector address at the time of the disc address. Thus there is a problem that the configuration of a circuit is complicated.

SUMMARY OF THE INVENTION

In view of the foregoing, an object of this invention is to provide a data decoding apparatus and method and a data reproduction apparatus which can reduce the capacity of the memory for ECC decoding and can speedily access to the desired sector.

The foregoing object and other objects of the invention have been achieved by the provision of a data decoding apparatus for decoding coded data which is recorded in a recording medium. The data decoding apparatus comprises: a memory used for decoding for storing coded data and decoded data which the coded data is decoded; a data information detecting circuit for detecting data information of data to be read from decoded data which is generated in the middle of decoding the coded data; a data information storage means for storing the data information; and a data output control circuit for controlling the output of decoded data on the basis of the data information.

Further, according to the present invention, in a data decoding method for decoding coded data which is recorded in a recording medium, the coded data read from the recording medium is stored in a memory used for decoding, data information of data to be read is detected from decoded data which is generated in the middle of decoding the coded data to be stored, and the output of the decoded data is controlled based on the data information.

By this, in the middle of decoding the coded data recorded in the recording medium, the data information of data to be read is detected and stored in the data information storage means, thereby the output of the decoded data can be controlled based on the data information independent of the decoding of the coded data.

Furthermore, according to the present invention, a data reproduction apparatus for reading out and reproducing video signals and audio signals being coded data recorded in the recording medium, comprises a data decoding apparatus having: a memory used for decoding for storing coded data and decoded data which the coded data is decoded; a data information detecting circuit for detecting data information of data to be read from the decoded data which is generated in the middle of decoding the coded data; a data information storage means for storing data information; and a data output control circuit for controlling the output of the decoded data based on the data information independent of the decoding of the coded data.

By this, in the middle of decoding the coded data recorded in the recording medium, data information of data to be read is detected and stored in the data information storage means, thereby the output of the decoded data can be controlled based on the data information independent of the decoding of the coded data, thus the coded data can be speedily reproduced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 is a block diagram showing an ECC circuit in FIG. 1;

FIGS. 3, 4, 5, and 6 are tables describing data decoding executed by the ECC circuit in FIG. 2;

FIG. 10 is a table describing data stored in the RAM in FIG. 8;

FIG. 14 is a table describing accesses to the RAM of the ECC circuit in FIG. 8;

FIGS. 19A and 19B are timing charts describing the sector address setting;

FIGS. 35A, 35B, 35C, 35D, 35E, and 35F shows signal waveforms and describes writes of EFM-demodulated output to the RAM according to the second embodiment;

FIGS. 39A, 39B, 39C, 39D, 39E, 39F, 39G, and 39H show signal waveforms and describe block-top detection operation according to the second embodiment;

FIGS. 40A, 40B, 40C, 40D, 40E, 40F, 40G, and 40H show signal waveforms and describe processing carried out after the detection of block-top according to the second embodiment;

FIGS. 41A, 41B, 41C, 41D, 41E, 41F, show signal waveforms and describe SUB transfer operation according to the second embodiment;

FIG. 42 is a schematic chart showing the configuration of sector information according to the second embodiment;

FIG. 46 is a flowchart showing a SALK generation procedure according to the second embodiment;

FIGS. 47A, 47B, 47C, 47D and 48A, 48I show signal waveforms and describe an error correction operation according to the second embodiment;

FIGS. 49A, 49B, 49C, 49D, 49E, 50A, 50B, 50C, 50D, 50E, and 51A, 51B, 51C, 51D, 51E are timing charts describing an ECC processing control operation according to the second embodiment;

FIG. 54 is a table showing the results of error corrections according to the second embodiment;

FIGS. 55A, 55B, 55C, 55D, 55E, 55F, 55G show signal waveforms and describe bus arbitration according to the second embodiment;

FIG. 56 is a table showing the number of accesses to the RAM during the correction of one ECC block according to the second embodiment;

FIGS. 57A, 57B, 57C, 57D, 57E, 57F show wave forms and describe the output of error correction results according to the second embodiment.

DETAILED DESCRIPTION OF THE EMBODIMENT

Figure 1:
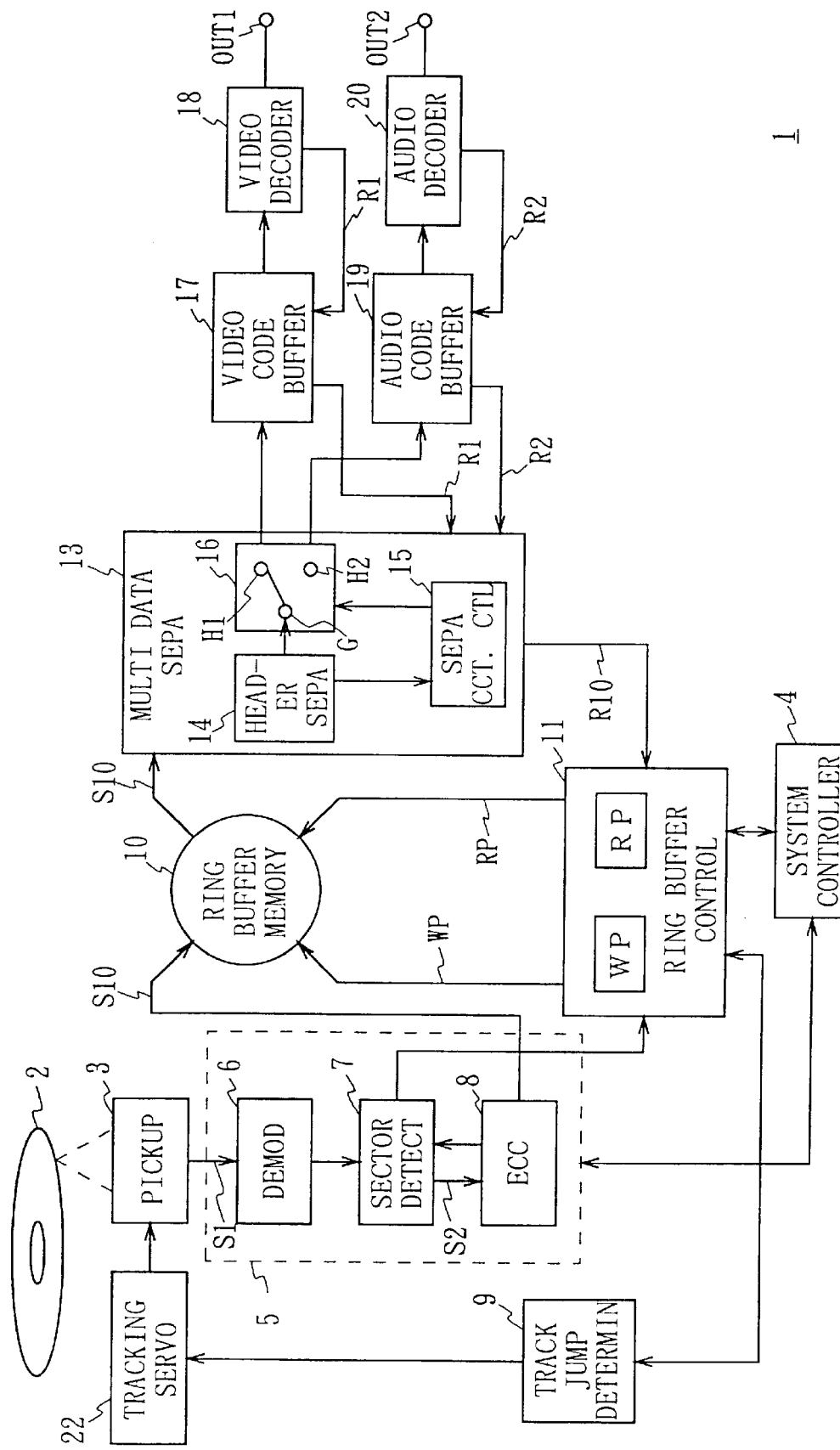
FIG. 1 is a block diagram showing a conventional data decoding apparatus.
Figures 2, 6:
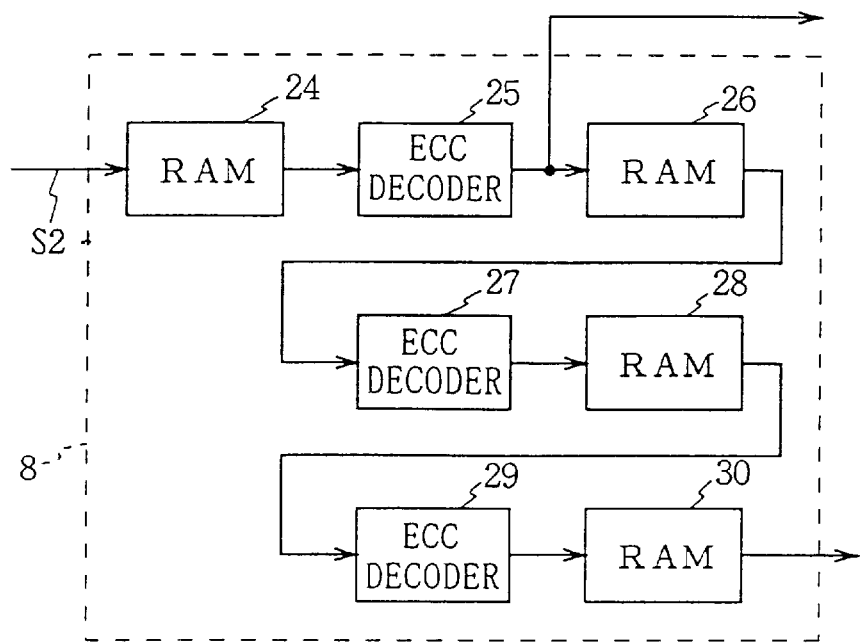
Figure 7:
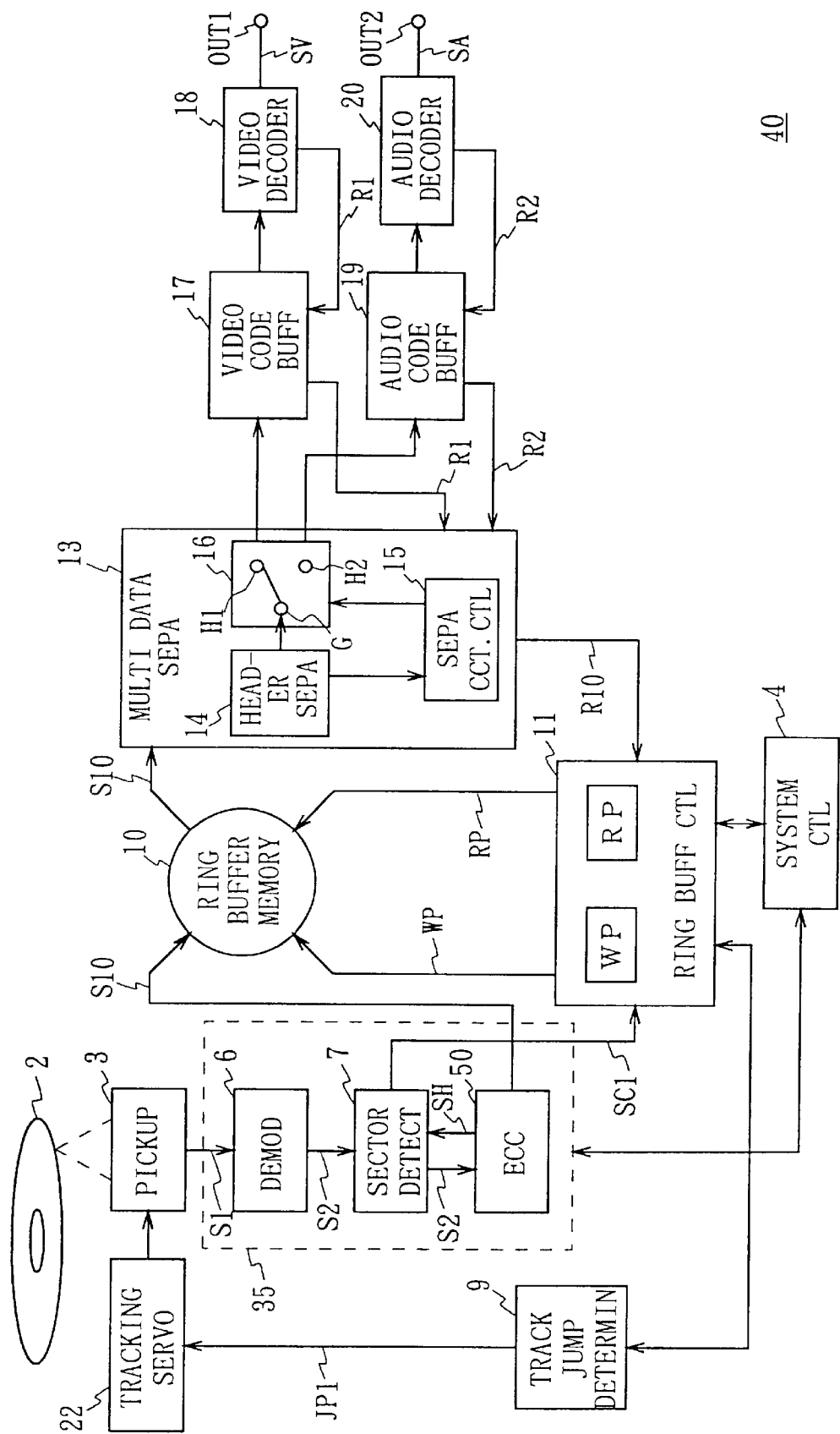
FIG. 7 is a block diagram showing the overall configuration of a data reproduction apparatus according to a first embodiment.

Preferred embodiments of this invention will be described with reference to the accompanying drawings:

(1) First Embodiment
(1-1) Overall Configuration of a Data Reproduction Apparatus In FIG. 7 in which the same components as in FIG. 1 have the same reference numerals, 40 designates the overall configuration of a data reproduction apparatus using a data decoding apparatus according to this invention. The data reproduction apparatus 40 reproduces picture data and voice data recorded on an optical disc 2 with a variable rate by irradiating the optical disc 2 with laser beams to read the recorded data from reflected beams. A reproduced signal S1 reproduced by a pickup 3 is transmitted to a demodulating circuit 6 in a demodulating/decoding circuit system 35 controlled by a system controller 4. The demodulating circuit 6 demodulates the reproduced signal S1 and outputs it to a sector detection circuit 7.

The sector detection circuit 7 detects from the supplied data an address recorded for each sector and outputs it to the ring buffer control circuit 11 while outputting the data to an ECC circuit 50 located beyond the ring buffer control circuit in synchronism with the sector data. The ring buffer control circuit 11, controlled by the system controller 4, controls writes to and reads from a ring buffer memory 10 and monitors a code request signal R10 for data which is output from a multiplexed data separation circuit 13.

If the sector detection circuit 7 has failed to detect addresses or detected addresses are not continuous, it outputs a sector number error signal to a track jump determination circuit 9 via the ring buffer control circuit 11.

The ECC circuit 50 detects errors in the data supplied from the sector detection circuit 7, corrects them using a redundancy bit included in the data, and outputs them to the ring buffer memory 10 for track jump which has an FIFO (First In First Out) function. The data in the ring buffer memory 10 is supplied to the multiplexed data separation circuit 13. At this point, the ECC circuit 50 detects sector header data and sends it out to the system controller 4 through the sector detection circuit 7.

If the ECC circuit 50 has failed to correct the errors in the data, it outputs an error signal to the system controller 4.

The track jump determination circuit 9 monitors the output of the ring buffer control circuit 11, and when a track jump is required, outputs a track jump signal JP1 to a tracking servo circuit 22 in order to allow a track jump of the reproduction position of the pickup 3 relative to the optical disc 2. On detecting a sector number error signal from the sector detection circuit 7 or an error signal from the ECC circuit 50, the system controller 4 allows the track jump detection circuit 9 to output a track jump signal to the tracking servo circuit 22 to cause a track jump of the reproduction position of the pickup 3.

A header separation circuit 14 in the multiplexed data separation circuit 13 separates a pack header and a packet header from the data supplied from the ring buffer memory 10, and supplies them to a separation circuit control circuit 15 while supplying the time-division-multiplexed data to the input terminal G of a switching circuit 16. The output terminals (switched terminals) H1 and H2 of the switching circuit 16 are connected to the input terminals of a video code buffer 17 and an audio code buffer 19, respectively.

When the switching circuit 16 switches the output terminal to H1, video code output is sent out to the video decoder 18 through the video code buffer 17 and then output from an output terminal OUT1. In addition, when the switching circuit 16 switches the output terminal to H2, audio code output is sent out to the audio decoder 20 through the audio code buffer 19 and then output from an output terminal OUT2.

In addition, a code request signal R1 generated by the video decoder 18 is input to the video code buffer 17 and then to the multiplexed data separation circuit 13.

A code request signal R2 generated by the audio decoder 20 is input to the audio code buffer 19 and then to the multiplexed data separation circuit 13.

If, for example, the amount of data used per unit time of the video decoder 18 decreases due to continuing data processing on simple screens, the amount of reads from the ring buffer memory 10 decreases. In this case, the amount of data stored in the ring buffer memory 10 increases and an overflow may occur. The track jump detection circuit 9 thus calculates from a write pointer WP and a read pointer RP the amount of data currently stored in the ring buffer memory 10, and if the amount exceeds a predetermined value, determines that the ring buffer memory 10 may overflow to output a track jump instruction to a tracking servo circuit 22.

On detecting a sector number error signal from the sector detection circuit 7 or an error signal from the ECC circuit 50, the track jump determination circuit 9 determines from the write pointer WP and the read pointer RP the amount of data remaining in the ring buffer memory 10, and also determines the amount of data required to finish a read from the ring buffer memory 10 by the multiplexed data separation circuit 13 before the optical disc 2 has made a single rotation from the current track position (while a single rotation of the optical disc 2 is being waited for).

If a large amount of data is remaining in the ring buffer memory 10, this memory 10 will not underflow even if data is read from the memory 10 at the highest transfer rate. The track jump determination circuit 9 thus determines that an error recovery can be executed by using the pickup 3 to attempt again to reproduce the position in which the error has occurred, and outputs a track jump instruction to the tracking servo circuit 22.

(1-2) ECC circuit and ECC decoding

Figure 8:
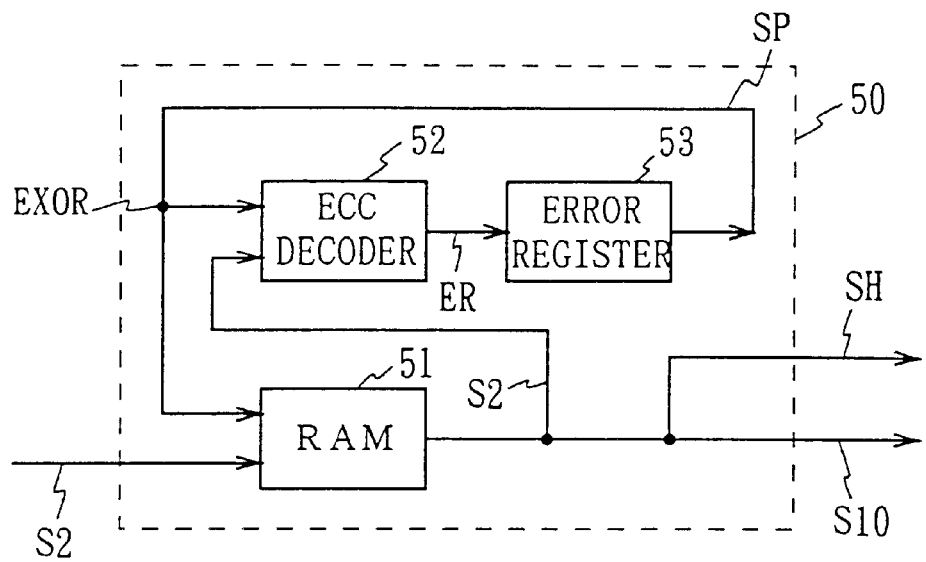
FIG. 8 is a block diagram showing the configuration of an ECC circuit in FIG. 7.

The ECC circuit 50 shown in FIG. 8 decodes ECCs comprising C1/C2 convolutional Reed-Solomon codes (CIRC Plus). The ECC circuit 50 comprises a RAM (Random Access Memory) 51 consisting of a ring bugger memory; an ECC decoder 52 for correcting errors in EFM+-demodulated data to ECC-decode it; and an error register 53 in which an uncorrectable error flag, error correction patterns, and error positions are stored.

Figure 9:
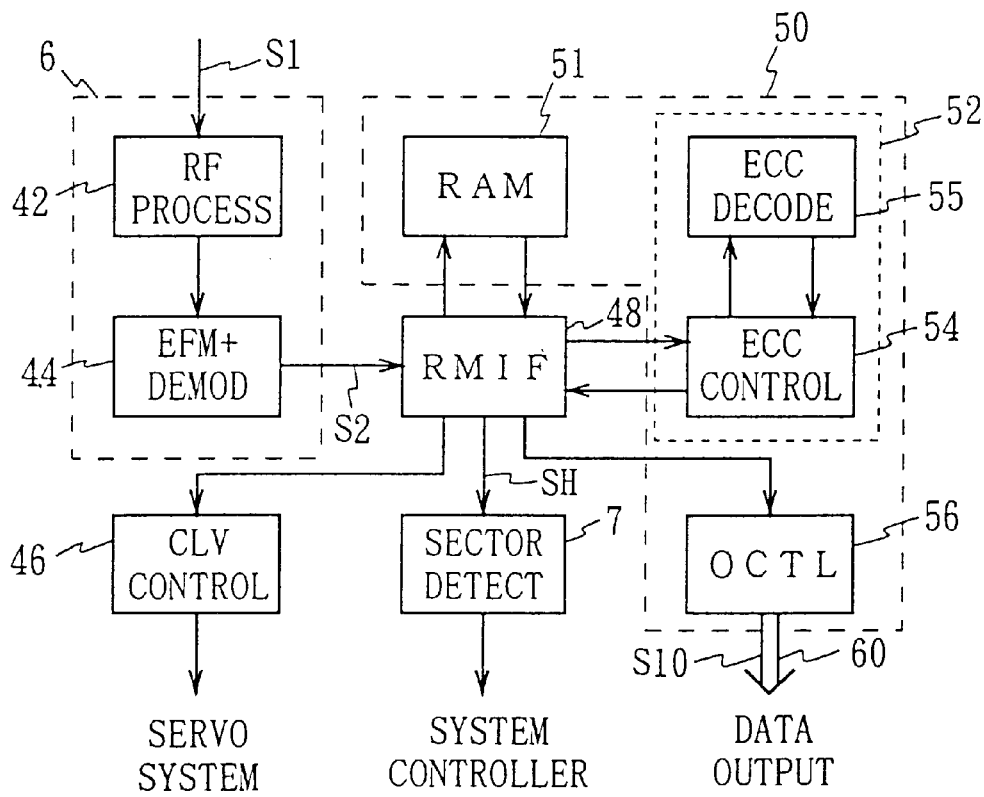
FIG. 9 is a block diagram describing the connections between a demodulating circuit and a sector detection circuit and an ECC circuit in FIG. 7.

As shown in FIGS. 8 and 9, ECC decoding is carried out by using an RF processing circuit 42 to apply RF and binary processing to the reproduced signal S1 read from the disc 2 and then using a demodulating circuit 44 to detect an EFM+ synchronization pattern. When an EFM+ synchronization pattern is detected, a CLV control circuit 46 allows a rough servomechanism to operate. Then, when the demodulating circuit 44 detects an EFM+ sync pattern, a PLL (Phase Locked Loop) servomechanism is allowed to operate. When several sync patterns are subsequently and continuously detected, EFM+-demodulated data S2 is written in frames to the RAM 51 in the ECC circuit 50 through an RMIF (Random Access Memory Interface) 48. The data is then output to the ring buffer memory 10 through an OCTL (output control circuit) 56.

The ECC circuit 50 generates write addresses to the RAM 51 via the RMIF 48. Data read from the RAM 51 is transferred to an ECC control section 54 and an ECC decoding section 55 through the RMIF 48.

If an error is detected and found to be uncorrectable, an error position and an error correction pattern are output from the ECC decoding section 55 to the ECC control section 54. In this case, the error position and the error correction pattern are output for each frame of the RAM 51 and stored in an error register 53 (FIG. 8). The error is corrected by reading the error position and the correction pattern from the error register 53, reading from the RAM 51 the erroneous data corresponding to the error position, exclusively logically adding the erroneous data to the correction pattern (Exclusive OR, EXOR), and writing the result back to the RAM 51.

If an uncorrectable error is detected, the uncorrectable error flag for that frame is stored in the error register 53 so as to carry out an ECC erasure correction in the following circuit.

As a result, error positions and correction patterns are accumulated in the error register 53 for each of the C11, C2, and C12 sequences of the ECC data as data required to decode the ECCs. Once a number of error positions and correction patterns required and sufficient for decoding the ECCs have been obtained, the ECC control section 54 executes error corrections between them and the data stored in the RAM 51.

Data storage addresses RA can be determined from the data that has been written to the RAM 51 as shown in FIG. 10 using the order Dn of the C1 sequence of data, the frame numbers Fn in C1 code units, and the following equations.

[Equation 1]

Dn: data No. (00-A9)

Fn: frame No. (00-B9)

RA: RAM address (0000-7FFF)

hereinafter, all numerals are HEX.

$$Fna=Fn+46+01 \text{ IF(ECC MODE=C2 )} Fna=Fna+Dn$$
$$IF(Fna>FF) Fna=Fna+46-100 \quad (1)$$

[Equation 2]

$$(Dn=00)AND(00<Dn<80) \ RA=[(Fna)\times 80]+Dn[6:0] \quad (2)$$

[Equation 3]

$$(Dn=80)AND(A0<Dn<A0) \ RA=[(Fna+18)\times 20]+Dn[4:0] \quad (3)$$

[Equation 4]

$$(Dn=A0)AND(80<Dn<AF) \ RA=[(Fna+BA-100)\times 10]+Dn[3:0] \quad (4)$$

At this time, the RMIF 48 writes the result of the ECC decoding of the three C11, C2, and C12 sequences in the any address of AA, AB, AC, AD, AE, and AF in the frame including the head data of respective sequences on the RAM 51. For example, if the result of the ECC decoding is written in the AA, AB, and AC, a memory address of the RAM 51 according to the result of the ECC decoding of the three sequences C11, C2, and C12 can be easily generated by the frame count Fn and the data order of AA, AB, and AC.

In the data reproduction apparatus 40, it is required to secure the amount of data for ensuring the reading from the ring buffer memory 10 to the multiplexed data separation circuit 13. So, RFCK is set so that the value of the channel bit rate in reproducing a disc is larger than that of the reference channel bit rate of 26.6 Mbit/s in recording the disc (cutting).

Figures 11, 12:
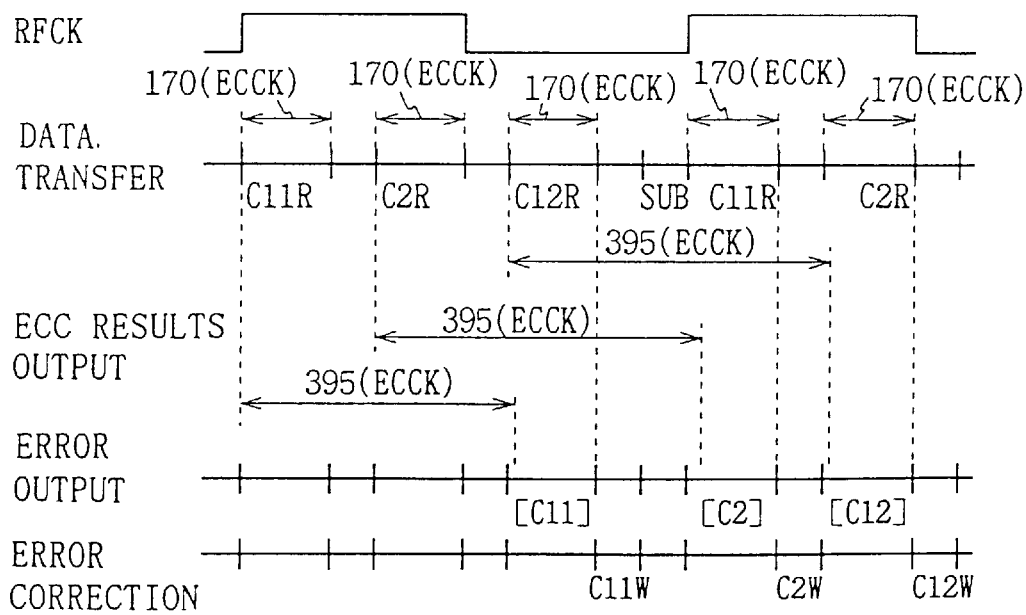
FIG. 11 is a schematic diagram describing the ECC result executed by the ECC circuit in FIG. 8.
FIG. 12 is a timing chart describing the execution control executed by the ECC circuit in FIG. 8.

As shown in FIG. 11, for example, when an EFM+ write (EFM+ Write) is executed to the frame 182 of the RAM 51, the C11 sequence of data is simultaneously transferred to the ECC decoder 52 in the order of 00, 02, . . . , A9 (C11 read). The C2 sequence of data is subsequently transferred to the ECC decoder 52 (C2 read), and the C12 sequence of data is then transferred to the ECC decoder (C12 read). A frame 1, for which the C11, C2, and C12 sequence of data has been ECC-decoded, is transferred to the OCTL 56 (OUT). The transfer of the C11, C2, and C12 sequence of ECC data is continuously executed at a fixed interval. That is, with RFCK of one period comprising 1168 cycles, once the transfer of ECCs of a code length of 170 bytes has been initiated, it is ensured to be carried out three times within the period of RFCK.

The three C11, C2, and C12 sequences of data S2 stored in the RAM 51 is transferred to the ECC decoder 52 within one period of RFCK. In this case, the ECC data in the RAM 51 remains therein as it stands. If an ECC error is detected and found to be correctable by the ECC decoder 52, an error position and an error correction pattern are sent out to the error register 53 as error results ER. The ECC circuit 50 corrects the error by exclusively logically adding together the correction pattern read from the error register 53 and the erroneous data read from the RAM 51 based on the error position (EXOR), and writing the result back to the RAM 51.

Decoded data S10 and sector header data SH which are separated from each other are sent out from the ECC circuit 50 to the ring buffer memory 10 and the sector detection circuit 7, respectively.

FIG. 12 shows the execution control timing for the actual transfer, error result output, and error correction of the C11, C2, and C12 sequence of ECC data on the RAM 51. The ECC control section 54 corrects the errors in the C11 sequence of data (C11W) after the C12 sequence of ECC data has been transferred to the ECC decoding section 55. After the C11 sequence of data in the next frame has been transferred to the ECC decoder 52 from the RAM 51, the ECC control section corrects the errors in the C2 sequence of data in the current frame (C2W). Furthermore, after the C2 sequence of data in the next frame has been transferred, the ECC control section corrects the errors in the C12 sequence of data in the current frame (C12W).

In this manner, the three sequences of ECC data are continuously transferred from the RAM 51 to the ECC decoding section 55 (C11R, C2R, and C12R), and then subjected to an ECC error correction (C11W, C2W, and C12W), of the three sequences of the data so the ECC data read and the error correction can be each executed within one period of RFCK. As a result, the each of the C11, C2, and C12 sequences of ECC data can be continuously output from the RAM 51 at a fixed interval relative to RFCK.

When an ECC transfer code length NCYC is 170 cycles and a parity transfer code length PCYC is 14 cycles at maximum, the interval at which error results are output to the ECC register is set at 395 cycles of an ECC operation clock (ECCK) using the following equation.

[Equation 5]

$$2\times NCYC+3\times PCYC+13=2\times 170+3\times 14+13=395$$

where NCYC: code length (170)

PCYC: parity length (max 14)   (5)

The RMIF 48 in the ECC circuit 50 counts the ECCK for a number of symbols corresponding to the C1 and C2 sequences of data in order to make three outputs within one RFCK period in synchronism with the C11R, C2R, and C12R data transfer. The results of the C11 sequence are thus ensured to be output during the transfer of the C12 sequence of data. The results of the C2 and C12 sequences are also ensured to be output during the transfer of the C11 and C2 sequences of data, respectively.

Figure 13:
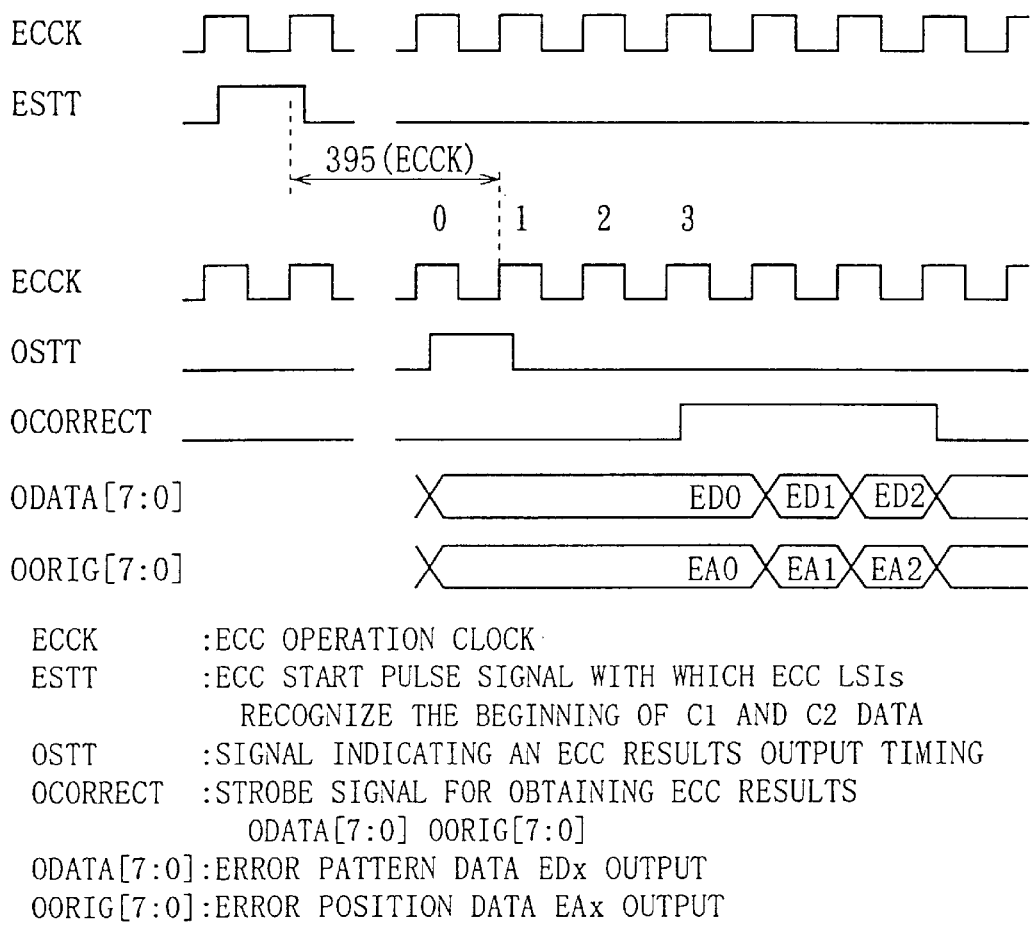
FIG. 13 is a timing chart describing the error output executed by the ECC circuit in FIG. 8.

FIG. 13 shows the timing of the error output of the ECC circuit 50. If an OSTT signal used as an output timing for ECC results is output after (ECCK) 395 cycles, which is obtained by Equation 5, then OCORRECT=1 three clocks after the OSTT signal, and error patterns EDX and error positions EAX are output to ODATA[7:0] and OORIG[7:0]. This example shows an output of three errors ED0 to ED2. An ECC start pulse signal ESTT is a signal with which the ECC decoding section 55 recognizes the head of the C1 and C2 data, and the OCORRECT signal is a strobe signal used to obtain the ECC results ODATA[7:0] and OORIG[7:0].

The error patterns EDX and the error positions EAX are held in the error register 53, and the errors are corrected after the current data transfer to the ECC decoder 52 has been finished.

FIG. 14 shows that number of ECC operation clocks (ECCK) within one frame (RFCK) period, that is, 1168 cycles which is required to access the RAM 51 for each of EFM+, C11, C2, C12, and OUT. EFM+ requires one cycle for writing a sector sync pattern and 170±α cycles for EFM+-demodulated outputs. The ECC C11 sequence requires 170 cycles for reading the C11 data, 8+8 cycles for correcting the errors in the C11 data, and one cycle for writing the C11 data, and also requires in SUB, one cycle for reading a sector sync pattern, 20 cycles for reading header data, and 1+(14) cycles for writing sector information.

The ECC C2 sequence requires 170 cycles for reading the C2 data, 14+14 cycles for correcting the errors in the C2 data, and one cycle for writing the C2 data. The ECC C12 sequence requires 170 cycles for reading the C12 data, 8+8 cycles for correcting the errors in the C12 data, and one cycle for writing the C12 data. Furthermore, OUT that indicates the end of ECC decoding requires one cycle for reading the sector information, one cycle for reading the correction results of the C11 data, one cycle for reading the correction results of the C2 data, one cycle for reading the correction results of the C12 data, and 170 cycles for OUT. The accesses to RAM 51 in C11, C2, C12, and OUT thus amounts to 948 cycles in total.

SUB, which reads the header data, transfers a sync code (4 bytes)+header data (16 bytes) to the sector detection circuit 7, which then extracts a sector address from the header data, carries out a CRC, performs a fly wheel (FW) operation, and transfers it to the system controller. The system controller 4 obtains the sector address through the sector detection circuit 7 that extracts the sector header data SH from the data with only the C11 sequence of data ECC-decoded after the C11 W shown in FIG. 12 (SUB), thereby obtaining the position information on the disc earlier by the time required to ECC-decode the C2 and C12 sequences.

The fly wheel operation is protection and interpolation that enables a lock state to be retained even if sync has not been detected several times. The system controller 4 determines whether or not it is a desired sector. The fly wheel operation applies an FW lock when continuously detecting several sync patterns of binary signals obtained from RF signals, in particular, continuously detecting several main and sub sync patterns.

The following equation shows the execution condition for the frame unit operation (JOB) for writes to and reads from the memory address and the RAM 51.

[Equation 6]

SUB is included in C11 the execution condition of C11:

$$Fn(EFM+)-Fn(C11)>1 \qquad (6)$$

[Equation 7]
the execution condition of C2:

$$Fn(C11)-Fn(C2)>169 \qquad (7)$$

[Equation 8]
the execution condition of C12:

$$Fn(C2)-Fn(C12)>0 \qquad (8)$$

[Equation 9]
the execution condition of OUT:

$$Fn(C12)-Fn(OUT)>0 \qquad (9)$$

If the frame count for JOBXXX is referred to as Fn (XXX), it is incremented by one when all the JOBs for the frame units XXX have been finished. SUB is assumed to be included in the C11 sequence.

In EFM+, when sync is continuously detected several times, the sync pattern FW is locked. At this point, a memory write enable signal MWENS becomes "1", and a write of EFM+-demodulated data is initiated. When sync has not been continuously detected several times, the sync pattern FW is unlocked, the memory write enable signal MWENS becomes "0" to prohibit EFM+ writes, and each frame counter is reset at zero. MWENS is a memory write enable signal that is "1" while the sync pattern FW is locked and which executes a write to the memory during this state.

Figure 15:
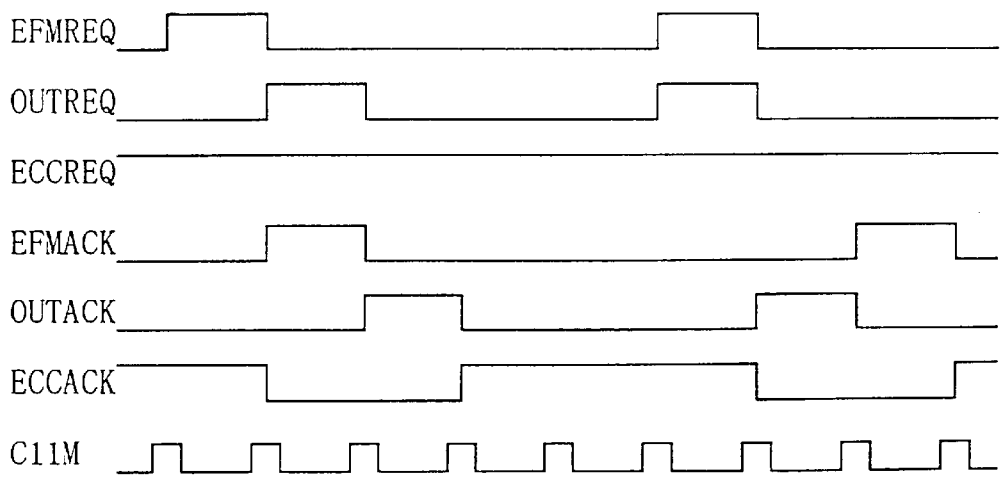
FIG. 15 is a chart describing priority levels for accesses to the RAM of the ECC circuit in FIG. 8.

FIG. 15 shows the timing for accessing to the RAM 51 when, for example, output OUT of decoded data outputs one request OUTREQ per four periods of C11M and when accessing can be obtained in the order of OUTREQ, EFMREQ, and ECCREQ. A predetermined JOB is carried out when XXX ACK (ACKnowledge)=1. ECC data output is activated at the rising edge of RFCK and executed on the basis of JOB execution conditions. The reads and writes for the C11, C2, and C12 sequences of ECC data as well as SUB are executed in the order of C11R, C2W, C2R, C12W, C12R, C11W, and SUB.

Thus, during the C11, C2, and C12 sequences and OUT, the difference among the count values of Fn(C11) to Fn(OUT) is fixed relative to the RFCK periods provided that the sync FW is locked, that the state of MWENS=1 remains, and that the execution conditions for each JOB are met.

The data decoding apparatus 40, to which this invention is applied, requires an amount of data that ensures reads from the ring buffer memory 10 to the multiplexed data separation circuit 13. RFCK thus sets the channel bit rate during reproduction at a larger value than the reference channel bit rate of 26.6 Mbit/s during recording the disc (cutting).

(1-3) Sector Detection

Figures 16A, 16B:
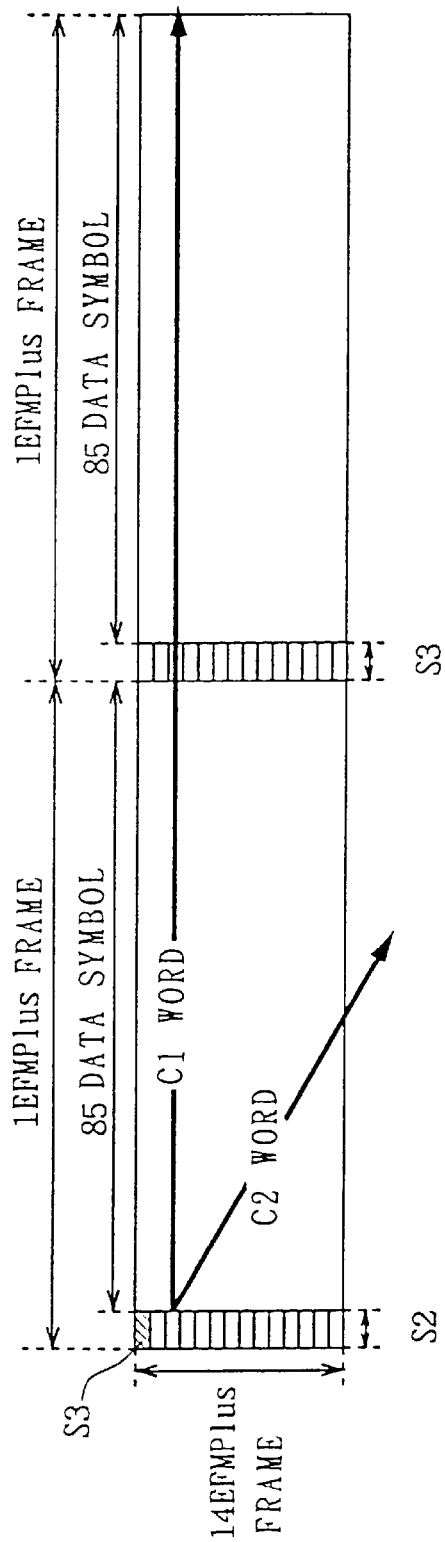
FIGS. 16A and 16B are schematic charts showing the frame configuration of reproduction data.
Figures 17, 18:
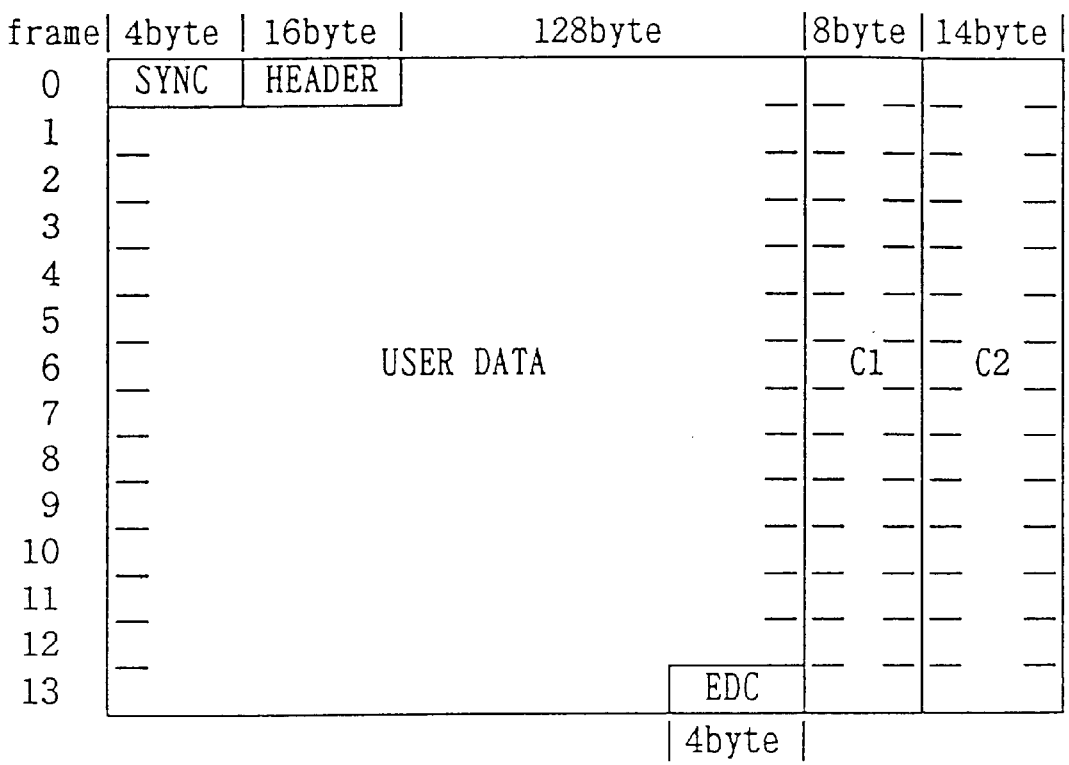
FIG. 17 is a schematic chart describing the sector format of demodulation data.
FIG. 18 is a table describing the sector information.

The detection of the desired sector and the generation of the sector information of the optical disc 2 will be described using FIGS. 16A and 16B to 18. FIGS. 16A and 16B show the concrete contents of frame configuration and sync words of reproduction data which is read from the optical disc 2. As shown in FIG. 16B, the sync words are comprised of an additional sync S1, a C1 sync S2, and a sector sync S3. FIG. 17 shows a sector format after deinterleaving.

When the sync patterns (S1 to S3) are detected by the sector detection circuit 7, after the sync pattern FM is locked and then sector FW is applied at the sector header SH (HEADER), the sector address SA (ADDRESS) is detected and the sector address FW is locked.

Next, each bit data in sector information shown in FIG. 18 will be described. Bit 7 shows the detection result of whether or not there is the sector sync pattern S3, "1" is set at a frame where the sector sync pattern S3 is detected. Bit 6 shows the detection result of whether or not there is the sync code, "1" is set at a frame, where the specific code "HDCD" is detected at the sync code position of the head of the sector by the sector detection circuit 7. Bit 5 shows the recognition of the sector sync, "1" is set at a frame, which is finally decided to be the sector sync by using the sector sync pattern S3 and the sector sync code SC by the sector detection circuit 7, and becomes an interpolated sector sync.

Next, bit 4 shows the CRC check result, as the result of executing the calculation of each sector CRC, "0" is written if errors are not detected.

Bit 3 shows the ECC decoding result of C1 sequence, "0" is set if errors are not detected. As the result of the ECC decoding of C11 sequence from the RMIF 48, a flag showing whether or not data is uncorrectable is taken in by the sector detection circuit 7 and is written in the bit 3.

Bit 2 shows the continuity of the sector address SA. When the sector address (Raw Sector Address, RSA) currently read and the sector address (Current Sector Address, CSA) stored in the sector detection circuit 7 are the same (in actual, the RSA is compared with a prior sector CSA+1), and it is decided that the sector has a continuity, BIT 2=1.

Bit 1 shows the detection result of the start sector address BSA, and "1" is set when the address BSA is detected. And bit 0 shows the detection result of the end sector address ESA, and "1" is set when the address ESA is detected.

In the actual sector detection, as shown in FIG. 19A, the system controller 4 sets the BSA setting mode SACT=1 (shown in FIG. 25) to a register (not shown) in the sector detection circuit 7, and sets the head address BSA of the desired sector and the end address ESA of the sector. Then, they are picked up from the reproduction data in the register (not shown) in the sector detection circuit 7 to compare them with the sector address in which the sector address FM is locked. When it is confirmed that the sector address which is detected by the comparing result is the desired address, the compared result is written back as the sector information (bits 0 and 1) in the RAM 51.

Figure 24:
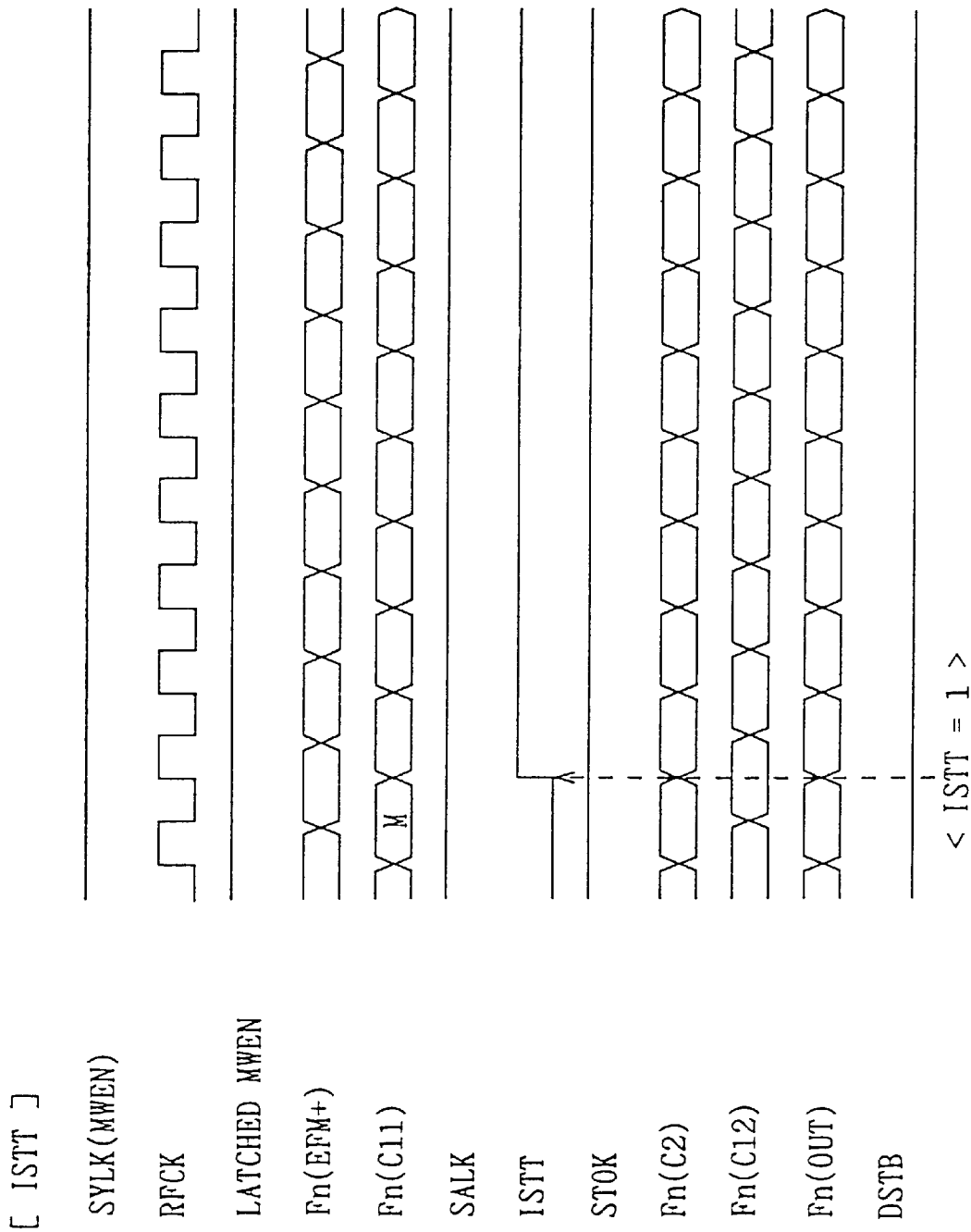

Here, in the case of SACT=1, data can be output from the frame M (FIG. 24). However, in the case where the initialization of descramble is executed by the sector address, it is necessary that an output sector address for descrambling is taken out before the initialization. The output sector address is protected by the address continuity of the sector information.

Further, the sector information is output to OCTL 56 with the ECC decoded data S10 which has been ECC decoded by the ECC circuit 50, and is used for controlling the data output OUT of the ECC decoded data. At this time, the system controller 4 makes a disc access position to track-jump to a position ahead of the desired sector on the optical disc 2, taking the interleaving of the ECC into account.

Further, if the system controller 4 does not specifies the desired sector at this time, data can be output after the time of reading the ECC decoded data by setting SACT=0.

The detection result, whether or not there is the sector sync pattern S3 of the bit 7 in the sector information, is written in the RAM 51 for each frame with the EFM+-demodulated data which is detected from the reproduction data at the time of the EFM+-demodulation in the EFM+-demodulating circuit 44, and transferred to the sector detection circuit 7 with the header data SH. The sector detection circuit 7 recognizes the sector from the optical disc 2 by the detection result showing whether there is the sector sync pattern S3 in each frame. At this time, when the sector on the optical disc 2 is recognized in the sector detection circuit 7, the sector address SA is taken out from the header data SH of the sector.

in the sector detection circuit 7, a fly wheel FW operation is applied to the sector address SA by adaptively using the result of the CRC check in the header data SH, the continuity of the address, and the result of the ECC decoding of the C1 sequence of the sector frame, etc. In the system controller 4, the sector address SA, on which the fly wheel FW operation is performed to be protected and which is in the sector address FW lock state is taken out and is used as the position information ADD on the optical disc 2.

The bits 0 and 1 in the sector information are referred at the OCTL 56. When the bit 1 of the sector information is "1" and the bit 0 is "0", that is, when the sector from the sector address BSA to the ESA has been detected, data of the sector desired by the system controller 4 can be output. In the case where the sector address ESA is not designated, the bit 0 is kept "0". During keeping the bit 0 "0", the ECC decoded data is continued to be output to the ring buffer memory 10. At this time, for example, the output of the data may be controlled regardless of the state of the bits 0 and 1 by using the data output control register (not shown) which is provided in the OCTL 56.

In this case, as shown in FIG. 19B, the start sector address BSA and the end sector address ESA can be set again by the system controller 4 after track-jumping in addition to the time of track-jumping. For example, in the case where unnecessary data is skipped at the time of fast forwarding operation, when the access position on the disc is approached, the sector addresses BSA and ESA are set again after recognizing the current sector address SA. Thereby data can be output from the sector address BSA without track-jumping.

Figure 20:
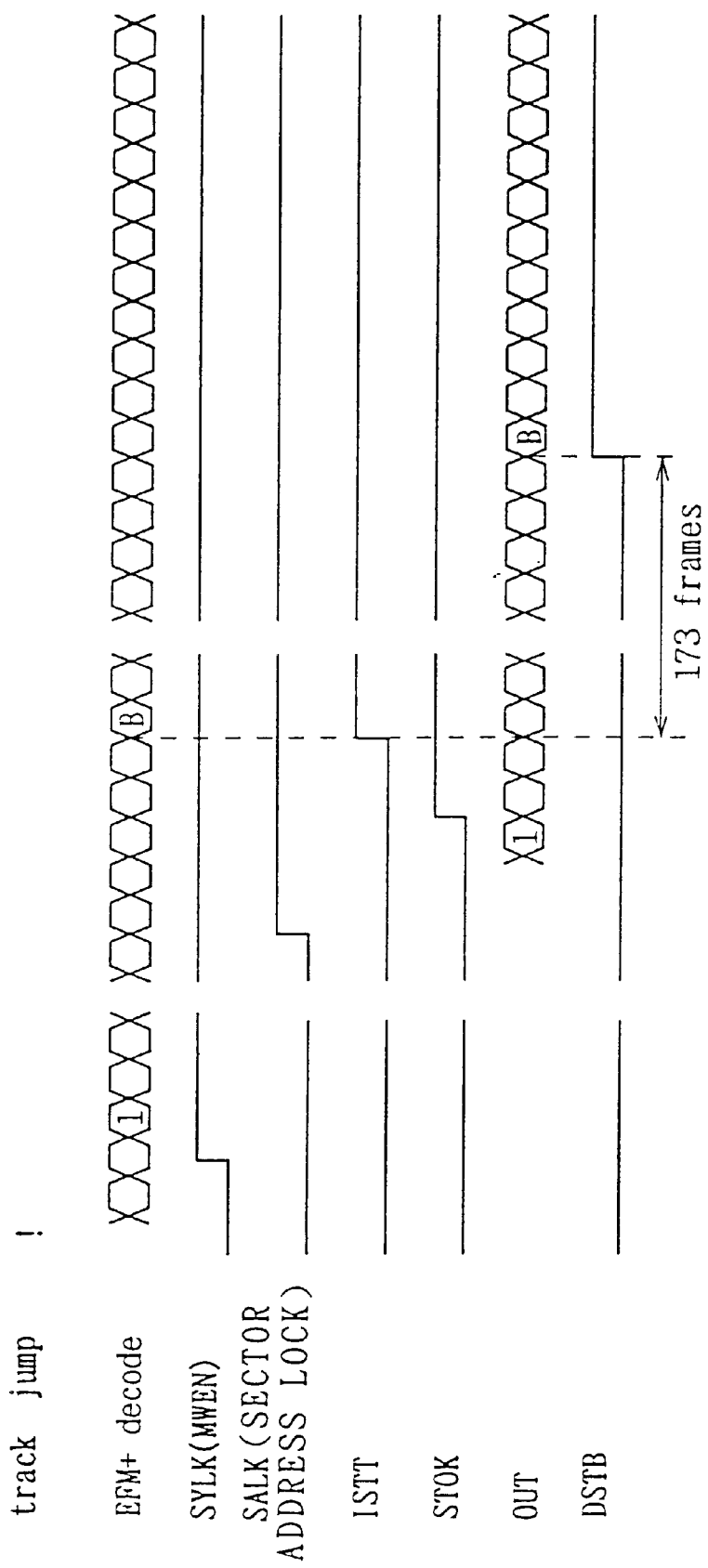
FIGS. 20, 21, 22, 23, 24, 25, and 26 are timing charts describing the sector detection and the data output.

FIG. 20 shows the time relation from locking the sync patterns (S1 to S3) to reading the sector address and outputting data. After the system controller 4 track-jumps the disc access position, when the sync patterns (S1 to S3) are locked after starting the EFM+-modulation, the sync pattern lock SYLK becomes "1". Sequentially, the sector address SA of the desired sector is fly wheel FW locked (when SALK=1). Sequentially, when the C11 execution frame of the ECC decoding is more than 170, STOK=1, and data after this data can be output after the ECC decoding.

In actual, after executing ECC decoding of the C2 sequence, for about 173 frames, including jitter from the timing of STOK=1, in the data strobe signal DSTB for outputting an effective data of the ECC decoded data to the next stage of the ring buffer memory 10 at a timing of detecting the start sector address BSA, DSTB=1, and the effective data of the ECC decoded data S10 is started to be output.

Figure 21:
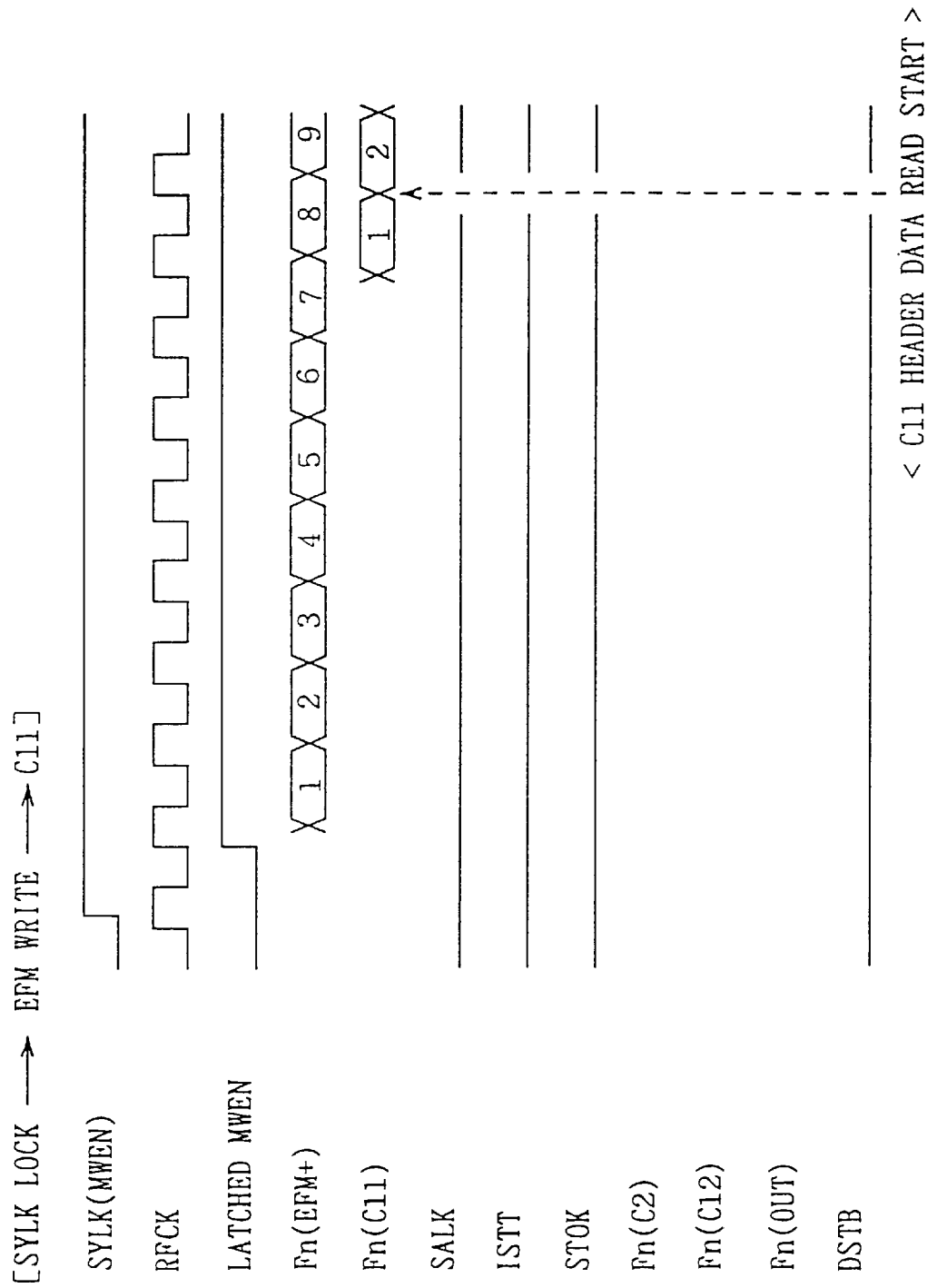

According to the above configuration, in the detection of the actual sector and the output of data, the sector detection circuit 7 analyzes that whether or not there is the sector sync pattern of the bit 7 in the sector information of the frame, the sync code SC, and the data of the header data SH, at a timing after the C11 execution shown by the arrow in FIG. 21, with the state of becoming the enable signal +LATCHED MWEN, which makes the EFM+-demodulated data writable, "1", and then the read operation of the sector address SA is started. The period of the read frame clock RFCK is obtained by the following equation.

[Equation 10]

$$\text{RFCK}: (1/11.2896\text{M}) \times 1168 = 103.45805 \text{ usec} \quad (10)$$

Figure 22:
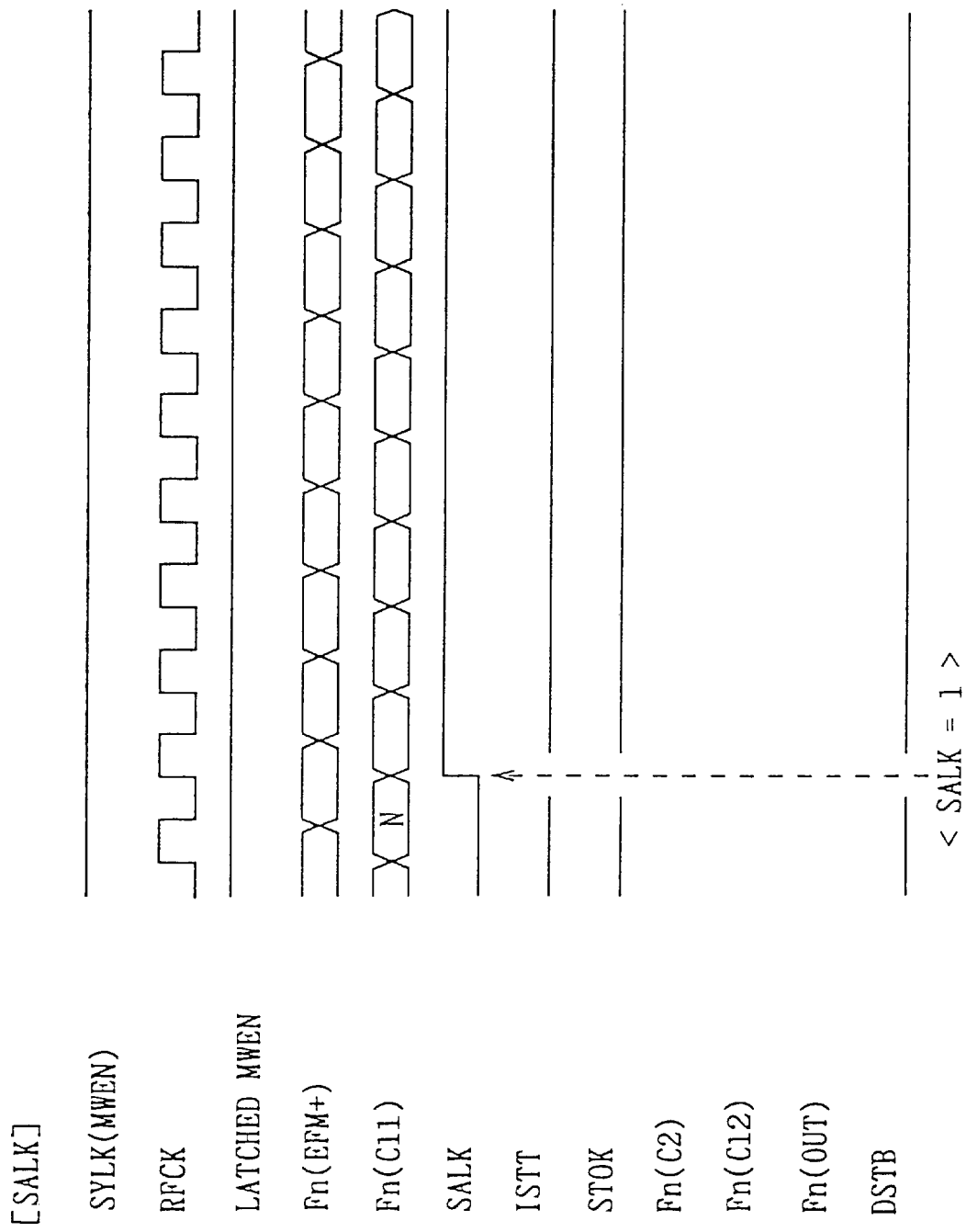

Sequentially, as shown in FIG. 22, the frame of head the sector is detected (three frames), for example, when the sector decision condition, in which the bits 6 and 7 in the sector information are "1", is met, and the sector FW is locked. Further, when it is determined that the continuity of the sector address is correct, the sector address SA decision condition is met, and the sector address FW is locked (three frames). At a result, SALK becomes "1" at a timing shown by the arrow in the figure (considering about one frame which is margin such as jitter). The system controller 4 can read out the sector address SA, in which FW is locked, if SALK=1. At this time, the frame count Fn (C11), N of the ECC decoding of the C11 sequence is represented by the following equation.

[Equation 11]

$$N = (3+3+1) \times 14 \text{ FRAMES} \quad (11)$$

Figure 23:
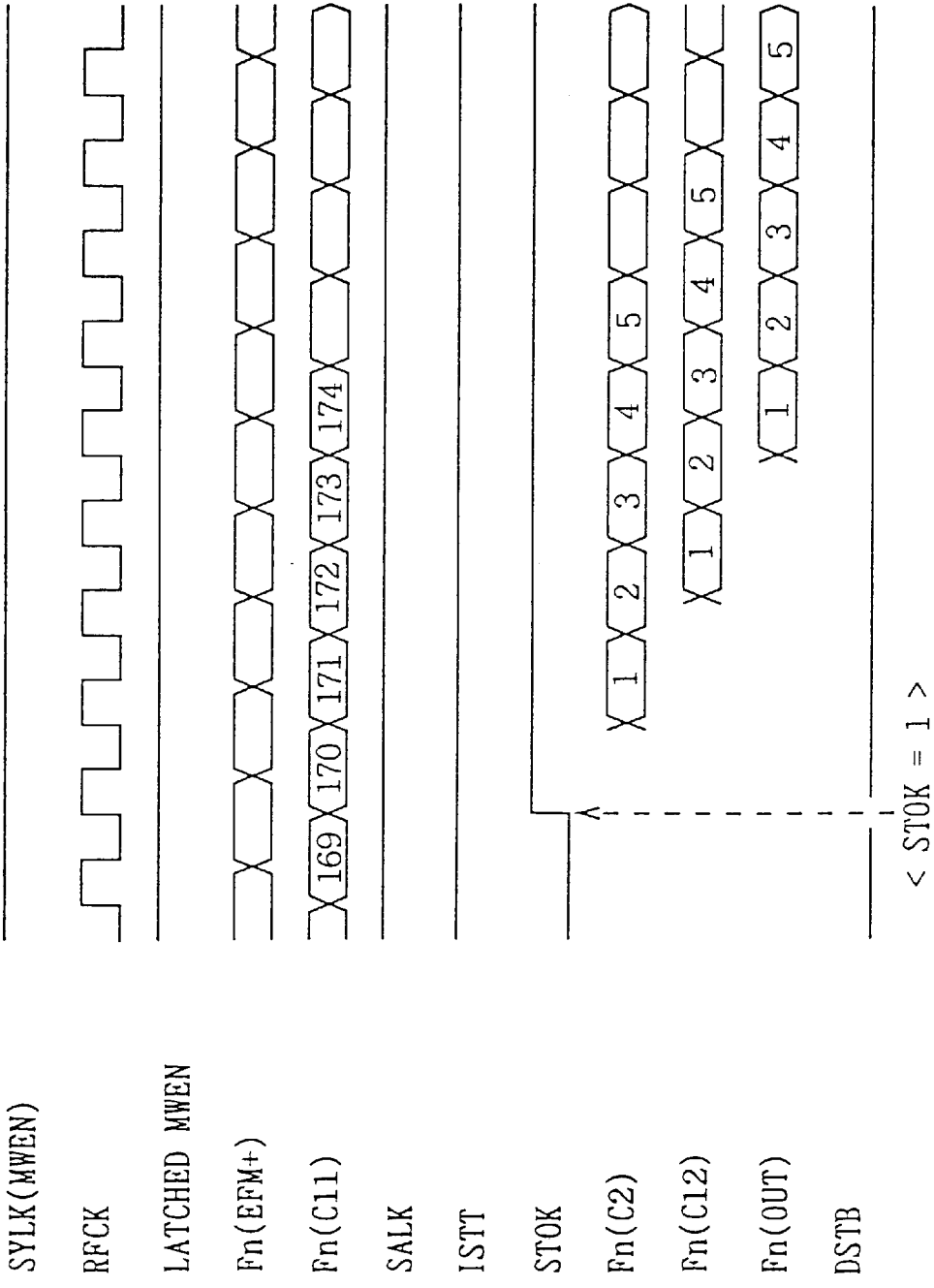

Sequentially, as shown in FIG. 23, after 170th frame of the ECC decoding of C11 sequence, when the ECC decoding of the C11, C2, and C12 sequences are all executed and the RMIF 48 decides that a frame is a frame to be output, the STOK=1 and the sector detection circuit 7 is informed at a timing of SUB that the output is possible.

Sequentially, as shown in FIG. 24, when the start sector address BSA is detected in the frame M of header the sector, if STOK=1, since the frame M is performed the ECC decoding and can be output, the bit 1 in the sector information is set to "1", that is, the sector address BSA which is the head address of the sector is detected, the signal ISTT to be "1" is set to "1", the bits 7 to 0 in the sector information are written back from the RMIF 48 to the RAM 51 at a timing of finishing SUB. At this time, when STOK=0 during detecting the start sector address BSA, the system controller 4 considers as an error and accesses again to the optical disc 2, for example, from a position ahead of the previous position.

Figure 25:
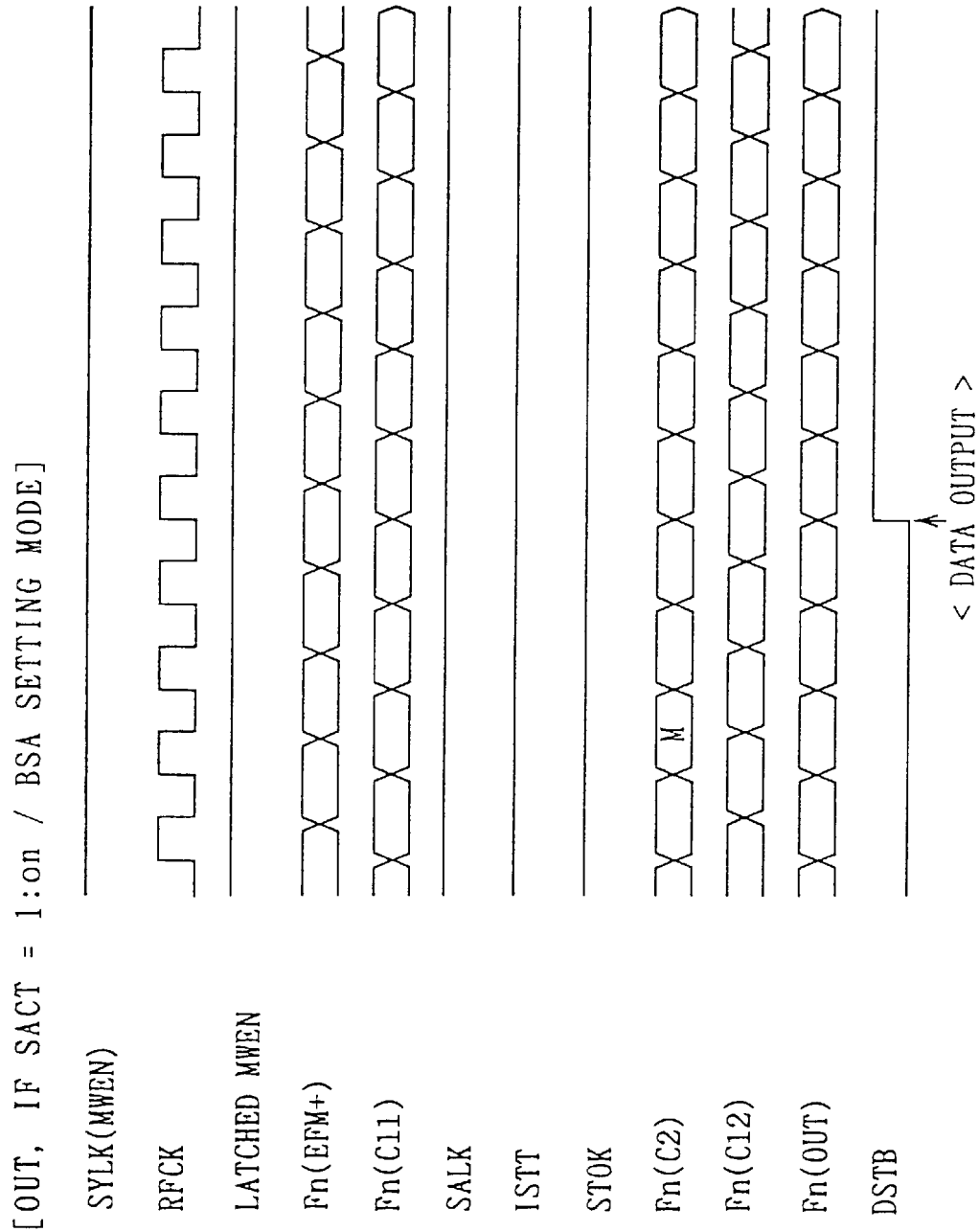

As shown in FIG. 25, when the sector address BSA is set and SACT becomes "1", the data strobe signal DSTB becomes "1", and the ECC decoded data Fn(OUT) can be output from the frame M in order (shown by arrow in the figure). However, in the case where the initialization of the descramble is executed by the sector address SA, it is needed that the output sector address SA for descramble is extracted before. An output sector address SA which is protected by the address continuity of the sector information is used as the output sector address.

Figure 26:
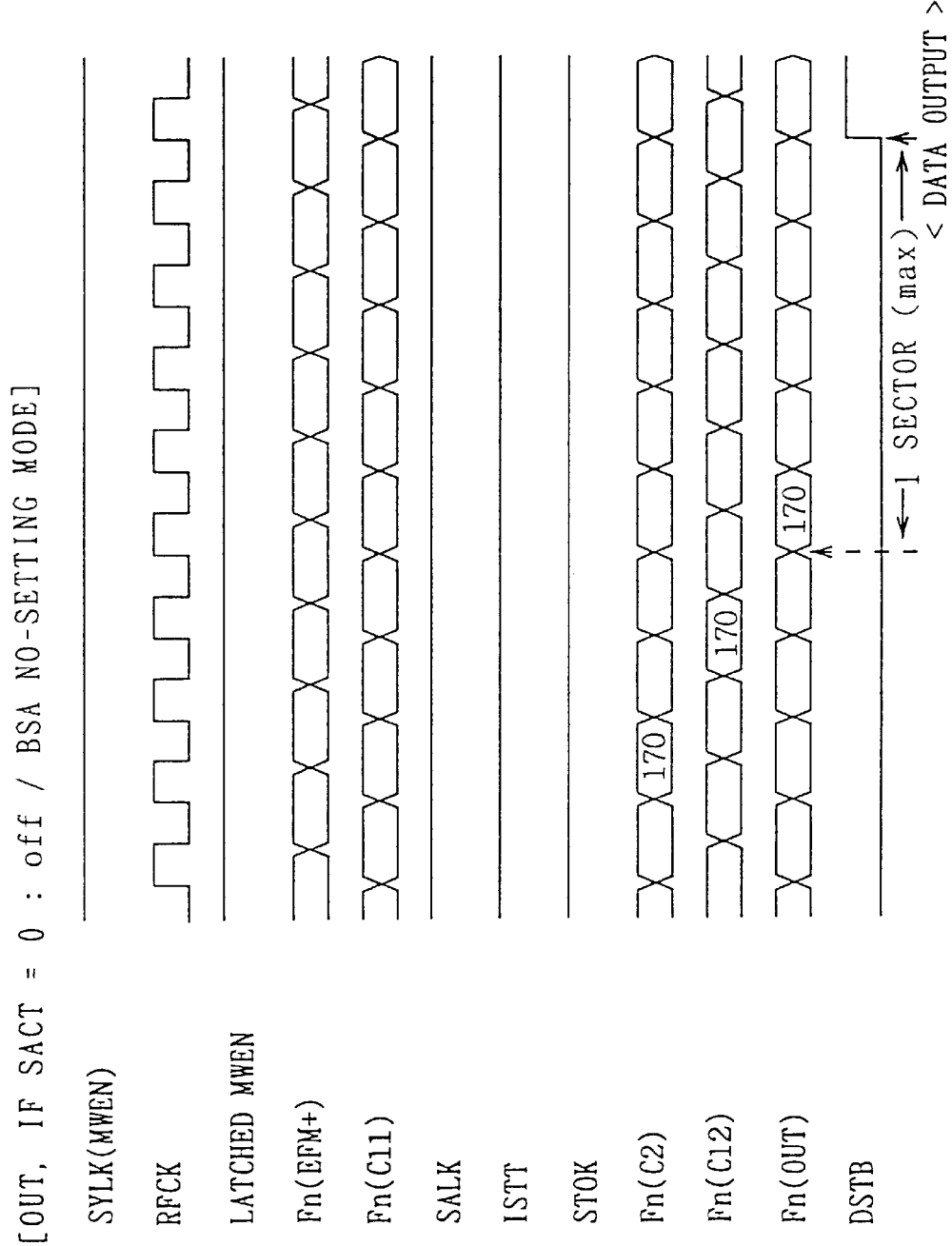
Figure 27:
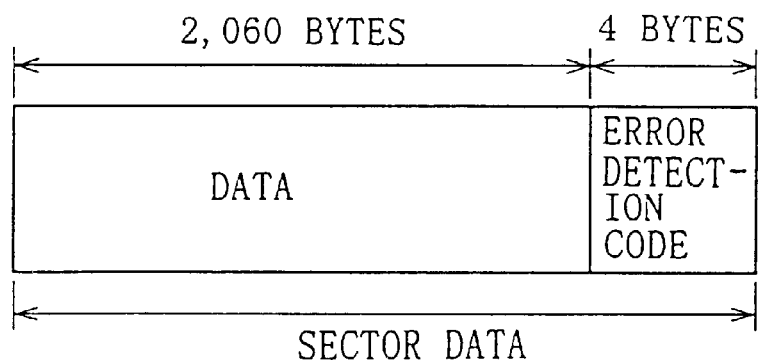
FIG. 27 is a schematic chart showing the configuration of the sector data according to the second embodiment.

As shown in FIG. 26, in the case of SACT=0 in which the sector address BSA and ESA are not set, data can be output from the head of the sector after the 170th frame (shown by the arrow in the figure). The 170th frames can not be output because the output sector address SA for descrambling is necessary. So, the reading of the output sector address SA for maximum one sector is waited. And when the initialization of the descramble is executed by the output sector address SA, DSTB becomes "1" and the output to the ring buffer memory 10 is started.

In this way, the sector is detected by the sector information and the output of the data of the desired sector can be controlled. Thus, a small memory area for the sector information is set in the RAM 51, thereby the access to the desired sector data can be surely performed using the sector information and the output of data can be controlled without increasing memories required for the ECC decoding.

According to the above configuration, the small area for storing the sector information used for detecting the sector is provided in the RAM 51 for decoding in the ECC circuit 50, thereby, even if the coded data which is decoded by the ECC circuit 40 is interleaved, the ECC decoding is executed with capacity of a memory only used for the ECC decoding without providing other memory for the sector detection.

Further, according to the above embodiment, it can be determined at a timing of finishing the ECC decoding of the C11 sequence whether data can be output to the next stage of the ring buffer memory 10 or not, by the sector information which is generated by the sector detection circuit 7 and the STOK signal which is generated by the RMIF 48. Thereby, it can be determined at a timing of recognizing the sector address SA for disc access by the system controller 4 whether or not the sector data can be written in the next stage of the ring buffer memory 10 at once, the access to the sector data can be speedily and surely performed.

Furthermore, according to the above embodiment, it can be determined at OCCRRECT=1 of timing (FIG. 13) of recognizing the sector address SA for the disc access by the system controller 4 whether or not data can be output to the ring buffer memory 10, so that it is unnecessary to newly provide a circuit for detecting the sector address SA from the ECC decoded data which is stored in the RAM 51, thus the overall configuration of a circuit can be simplified.

(2) Second Embodiment (2-1) Recording Data Format

FIGS. 27 to 30 show a recording data format according to a second embodiment, wherein data is recorded with one cluster (32 Kbytes) as a unit. The configuration of this cluster is described below in detail.

Two Kbytes (2,060 bytes) of data is extracted as one sector, to which 4 bytes of overhead is added as shown in FIG. 17. This overhead includes error detection codes (EDC) for detecting errors.

Figure 28:
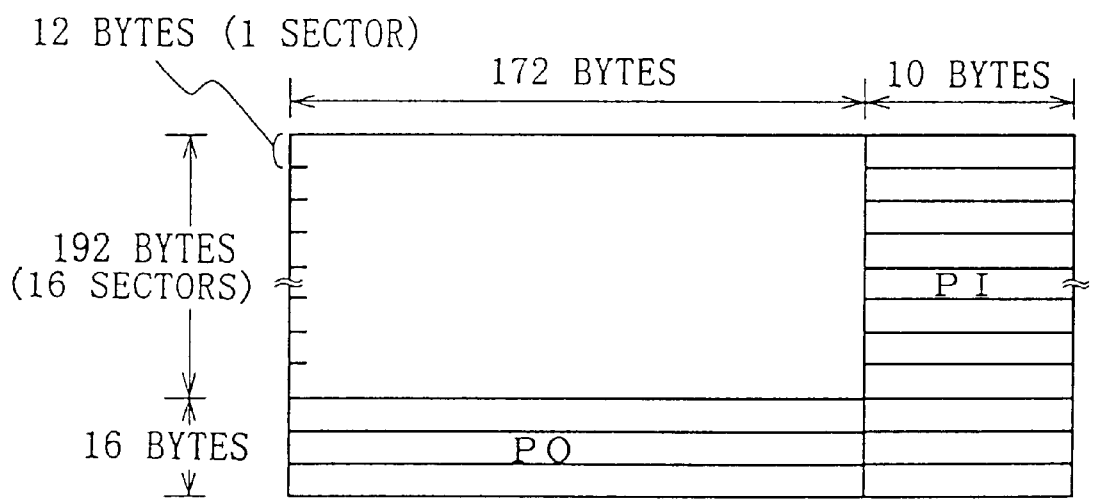
FIG. 28 is a schematic chart showing the configuration of the ECC block according to the second embodiment.

As shown in FIG. 28, 2,064 (=2,060+4) bytes of data corresponding to one sector is constituted as 12×172 (2,064) bytes of data. Sixteen data sectors are collected and constituted as 192 (=12×16)×172 bytes of data. Outer codes (PO) of 16 bytes are added to the 192×172 bytes of data for each byte in the vertical (column) direction as a parity, and inner codes (PI) of 10 bytes are added to the 208 (=192+16)×172 bytes of data and PO parity for each byte in the horizontal (row) direction as a parity.

Figure 29:
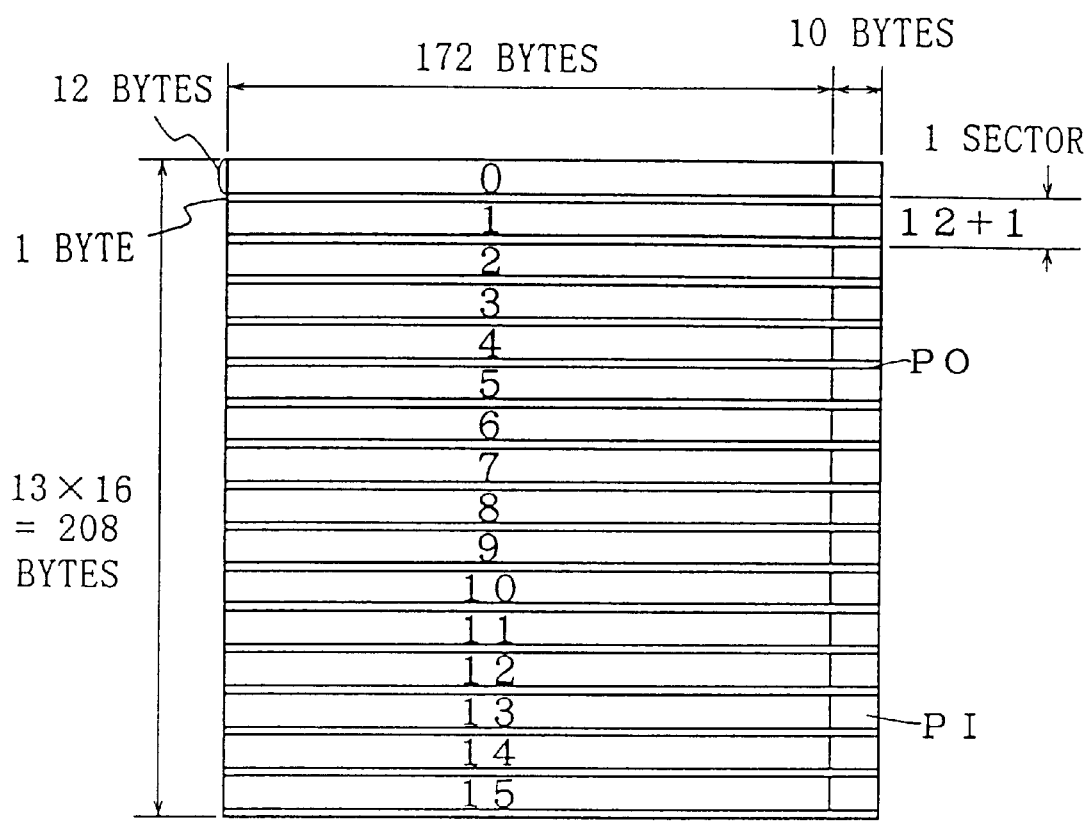
FIG. 29 is a schematic chart showing the interleaving of PO parities (outer codes) according to the second embodiment.

Furthermore, in the data blocked into 208 (=192+16)×182 (=172+10) bytes, the outer code (PO) row of 16×182 bytes is partitioned into 16 rows of 1×182 bytes, each of which is inserted below each of the 16 sector data each comprising 12×182 bytes and numbered from 0 to 15 and interleaved, as shown in FIG. 29. Then, one sector data comprises 13 (=12+1)×182 bytes.

Figure 30:
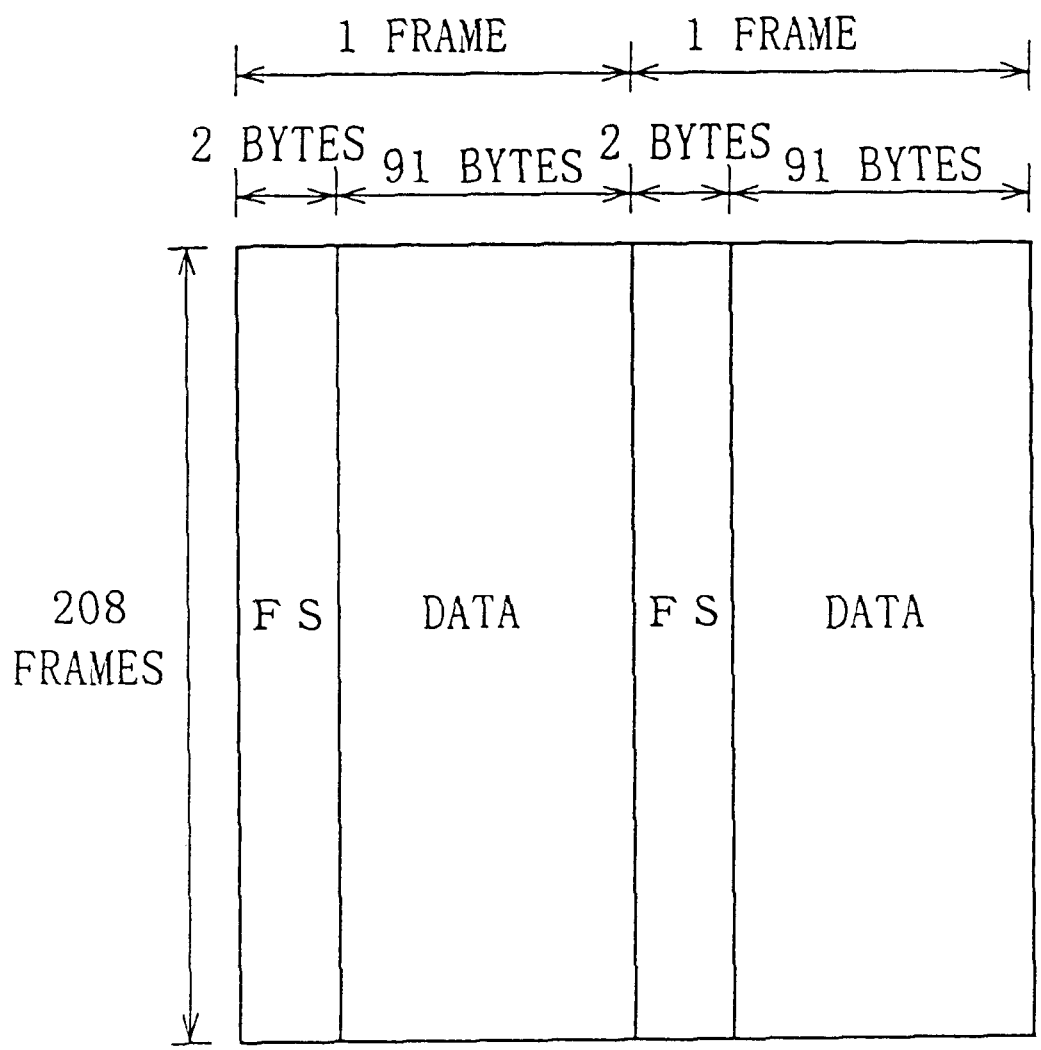
FIG. 30 is a schematic chart showing the configuration of 32 Kbyte data block prior to EFM modulation according to the second embodiment.

The 208×182 bytes of data shown in FIG. 29 is vertically divided into two as shown in FIG. 30. Then, 91 bytes is treated as one frame, and the entire data is constituted as 208×2 frames. A frame synchronization signal (FS) of 2 bytes is further added to the beginning of the frame data of 91 bytes. Consequently, the data in one frame amounts to 93 bytes in total, and the entire data is constituted as 208×(93× 2) bytes, as shown in FIG. 24. This is one cluster (one ECC block) of data. The size of the actual data section excluding the overhead section is 2 Kbytes (=2,048×16/1,024 Kbytes).

That is, in this case, one cluster (one ECC block) is composed of 16 sectors, and one sector consists of 24 frames. Such data is recorded on the optical disc 2 in clusters.

(2-2) Data reproduction apparatus and ECC decoding

Figure 31:
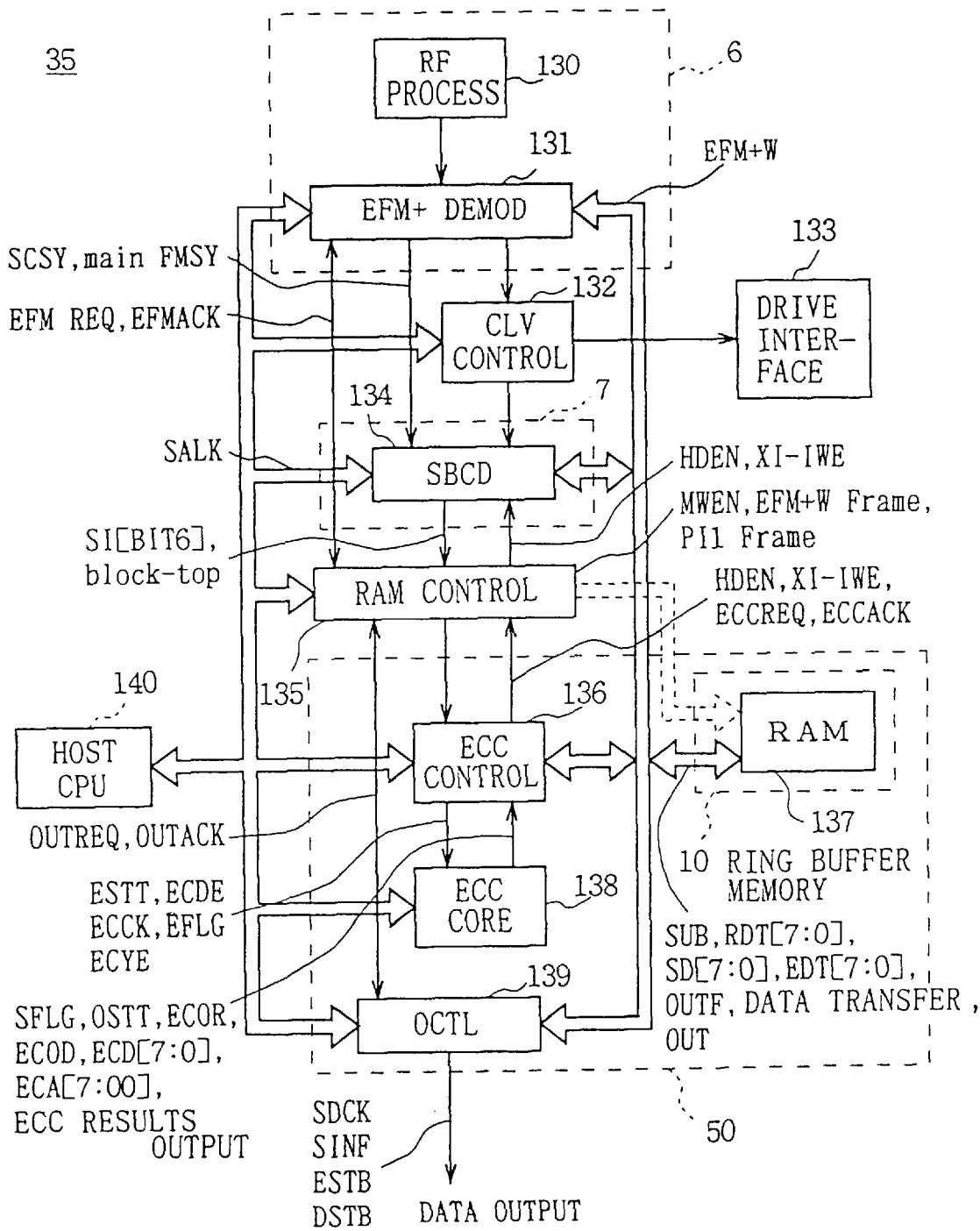
FIG. 31 is a block diagram showing the configuration of a modulating circuit system according to the second embodiment.

FIG. 31 shows in detail the configuration of the demodulating circuit system 35 used when the recording data format according to the second embodiment is applied to the data reproduction apparatus 40 according to the first embodiment. The demodulating circuit system 35 comprises the demodulating circuit 6 (an RF processing circuit 130 and an EFM+ demodulating circuit 131); the sector detection circuit 7 (an SBCD circuit 134, a RAM controller 135, and a RAM 137); the ECC circuit 50 (a RAM controller 135, an ECC control circuit 136, a RAM 137, an ECC core circuit 138, and an OCTL circuit 139); and peripheral circuits.

In this figure, the RF processing circuit 130 receives the input of an RF signal from the pickup 3 shown in FIG. 7, converts it into a binary signal, and outputs it to the EFM+ demodulating circuit 131. The EFM+ demodulating circuit 131 applies EFM+ demodulation to the input signal while detecting a synchronization pattern. Based on the synchronization pattern output from the EFM+ demodulating circuit 131, a CLV control circuit 132 controls a drive interface (hereafter simply referred to as a "drive IF") 133. The SBCD (subcode) circuit 134 detects sectors from the output of the EFM+ demodulating circuit 131. The RAM controller 135 corresponds to the RMIF 48 in FIG. 9 and controls reads from and writes to the RAM 137.

The RAM 137 temporarily stores data when the ECC control circuit 136 corrects errors. The ECC core circuit 138 corresponds to the ECC decoding section 55 in FIG. 9, uses Reed-Solomon codes (PI and PO) to generates ECA, ECD, and SGLG, and outputs them to the ECC control circuit 136. The ECC control circuit 136 uses the ECA, ECD, and SFLG supplied from the ECC core circuit 138 to actually correct the errors. The OCTL circuit 139 executes descrambling, EDCs, and the control of output data. A host CPU 140 corresponds to the system controller 4 in FIG. 7, and controls each section of the apparatus.

A reproduced signal from the optical disc 2 (FIG. 7) is converted into binary values by the RF processing circuit 130. The EFM+ demodulation circuit 131 then detects a synchronization pattern from the signal of the binary values. Based on this synchronization pattern, the CLV control circuit 132 allows a rough servomechanism to act on the data to further detect sync codes (SY0 to SY7 in FIG. 32) therein, and also allows a PLL (Phase Locked Loop) phase servo-mechanism to act on the rotation of the optical disc 1 via the drive interface 133.

Figure 32:
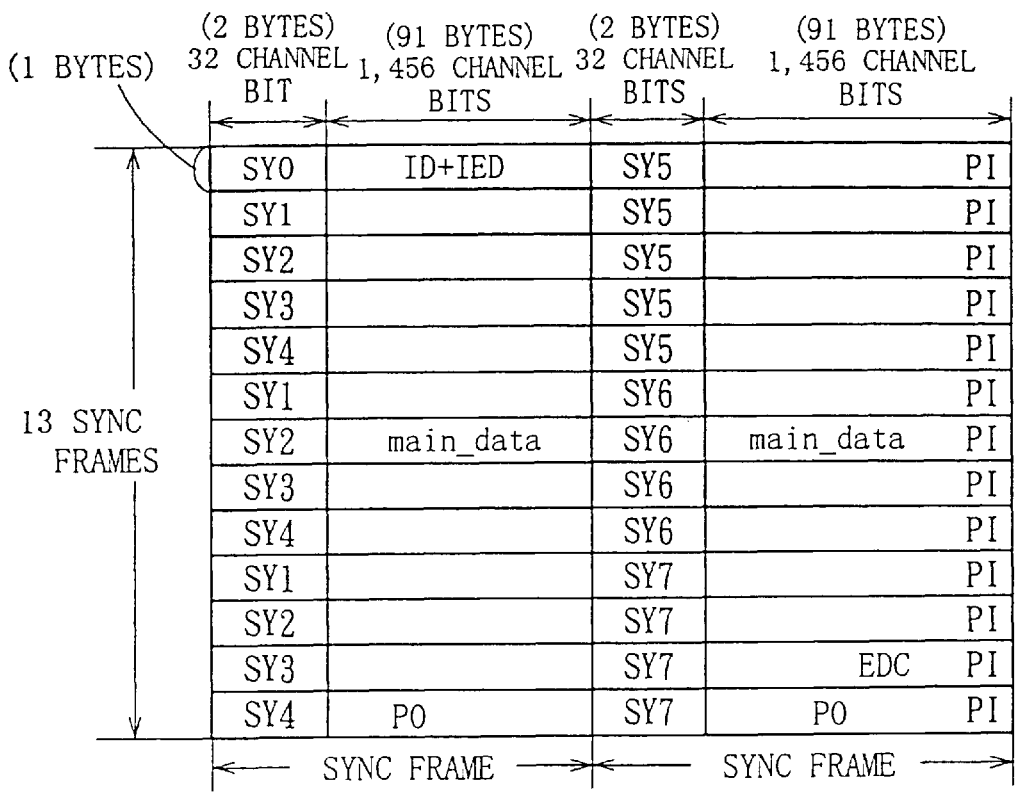
FIG. 32 is a schematic chart showing the configuration of a physical sector prior to EFM modulation according to the second embodiment.

FIG. 32 shows an example of a configuration of a physical sector of the optical disc 2. As shown in this figure, the physical sector comprises 26 sync frames: two horizontal sync frames and 13 vertical sync frames. Each sync frame consists of 32 channel bits of sync codes (SY0 to SY7) (16 bits (=2 bytes) if expressed in the data bits prior to modulation) and a data section of 1,456 channel bits (728 bits (=91 bytes) if expressed in the data bits prior to modulation). The data section of the leading sync frame contains ID information (a sector number), IED (error-detecting codes for the ID) information, and main data.

The lower 22 bits of the sync pattern of 32 channel bits is set as "0001000000000000010001", which is a unique pattern not appearing in the data.

The data section of each sync frame in the left of FIG. 32 has main data recorded thereon, and the data section of the last sync frame in the left of the figure has PO (parity) information recorded thereon. The sync frames in the right of FIG. 32 have main data and PI information recorded thereon, the last but one sync frame in the right of the figure has EDC and PI (parity) information recorded thereon, and the last sync frame has PO and PI information recorded thereon.

Figure 33:
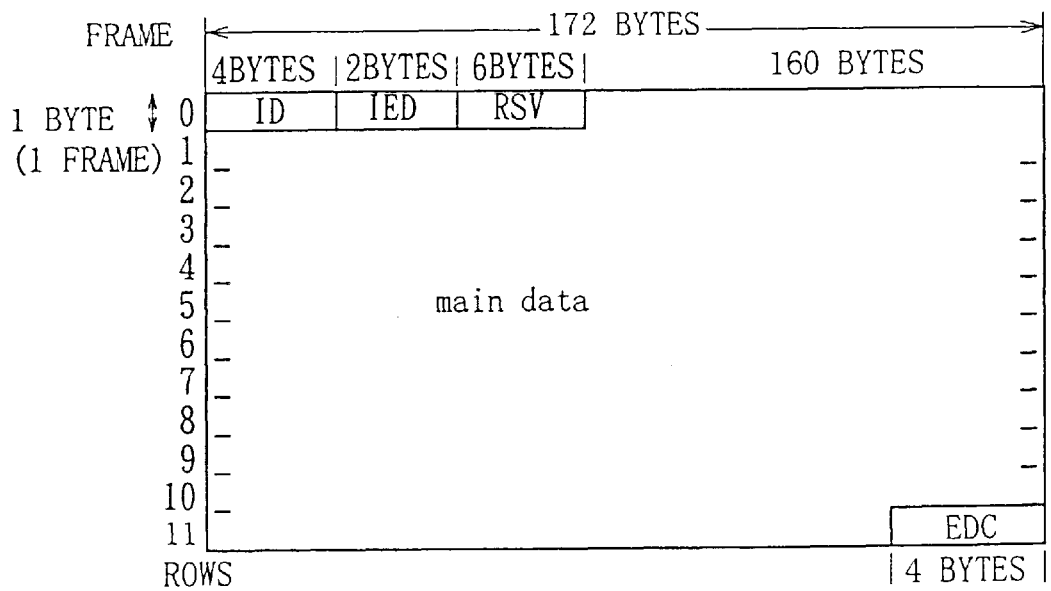
FIG. 33 is a schematic chart showing the configuration of sector data according to the second embodiment.

FIG. 33 shows the detail of the data in each sector excluding the PI and PO information. The data in one sector comprises an ID (a sector number) (4 bytes), an IED (error-detecting codes (2 bytes) for the ID), an RSV (a reserved area) (6 bytes), main data, an EDC (4 bytes). The main data is scrambled.

Sixteen such data sectors are collected, and PO codes of 16 bytes and PI codes of 10 bytes are added to them as shown in FIG. 28. The PO codes are interleaved among the 16 rows so as to be located in each data sector. The data obtained has added thereto FS (frame synchronization) codes expressed by sync codes SYx (x=0, 1, 2, . . . , 7) as shown in FIG. 30, and is then EFM+-demodulated. This allows the physical sector in the ECC block to consist of 13×2 sync frames as shown in FIG. 32. Since one ECC block is composed of 16 sectors, the lower 4 bits of the physical sector address is any one of 0000 to 1111. As a result, the lower 4 bits of the physical address of the leading sector of the ECC block is 0000.

The main data is scrambled by exclusively logically adding together the main data and scramble data generated using as the initial value a value specified by the lower 4 to 7 bits of the physical sector address.

Various symbols are used for various signals herein and described below.

block-top (Block Top)
This signal becomes H at the beginning of a sector when an SYLK signal is H.

C11M (Clock 11.2896 MHz)
A system operation clock that has a frequency of 11.2896 MHz.

DSTB (Data strobe)
A data strobe signal that is H while main data is being output as stream data SD.

ECA (ERR Correction Address)
An error correction address indicating the position (address) of an error.

ECCK (ECC Clock)
An operation clock for the ECC core circuit 138.

ECD (Error Correction Data)
Error correction data that becomes correct data when exclusively logically added to erroneous data.

ECDE (ECC Code Data End)
A controller signal indicating the end of input data.

ECOD (ECC Code ERR)
This signal is H when the error is found to be uncorrectable.

ECOR (ECC Correction)
A strobe signal indicating the output of data with correctable data (ECA, ECD).

ECYE (ECC Cycle End)
A controller signal indicating the end of a cycle of input code data.

EDT (ECC Data)
Data that is read from the RAM 137 and transferred to the ECC control circuit 36 for error correction.

ESTB (Error Strobe)
An error correction results strobe signal that is H during the transfer of the error correction results ER.

ESTT (ECC Start)
A controller signal indicating the beginning of input data.

EFM+W Frame (EFM+Write Frame Counter)
This signal represents a main frame to be written to the RAM 137.

HDEN (Header Data Enable)
A strobe signal for sector header data.

main-FMSY (main Frame Sync)

This signal is H at the main sync (leading sync) of each PI row.

MWEN (Memory Write Enable)
This signal enables EFM+-demodulated data to be written to the RAM 137.

MWRQ (EFM Write Request)
This signal requests a write of EFM+-demodulated data to the RAM 137.

OUTE (Output Flag)
An interpolation (output) flag.

OSTT (ECC Output Start)
This signal is output 477 ECCKs after an ESTT in a specified code sequence.

RDT (Read Data)
Data on a read data bus to the RAM 137.

SALK (Sector Address Lock)
This signal indicates that the sector addresses (IDs) have been detected correctly.

SAUL (Sector Address Unlock)
A signal that has an opposite polarity to the SALK signal.

SCSY (Sector Sync)
This signal becomes H at an SY0 Frame to indicate the beginning of a sector.

SD (Stream Data)
Stream data (decode output data).

SDCK (Stream Data Clock)
A stream data clock.

SFLG (Sector Flag)
An ECC uncorrectable flag for PI1 corrections.

SINF (Sector Information)
A sector information strobe signal that becomes H at the beginning of a sector.

SUB (SUB Data)
Data that is transferred to the SBCD circuit 134 and which includes an ID and an IEC.

SYLK (Sync Lock)
This signal becomes H when three sync codes have been continuously detected.

SYUL (Sync Unlock)
This signal has an opposite polarity to the SYLK signal.

WDT (Write Data)
Data on a write data bus to the RAM 137.

XHWE (Sector Header Write Enable)
This signal enables the output of sector information that is to be written from the SBCD circuit 134 to the RAM 137.

Figure 34:
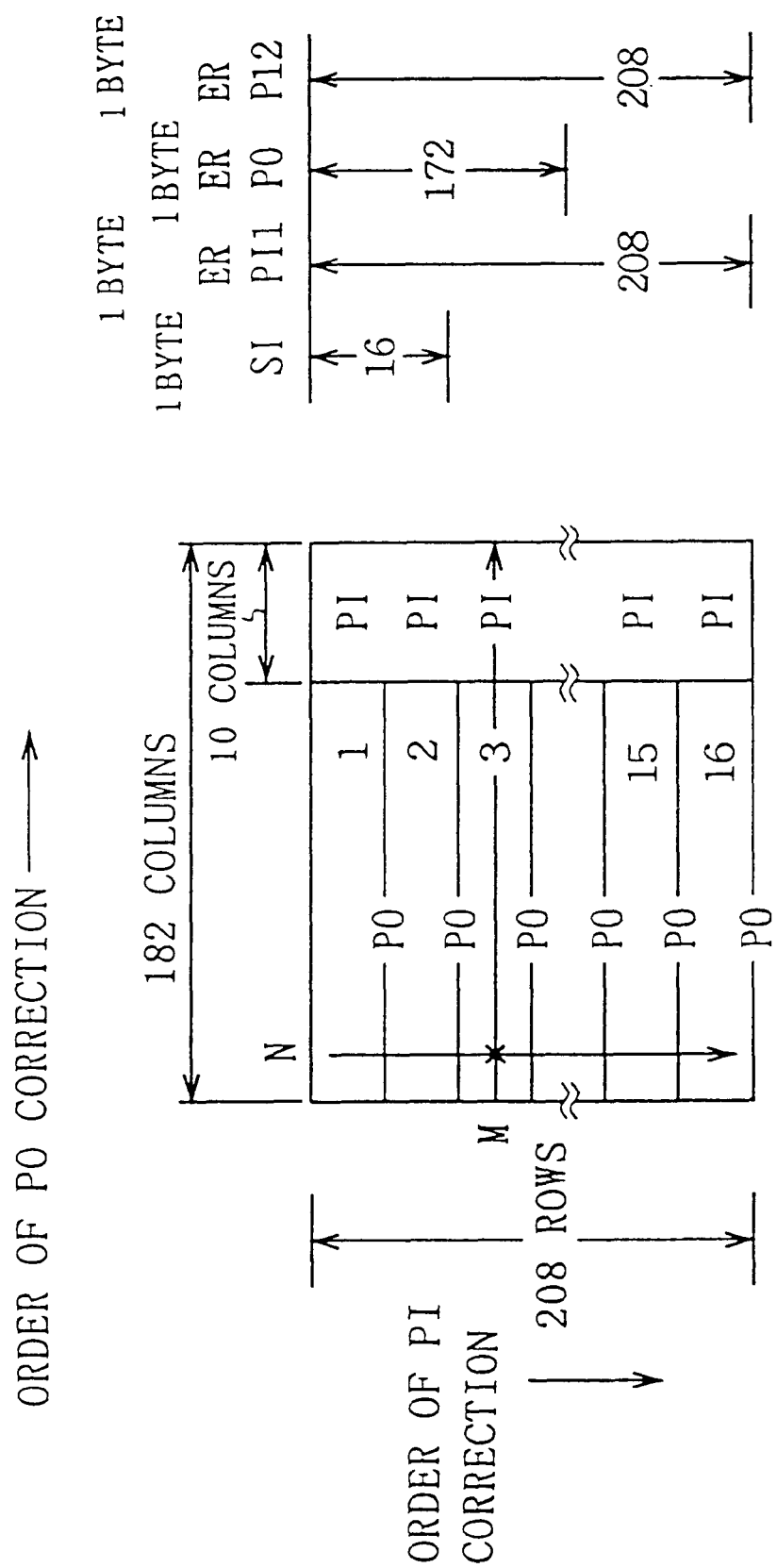
FIG. 34 is a schematic chart describing how data is stored in the RAM according to the second embodiment.

Data demodulated by the EFM+ demodulating circuit 131 (FIG. 31) is stored in the RAM 137 under the control of the RAM controller 135, as shown in FIG. 34. This figure shows one ECC block. In reading data stored in the RAM 137, the RAM controller 35 can obtain desired data by specifying the values of a row and a column as shown in FIG. 34. That is, in FIG. 34, data (x) in the N-th byte in the M-th row can be read from the RAM 137 by specifying two values (M, N).

When the SBCD circuit 134 recognizes the beginning of a sector of the data recorded on the optical disc 2 based on the type and continuity of sync codes, data demodulated by the EFM+ demodulating circuit 131 is sequentially stored in the RAM 137 beginning with the leading data. FIGS. 35A to 35F show the timing of signals for major components of related circuits.

Figure 36:
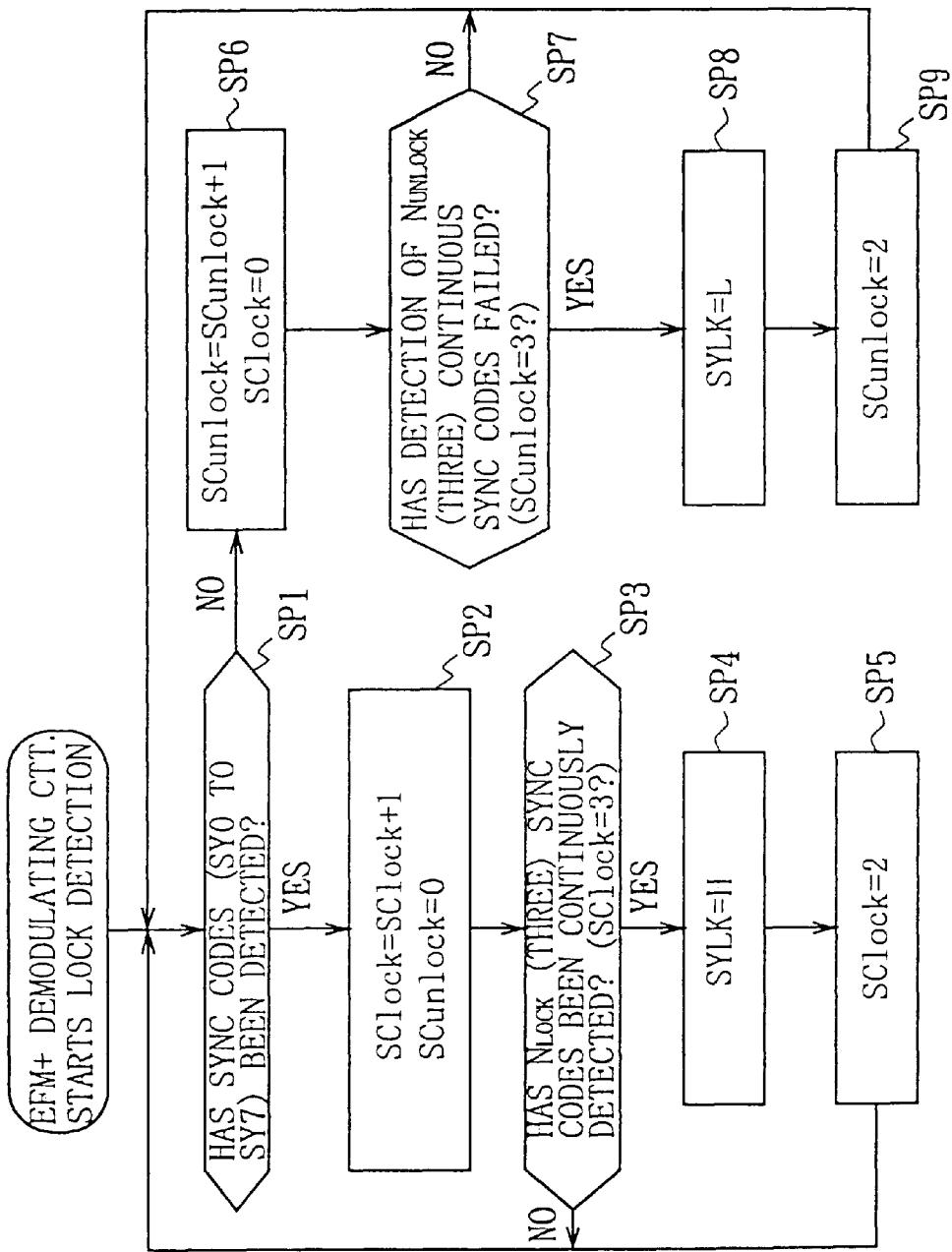
FIG. 36 is a flow chart showing a lock detection procedure according to the second embodiment.

The EFM+ demodulating circuit 131 detects a sync lock state as shown in FIG. 36. First, it is determined in step SP1 whether or not the sync codes (SY0 to SY7) shown in FIG. 32 have been detected in each sync frame. If so, the process proceeds to step SP2 to increment a variable SClock by one and to set a variable $SC_{unlock}$ at zero. The variable SClock indicates the number of continuously detected sync codes, and the variable $SC_{unlock}$ indicates the number of continuous failures to detect sync codes.

Next, it is determined in step SP3 whether or not the variable SClock is equal to 3. That is, it is determined whether or not three sync codes have been continuously detected. If the variable SClock is smaller than 3, the process returns to step SP1 to repeat the subsequent processing. If it is determined in step SP3 that the variable SClock is equal to 3, it is determined that the sync lock state has been initiated and the SYLK signal is set to H in step SP4. In step SP5, the process sets the variable SClock at 2 and returns to step SP1 to repeat the subsequent processing so as to further determine whether or not three sync codes have been continuously detected.

If, however, it is determined in step SP1 that no sync code has been detected, the process proceeds to step SP6 to increment the variable $SC_{unlock}$ by one and to set the variable $SC_{lock}$ at zero. It is determined in step SP7 whether or not the variable $SC_{unlock}$ is equal to 3. That is, it is determined whether the detection of a sync code has continuously failed three times. If the detection of a sync code has continuously failed twice, the process returns to step SP1 to repeat the subsequent processing. If the detection of a sync code has continuously failed three times, the process proceeds to step SP8 to set the SYLK signal to L. The process further passes to step SP9 to set the variable $SC_{unlock}$ at 2. If no sync code is detected at the next sync code generation point, the variable $SC_{unlock}$ is set at 2 to hold the SYLK signal to L. The process then returns to step SP1.

In this manner, the EFM+ demodulating circuit 131 detects the sync codes to monitor whether or not sync is locked.

Although the above embodiment sets the number of reference detection or failure times at 3, the number of continuous detection times $N_{LOCK}$ and the number of continuous failure times $N_{UNLOCK}$ can be each set at an arbitrary value.

Figure 37:
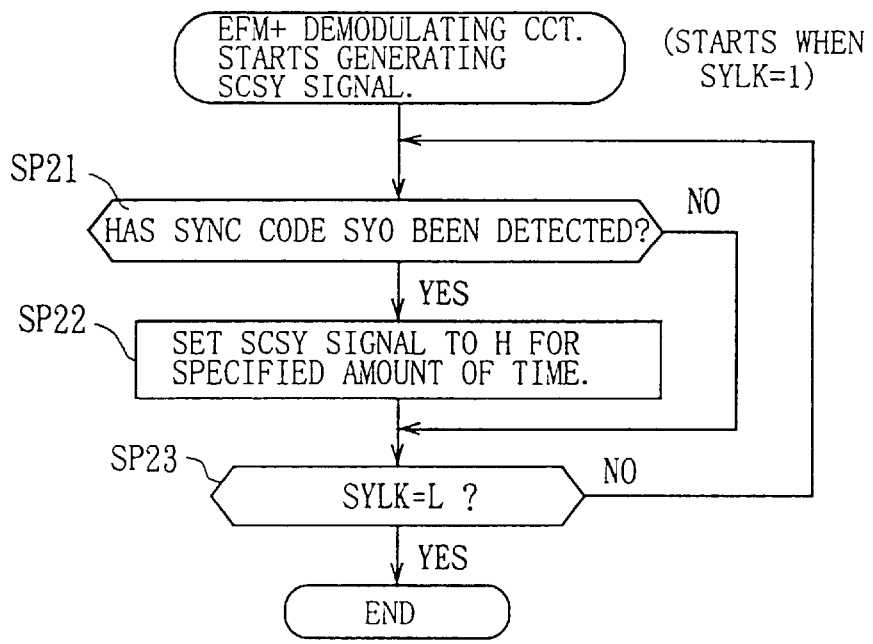
FIG. 37 is a flow chart showing a SCSY signal generation procedure according to the second embodiment.

In this way, the EFM+ demodulating circuit 131 executes the processing shown in the flowchart in FIG. 37 when the SYLK signal becomes H, that is, the lock state is initiated, as described above. It is determined in step SP21 whether or not the sync code SY0 located at the beginning of each sector has been detected. If so, the process passes to step SP22 to set the SCSY signal indicating the beginning of the sector, to H for a specified period of time. The process then proceeds to step SP23 to determine whether the SYLK signal has changed to L, and if not (that is, the signal remains H), the process returns to step SP21 to repeat similar processing. If it is determined in step SP21 that the sync code SY0 has not been detected, the processing in step SP22 is skipped.

As described above, the EFM+ demodulating circuit 131 generates the SCSY signal at the beginning of each sector shown in FIG. 35A.

Figure 38:
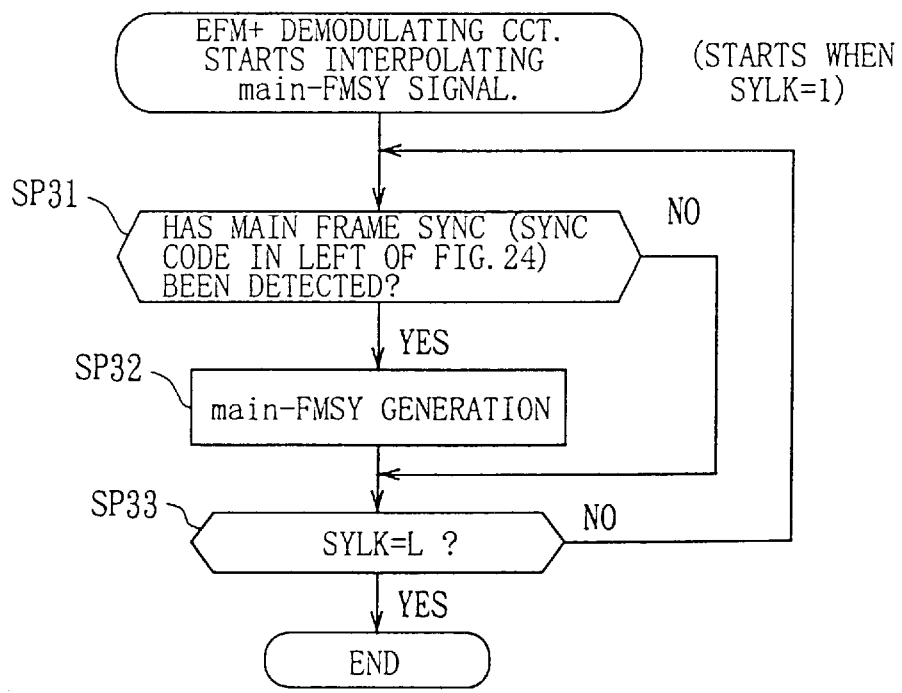
FIG. 38 is a flow chart showing a main-FMSY signal generation procedure according to the second embodiment.

Furthermore, when the SYLK signal becomes H, the EFM+ demodulating circuit 131 carries out the processing shown in the flowchart in FIG. 38. First, it is determined in step SP31 whether or not the sync code (those sync codes which are shown in the left of FIG. 32 are referred to as "main frame syncs") in the main frame (two horizontal sync frames in FIG. 32 are collectively referred to as a "main frame") has been detected. If so, the process passes to step SP32 to cause the EFM+ modulating circuit 131 to generate the main-FMSY signal shown in FIG. 35B. If it is determined in step SP31 that no main frame sync has been detected, the processing in step SP32 is skipped.

The process then proceeds to step SP33 to determine whether or not the SYLK signal has changed to L, and if not (that is, the signal remains H), the step returns to step SP31 to repeat the subsequent processing. If the SYLK signal has changed to L, the generation of the main-FMSY signal is aborted.

In this manner, the EFM+ demodulating circuit 131 generates the main-FMSY signal every main frame sync period (the period of two horizontal sync frames in FIG. 32).

When the SCSY signal is input by the EFM+ demodulating circuit 131, the RAM controller 135 sets the MWEN signal to H as shown in FIG. 35D, and allows the initiation of a write of the currently detected sector data to the RAM 137. In this case, the RAM controller 135 uses a built-in EFM+W Frame counter (not shown) to count the main frame shown in FIG. 32, as shown in FIG. 35E. This count value indicates the ascending main frame numbers shown in FIG. 32, beginning from the top of the main frames.

The RAM controller 135 also uses a built-in PI1 Frame counter (not shown) to manage main frame numbers transmitted to the RAM 137 as shown in FIG. 35F.

When the data in the first main frame shown in FIG. 32 (the main frame numbered 0 (the main frame in the top row in FIG. 32)) is written to the RAM 137, the ECC control circuit 136 is supplied with this data in the main frame under the control of the RAM controller 135. The ECC control circuit then transfers the data to the ECC core circuit 138 to allow the circuit to correct errors. That is, PI1 processing is executed. After the PI1 correction, the data is written back to the RAM 137.

After the PI1 correction (first PI correction), the RAM controller 135 reads the ID and IED data (SUB) from the data in the main frame numbered 0 stored in the RAM 137, and transfers it to the SBCD circuit 134 via a data bus with the timing of the SUB signal numbered 0 in FIG. 35C. The ID and IED data is located only at the beginning of each sector as shown in FIG. 32, so this transfer is executed only from the main frame numbered 0. The SBCD circuit 134 then detects the address (ID) of the physical sector.

The lower 4 bits of the address of the detected physical sector allows the leading sector of the ECC block to be detected.

FIGS. 39A to 39H are timing charts showing the detection of block-top following the transfer of the ID, and FIGS. 40A to 40H show the processing subsequent to the detection of block-top. These operations are described below.

FIGS. 41A to 41F are timing charts showing the timing for the transfer of the ID in more detail. As shown in FIG. 41A, the RAM controller 135 outputs to the SBCD circuit 134 the HDEN signal indicating the timing with which the ID and IED data is read from the RAM 137. At this point, the ID (4 bytes) and IED (2 bytes) data is transferred from the RAM 137 to the SBCD circuit 134 in synchronism with a clock C11M (FIG. 41F) of a frequency of 11.2896 MHz as read data RDT (FIG. 41C) comprising 8 bits from the seventh to zero-th bits. The SFLG signal (=1), which has been supplied to the ECC control circuit 136 from the ECC core circuit 138, indicates that the ID and IED data has been able to be corrected by the PI1 correction (if it is uncorrectable, the SFLG signal is H). On receiving the ID (the sector address), the SBCD circuit 134 generates sector information SI corresponding to this ID (the sector) according to instructions (such as a generation mode for interpolation flags, a start sector, and an end sector) from the host CPU 140. For example, for the sector with the ID specified by the host CPU 140 as data to be output, sector information bit 5 is set at 1, and bit 4 is set at 0.

FIG. 42 shows the configuration of the sector information (SI). As shown in this figure, each bit of the sector information has the following information.

Bit 7: Setting of an interpolation flag (OUTF) generation mode (1: Interpolation flag generation mode)

Bit 6: Leading sector of an ECC block (1 when the lower 4 bits of a physical sector address are 0) (1: Leading sector)

Bit 5: Start sector (1 when a physical sector address matches a start sector address specified by the host CPU 140) (1: Start sector)

Bit 4: End sector (1 when a physical sector address matches an end sector address specified by the host CPU 140) (1: End sector)

Bit 3: Bit 3 of a descramble initialization address (the seventh bit of a physical sector address)

Bit 2: Bit 2 of a descramble initialization address (the sixth bit of a physical sector address)

Bit 1: Bit 1 of a descramble initialization address (the fifth bit of a physical sector address)

Bit 0: Bit 0 of a descramble initialization address (the fourth bit of a physical sector address)

After the ID of 4 bytes and the IED of 2 bytes have been used for checking as described below with reference to FIGS. 44 to 46, the XHWE signal shown in FIG. 41D is set to L by the ECC control circuit 136. At this point, the sector information SI is transferred and written from the SBCD circuit 134 to the RAM 137 as write data WDT of 8 bits. The sector information for 16 sectors is stored so as to correspond to the 16 PI rows located above, as shown in FIG. 34. Thus, by specifying the number of a specified PI row, the corresponding sector information can be obtained.

Figure 43A:
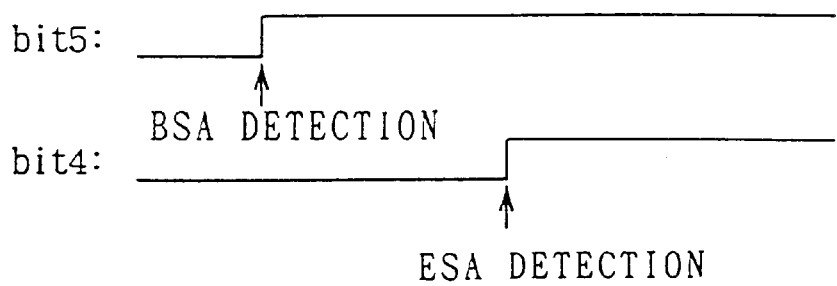
FIGS. 43A and 43B are timing charts describing the sector address setting according to the second embodiment.

In the actual sector detection, as shown in FIG. 43A, the host CPU 140 sets the BSA setting mode to the register (not shown) in the SBCD circuit 134 and set the leading address BSA and the end address ESA of the desired sector, the register (not shown) in the SBCD circuit 134 picks up them from the reproduction data and compares them with the sector address in which the sector address FW is locked. It is determined from the compared result that the detected sector address is the desired address, the compared result is written back in the RAM 137 as the sector information (bits 4 and 5).

Further, the sector information is output to the OCTL 139 with the ECC decoded data which is ECC-decoded by the ECC circuit 50, and is used for controlling at the time of outputting the ECC decoded data. At the time, the host CPU 140 track-jumps the disc access position to a position ahead of the desired sector on the optical disc 2 taking the interleaving of ECC into account.

In addition, if the host CPU 140 does not specify the desired sector at this time, the BSA setting mode is canceled beforehand, thereby data can be output from the time of reading the ECC decoded data.

Out of the sector information, the bits 4 and 5 are referred in the OCTL 139, when the bits 4 and 5 in the sector information are respectively "0" and "1", that is, when the sectors from the sector address BSA to the sector address ESA have been detected, data of the sectors desired by the host CPU 140 can be output. In this case, when the sector address ESA is not designated, the bit 0 is kept "0". During keeping the bit 0 "0", the ECC decoded data is continued to be output to the ring buffer memory 10. In this case, for example, the output of data may be controlled regardless the state of the bits 0 and 1 by using the data output control register (not shown) which is provided in the OCTL 139.

Figure 43B:
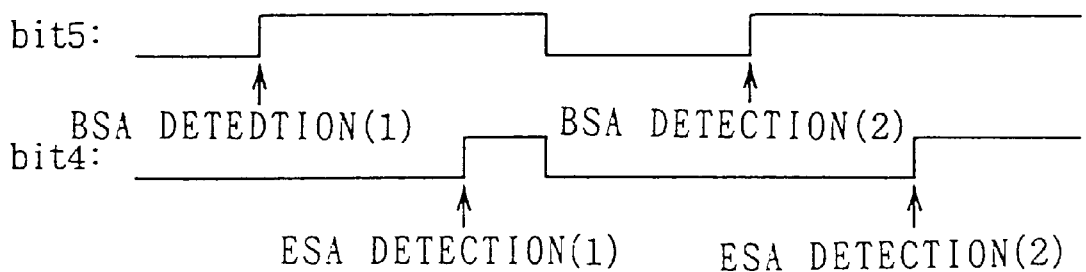

As shown in FIG. 43B, the start sector address BSA and the end sector address ESA can be set again by the host CPU 140 after track-jumping in addition to the time of track-jumping. For example, in the case where the access position on the disc is approached, for example, in the case where unnecessary data is skipped at the fast forwarding operation, the sector address BSA and ESA are set again after confirming the current sector address SA. Thereby, data can be output from the sector address BSA without track-jumping.

Next, how the SBCD circuit 134 checks the ID and IED is described with reference to the flowcharts in FIGS. 44 to 46.

Figure 44:
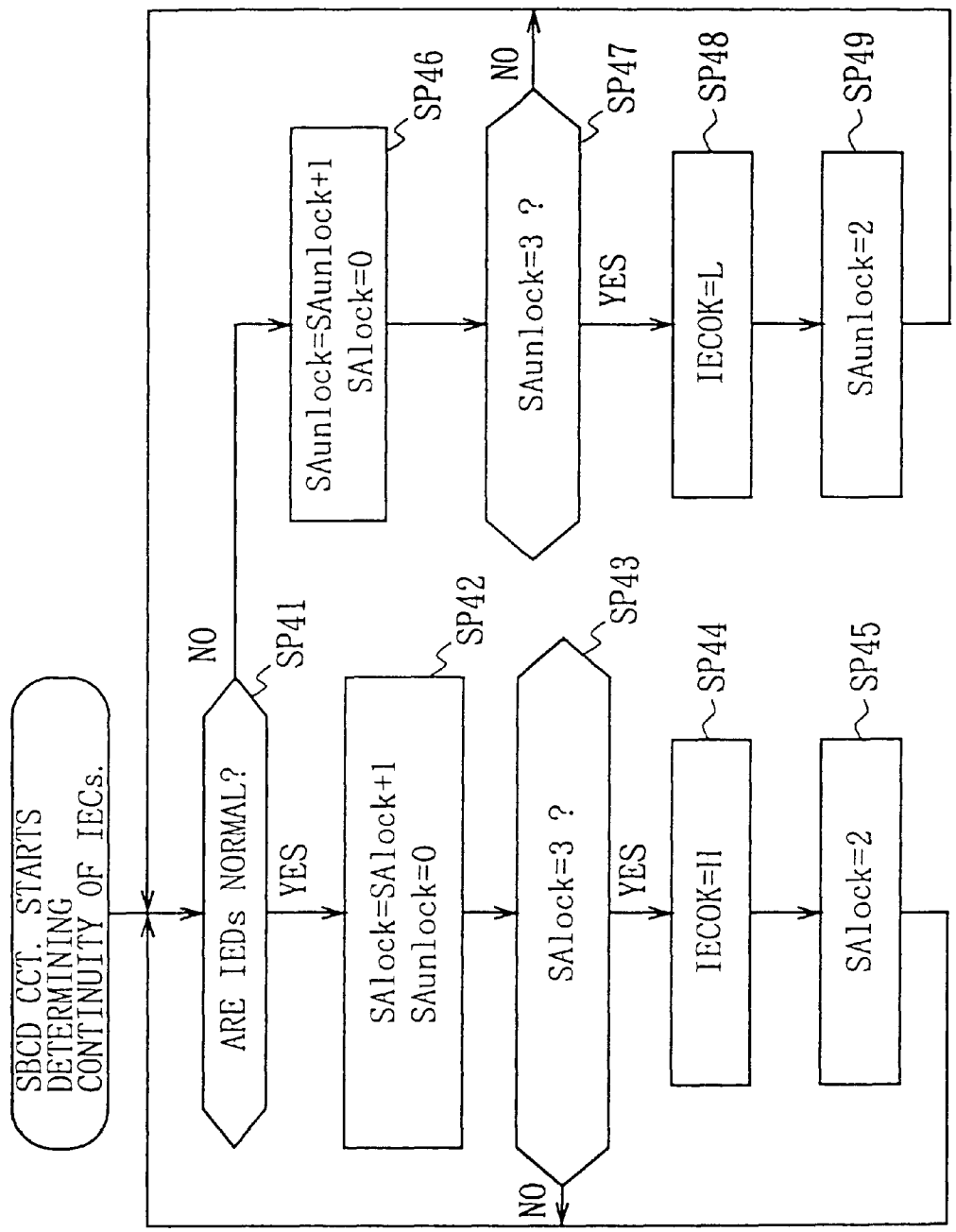
FIG. 44 is a flowchart showing an IEC continuity detection and determination procedure according to the second embodiment.

The SBCD circuit 134 carries out the processing shown in the flowchart shown in FIG. 44 to determine whether or not there are N (in this embodiment, 3) continuous sectors the IED check results of which are normal (there are no errors in the ID).

Thus, it is determined in the first step SP41 whether the IED check obtained is normal. If so, the process proceeds to step SP42 to increment by one a variable $SA_{lock}$ indicating the number of sectors with a normal ID. The process also sets to zero, a variable $SA_{unlock}$ indicating the number of continuous sectors with an abnormal ID (there is an error in the ID).

The process then proceeds to step SP43 to determine whether or not the variable $SA_{lock}$ is equal to 3. If the variable $SA_{unlock}$, which has been incremented in step SP42, is determined not to be equal to 3, the process returns to step SP41 to repeat the subsequent processing. If the variable $SA_{lock}$ is determined to be equal to 3 in step SP43, that is, three sectors with a normal ID have been continuously reproduced, the process passes to step SP44 to set a flag IECOK to H. In step SP45, the process sets the variable $SA_{lock}$ at 2 and returns to step SP41 to repeat the subsequent processing so as to detect the number of continuous normal results of subsequent IED checks.

If the IEC is determined to be abnormal in step SP41, the process passes to step SP46 to increment the variable $SA_{unlock}$ by one and to set the variable $SA_{lock}$ at zero. It is then determined in step SP47 whether or not the variable $SA_{unlock}$ is equal to 3, and if not, the process returns to step SP41 to repeat the subsequent processing.

If the variable $SA_{unlock}$ is determined to be equal to 3 in step SP47, that is, three sectors with an abnormal IED check result have been continuously detected, the process proceeds to step SP48 to set the flag IECOK to L. If the following IED check produces an abnormal result in the subsequent step SP49, the process sets the variable $AS_{unlock}$ at 2 and returns to step SP41 to repeat the subsequent processing so as to detect three continuous sectors with an abnormal IED check result.

As described above, the SBCD circuit 134 sets the flag IECOK to H if three or more continuous IED checks produce a normal result, while it sets the flag IECOK to L if three or more continuous IED checks produce an abnormal result.

Figure 45:
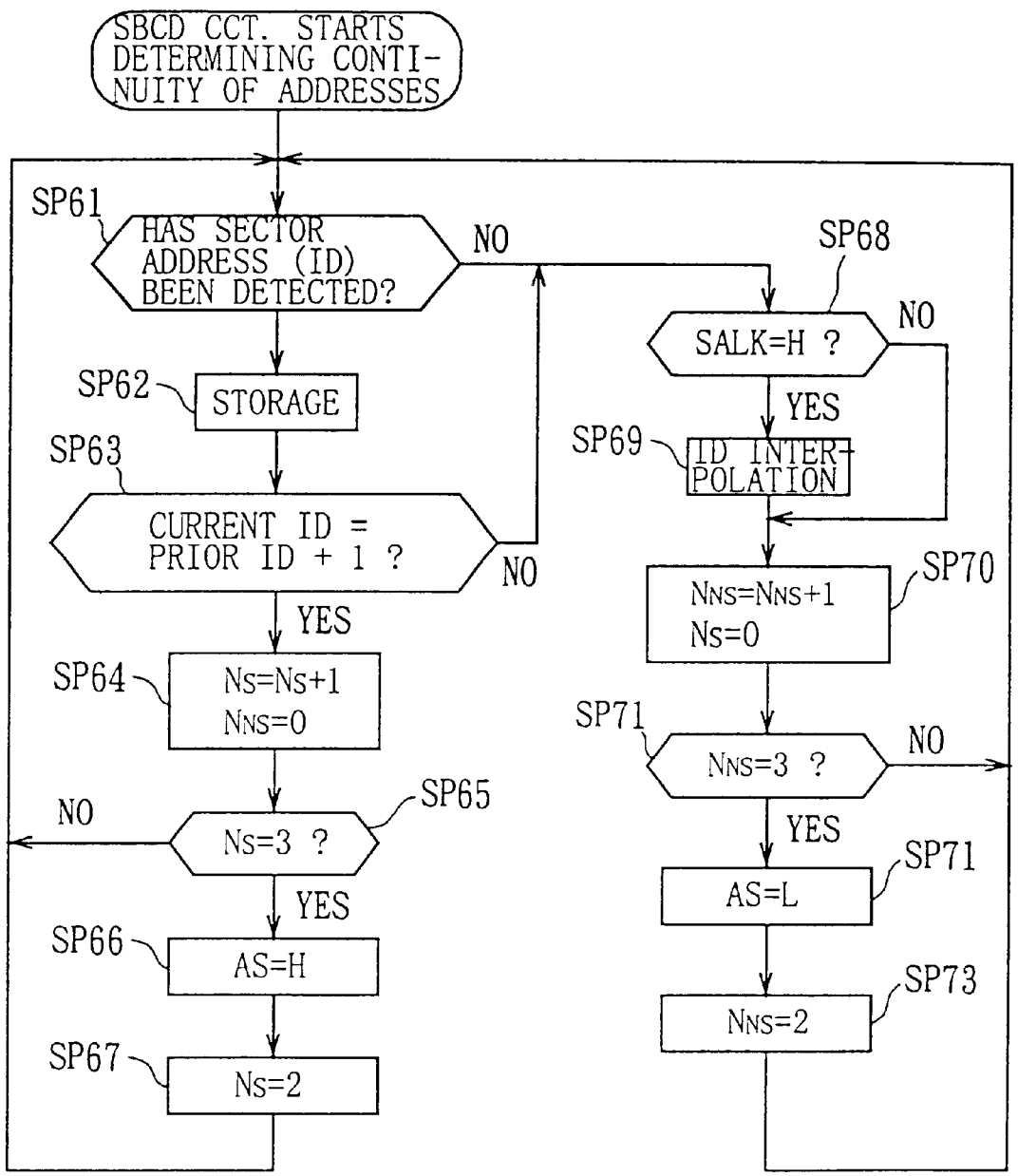
FIG. 45 is a flowchart showing an ID (address) continuity determination procedure according to the second embodiment.

The SBCD circuit 134 further executes the processing shown in FIG. 45 to determine the continuity of the IDs (the addresses). The ID of the sectors in one ECC block shall be sequentially incremented by one. This continuity is determined as follows.

First, it is determined in step SP61 whether or not an ID (a sector address) has been detected. If so, the process proceeds to step SP62 to store the ID so as to compare it to the subsequent ID. It is then determined in step SP63 whether or not the current ID is larger than that detected last and stored in step SP62, by one. If so, the process proceeds to step SP64 to increment by one a variable $N_S$ indicating that correct IDs have been continuously detected. The process also sets at zero a variable $N_{NS}$ indicating that no ID has been detected or that detected IDs are not continuous.

It is then determined in step SP65 whether or not the variable $N_S$ is equal to 3, and if not (that is, the detection of three continuous IDs each incremented by one has failed), the process returns to step SP61 to repeat the subsequent processing. If the variable $N_S$ is determined to be equal to 3, the process passes to step SP66 to set to H a flag AS indicating that continuous IDs are in the normal condition. If the subsequent ID is detected in step SP67, the process sets the variable $N_S$ at 2 and returns to step SP61 to repeat the subsequent processing so as to further detect that three continuous correct IDs have been detected.

If no ID has been detected in step SP61 or the currently detected ID is not larger than the prior ID by one (the IDs are determined not to be continuous) in step SP63, the process proceeds to step SP68 to determine whether or not the flag SALK is H. The flag SALK is described below with reference to FIG. 32, and set to H when three or more continuous IED checks produce a normal result and when the continuity of three or more IDs are retained.

If the flag SALK is determined to be set to H in step SP68, the process proceeds to step SP69 to interpolate the IDs. That is, since no ID has been detected or the detected IDs are not continuous, 1 is added to the prior ID to generate a new ID, which is used instead of the detected ID. If the flag SALK is set to L, such interpolation is not executed, and the processing in step SP69 is skipped.

Next, in step SP70, the variable $N_{NS}$ is incremented by one and the variable $N_S$ is set at zero. It is determined in step SP71 whether or not the variable $N_{NS}$ is equal to 3, and if not, the process returns to step SP61 to repeat the subsequent processing. If, however, the variable $N_{NS}$ is determined to be equal to 3, the process passes to step SP72 to set the flag AS to L. If the subsequent ID is not detected in step SP73, the process sets the variable $N_{NS}$ at 2 and returns to step SP61 to repeat the subsequent processing so as to further detect three continuous failures to detect IDs.

As described above, the SBCD circuit 134 sets the flag AS to H when the IDs are continuous, whereas it sets this flag to L when the IDs are not continuous.

The SBCD circuit 134 uses the two flags IECOK and AS generated in the above manner in order to generate the flag SALK.

That is, it is determined in step SP81 in FIG. 46 whether or not the flag IECOK is H, and if so, the process proceeds to step SP82 to determine whether or not the flag AS is H. If it is determined in step SP82 that the slag AS is H, the process passes to step SP83 to set the flag ASLK to H.

If the flag IECOK is determined to be L in step SP81 or the flag AS is determined to be L in step SP82, the process passes to step SP84 to set the flag SALK to L.

As described above, the SBCD circuit 34 sets the flag SALK to H if three or more continuous IECs are normal and if three or more continuous IDs are each incremented by one, whereas it sets this flag SALK to L if three or more continuous IECs are abnormal or if the detection of three continuous IDs has failed.

The host CPU 140 detects the position irradiated with laser beams (the access position on the optical disc 2) by referencing the condition of SALK and the ID data described above.

The results of PI1 corrections can be added to the condition for $SA_{lock}$ or $SA_{unlock}$ in FIG. 44. Furthermore, although the number of times for $SA_{lock}$ or $SA_{unlock}$ is set at 3, it may be set at a different value by the host CPU 140.

If SYLK becomes L (SYUL=H) when SALK=L (SALK=H), both the write of EFM+-demodulated data from the EFM+ demodulating circuit 31 to the RAM 37 and ECC control are reset. The unlock state is subsequently canceled (SAUL=L) and SYLK becomes H. A write of the EFM+-demodulated data is then resumed to the RAM 137.

Unlock can be compulsorily executed by the host CPU 140. For example, the host CPU 140 can initiate the unlock state after a track jump in order to reset ECC control.

The unlock state can be canceled either by the host CPU 140 or automatically without the intervention of the host CPU 140.

If SYLK=H (locked state) and the bit 6 of the sector information is 1 (the beginning of the sector), the SBCD circuit 134 holds block-top to H until SYLK becomes L (the lock is released) as shown in FIGS. 39A to 39H. If block-top=L, the value of EFM+W frame changes from 12 to zero once both SCSY and main-FMSY have become H (the beginning of the sector). That is, in this case, the value of EFM+W frame repeatedly changes from 0 up to 12 for each main frame.

If, however, block-top=H, the value of EFM+W frame continues to be incremented even after it has reached 13, as shown in FIGS. 40A to 40H. As a result, the data in the main frames of each ECC block is sequentially stored in different addresses of the RAM 137, as shown in FIG. 34.

The EFM+-demodulated data is subsequently and similarly written to the RAM 137 while PI1 corrections are carried out. Once the PI1 correction of the data in one ECC block (208 rows of data) has been finished, ECC processing in the direction of PO columns is executed (PO corrections).

To read data in the direction of the PO columns, the PO rows must be deinterleaved (FIG. 29). Thus, if the column corresponding to the N-th byte shown in FIG. 34 is read, the data in this column is read downward while the interleaved PO rows are being skipped, and the codes in only the PO rows in the same column corresponding to the N-th byte are read and supplied to the ECC core circuit 138.

Once the ECC core circuit 138 has finished the PO correction (all the columns except the (10) PI columns at the right end of FIG. 34, that is, 172 columns have been processed), PI2 corrections (second PI correction) are carried out. ECC processing in the direction of the PI rows is executed twice in order to improve the error correction performance.

In the PO correction, erasure corrections are carried out depending on an error flag (a PI1 flag) generated on the basis of the results of the PI1 correction. In PI2 corrections, erasure corrections are also carried out using an error flag (a PO flag) generated on the basis of the results of the PO correction. These erasure corrections are executed to improve the error correction performance as described above.

The PI sequence of data, for which the PI2 correction has been finished, is transferred from the RAM 137 to the OCTL circuit 139, in which the main data is descrambled for each sector using the bit 3 to bit 0 of the sector information shown in FIG. 42. In addition, the OCTL circuit 139 executes EDC-related calculations. Based on the results of these calculations and the presence of an error flag added to the main data, it is determined whether or not there is any error in the desired sector. Based on the result of determination, the host CPU 140 determines whether or not data should be read again from the optical disc 2. If so, the host CPU 140 attempts again to access the optical disc 2. Otherwise, the data in the sector containing errors is output to the multiplexed data separation circuit 13 (FIG. 7).

The ECC core circuit 138 comprises general Reed-Solomon code error correction LSIs for which the code length, the number of parities, and the correction mode (either normal corrections only or both normal and erasure corrections) can be programmed. The ECC core circuit 138 also enables multi-coded and continuously coded data (a plurality of code sequences of difference code lengths) to be decoded in real time. Reed-Solomon code error correction LSIs include, for example, CXD307-111G commercially available from SONY (trademark), and an ASIC (Application Specialized Integrated Circuit) formed using these LSIs is called an ECC core. The ECC core is used in the ECC core circuit 138 shown in FIG. 31.

FIGS. 47A to 41D show the timing of signals during an error correction operation. In this figure, SETT (FIG. 47A) is a control signal indicating the beginning of the codes (the PI or PO row), and ECDE (FIG. 47B) is a control signal indicating the end of the codes (the PI or PO row). ECYE (FIG. 47C) is a control signal indicating the end of a code (the PI or PO row) cycle. These signals are supplied from the RAM controller 135 via the ECC control circuit 136 to the ECC core circuit 138. The ECC core circuit 138 uses these control signals to identify data supplied from the RAM 137.

As shown in FIGS. 47A to 41D, the PI codes are transferred during 182 ECCKs between ESTT and EDCE. The PO codes are also transferred during 208 ECCKs between ESTT and ECDE.

If the code in the PI row and the code in the PO column have different code lengths, data to be corrected (EDT) and the error flags for erasure corrections (the PI1, PI2, and PO flags) can be input with the same timing regardless of the code sequence, as shown in FIG. 36, by adapting the code cycle length to the longer of the PI row and PO column code lengths (in this embodiment, 208 of the PO column code). Arbitrary values can be set for parameters such as the code length and the number of parities. That is, when a setting is changed, supplying a new setting data to the ECC core circuit 138 allows this circuit to automatically change the internal setting based on the supplied data when ESTT becomes H.

The results of data corrections are output using a 477 ECCK cycle as shown by the following equation.

$$\text{throughput}=2\times\text{NCYC}+3\times\text{PCYC}+13=2\times208+3\times16+13=477(\text{ECCK})$$

In the above equation, NCYC represents the longer of the PI row and the PO column code lengths, and PCYC represents the larger number of parities. As shown in FIGS. 47A to 47D, OSTT (FIG. 47D) is output from the ECC core circuit 138 to the ECC control circuit 136 later than the timing of ESTT (FIG. 47A by the time required for a data output cycle (when the results of corrections are output). In this embodiment, OSTT is delayed 477 ECCKs relative to ESTT.

If error detection has been executed and a detected error is found to be correctable, the ECC core circuit 138 outputs O. CODEERR (FIG. 48G)=L to the ECC control circuit 136 when OSTT (FIG. 48E) becomes H. Then, 8 bit data indicating an error pattern (data to which the erroneous data is exclusively logically added to obtain correct data) ECD [7:0] (FIG. 48H) and an error position (8 bit data indicating a position (an address) in which the error is occurring) ECA[7:0] (FIG. 48I) are output when ECOR (FIG. 48F) is H.

In the erasure correction mode, the error position ECA [7:0] (FIG. 48I) data corresponding to the position to which an error flag EFLG (FIG. 48C) is input is ensured to be output, but if the data in that position is correct, then the error pattern EDC[7:0]=00 (H).

If the error is uncorrectable, OSTT (FIG. 48E) switches to H, O.CODEERR (FIG. 48G) simultaneously switches to H, and ECOR (FIG. 48F) is subsequently prevented from becoming H, though not shown in this timing chart. In addition, the output of ECOD (FIG. 48G) is latched until OSTT (FIG. 48E) changes to H again, while ECOR (FIG. 48F), ECD[7:0] (FIG. 48H), and ECA[7:0] (FIG. 48I) continue to be output until OSTT (FIG. 48E) changes to H again.

FIGS. 49A to 49E, 50A to 50E, and 51A to 51E are timing charts showing control provided during ECC processing. PI1-R, PO-R, and PI2-R shown in FIGS. 49B, 50B, and 51B each indicate the timing with which PI1 (first PI correction), PO (PO correction), and PI12 (second PI correction) sequences of data EDT[7:0] and EFLG (FIG. 48C) for which errors will be corrected is transferred from the RAM 137 via the ECC control circuit 136 to the ECC core circuit 138.

As shown in FIGS. 49A, 50A, and 51A, the MWRQ signal is supplied 182 times to write the data EFM+W (182 bytes of data) in one PI row from the EFM+ demodulating circuit 131 to the RAM 137, so the EFM+-demodulated data in one PI row is written to the RAM 137. While the data in one PI row is being written, the data in an ECC block which has already been written to the RAM 137 is read and transferred to the ECC core circuit 138 via the ECC control circuit 136. That is, while the data in one PI row is being written to the RAM 137 at a low speed, the data in another PI row or a PO column which is already written is read three times at a high speed. If the data in the PI row at the beginning of the sector is transferred, the subcode data (the ID and IEC) is also read. The write and read are carried out in such a way that when one of them is executed, the other remains suspended.

If, for example, the PI1 correction of an ECC block is executed, the data in one PI row is read during the period of time in which a write of the data in one PI row is executed. That is, the data in one PI row is read from the RAM 137 and transferred to the ECC core circuit 138 via the ECC control circuit 136. Although in FIGS. 49B, 50B, and 51B, 208 ECCKs are used to read the data PI1-R for the PI1 correction, this number of ECCCKs is adapted to the length of the PO column which is the longest data length, and only 182 ECCKs are actually used for data transfer in order to transfer the data in PI row whereas the rest is not.

Figure 52:
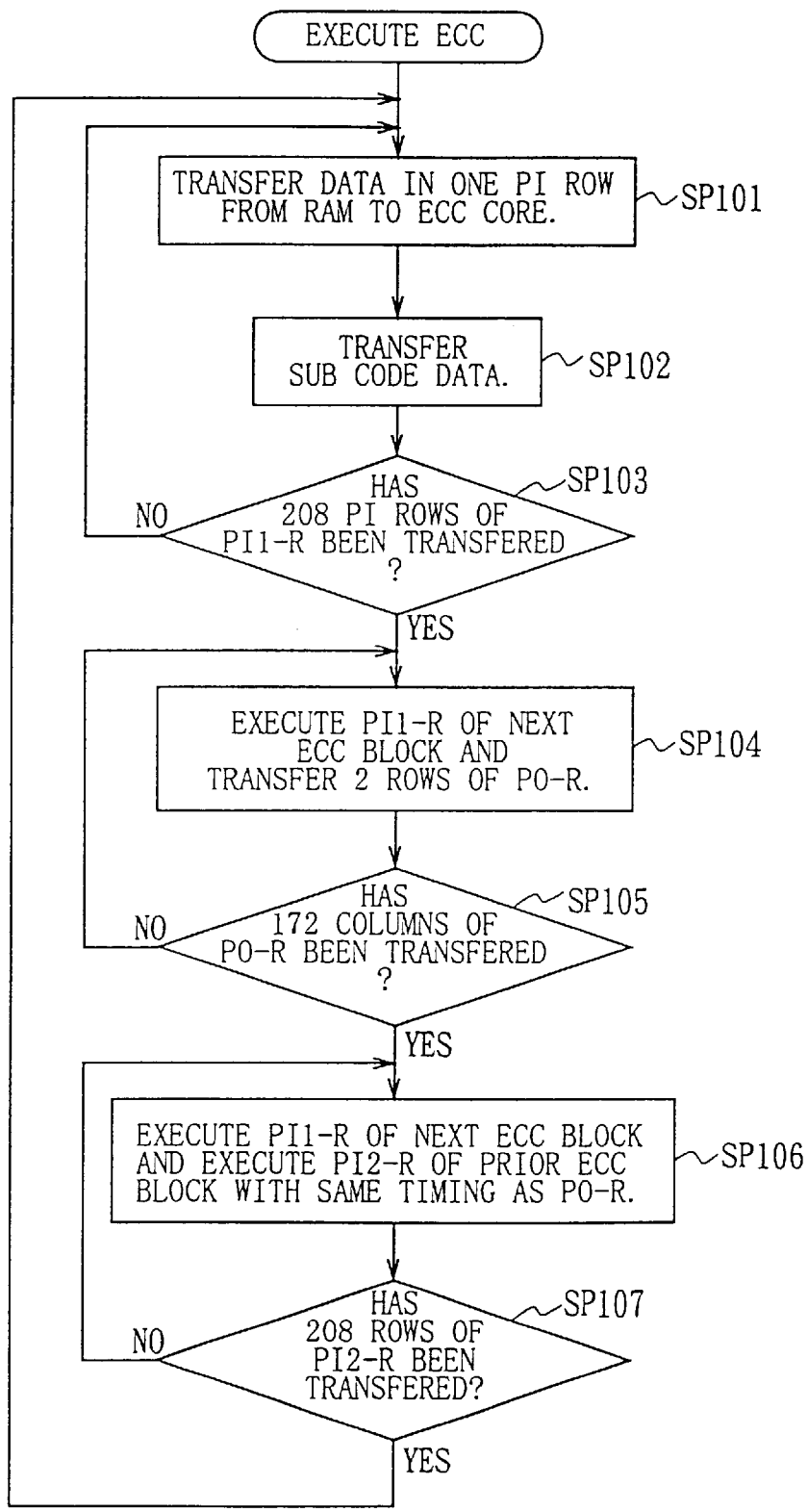
FIG. 52 is a flowchart showing how a RAM controller executes ECC processing according to the second embodiment.

FIG. 52 shows a procedure used by the RAM controller 135 to write and read data to and from the RAM 137 in order to execute ECC corrections. In step SP101, the RAM controller 135 transfers the data in one PI row from the RAM 137 to the ECC core circuit 138. In this embodiment, PI codes (a parity) and P codes (a parity) are added to each ECC block, so until the correction and write-back of the first PI sequence of data from a first ECC block has been finished, the PO sequence of data PO-R or the PI2 sequence of read data PI2-R from the same ECC block cannot be transferred. In this case, no data is transferred during the subsequent 2×208 ECCKS. Then, if there is subcode data (SUB) following the above data, it is transferred.

The RAM controller 135 thus sequentially transfers the data in one PI row of the first ECC block and when required, the subcode data in steps SP101 and SP102 in FIG. 52, determines in step SP103 whether or not the PI1-R data in 208 rows of the first ECC block has been transferred, and repeats the processing in steps SP101, SP102, and SP103 until the affirmative result is obtained. If the result of step SP103 is affirmative, this means that the transfer of all the data in 208 PI rows of the first ECC block has been completed. The RAM controller 135 then passes to step SP104 to initiate the transfer of PI1-R from a second ECC block following the first ECC block and of PO-R from the first ECC block during the subsequent 182 MWRQs.

That is, during the subsequent 182 MWRQs, PI1-R from the second ECC block following the first ECC block is first transferred, and PO-R from the first ECC block is then transferred twice (the PO data in two columns is transferred).

These operations are performed during each period of 182 MWRQs. Once the PO data in 172 columns of the first ECC block has been transferred, the RAM controller 135 obtains an affirmative result in step SP105 in FIG. 52, and transfers the PI2 sequence of data PI2-R from the first ECC block in the subsequent step SP106, as shown in FIGS. 51A to 51E. The data PI2-R is transferred with the same timing with which the data PO-R of the first ECC block shown in FIG. 50B is transferred. At this point, the data PI1-R belongs to the next ECC block (the second ECC block). The PI2-R in 208 PI rows of the first ECC block is transferred in this manner, and when the processing of the PI1-R, PO-R, and PI2-R of the first ECC block is finished, the RAM controller 135 obtains an affirmative result in step SP107 in FIG. 52, and returns to step SP101 to continue processing the next ECC block.

ECCK (FIG. 48A) is output from the RAM controller 135 to the ECC core circuit 138 only during data transfer. In addition, the results of the correction of transferred data are output 477 clocks (ECCK) after their input, as described above. Thus, the results of the determination of whether a sequence of data contains an error (FIGS. 49C, 50C, and 51C) are output when the next but two from this sequence is transferred (FIGS. 49B, 50B, and 51B). This output is stored in an ERR FIFO circuit 136B (FIG. 53) described below.

When data to be error-corrected is input from the RAM 137 to the ECC control circuit 136 as described above, the circuit 136 executes the PI1 correction of the data in one PI row and outputs the results 477 ECCKs later (FIGS. 49C, 50C, and 51C). The results are transferred to and temporarily stored in the ERR FIFO 136B used as a buffer for the ECC control circuit 136 described below. This data is further read from the ERR FIFO 136B, transferred back to the RAM 137 as data for which error corrections have been completed, and written thereto as data PI1-W as shown in FIGS. 50D and 51D. Data for which the PO or PI2 correction has been completed is also written to the RAM 137 as data PO-W or PI2-W, respectively.

The data for which error corrections have been completed as described above is further read for each PI row using a period of 182 SDCKs and output from the OCTL circuit 139, as shown in FIGS. 49E, 50E, and 51E.

Figure 53:
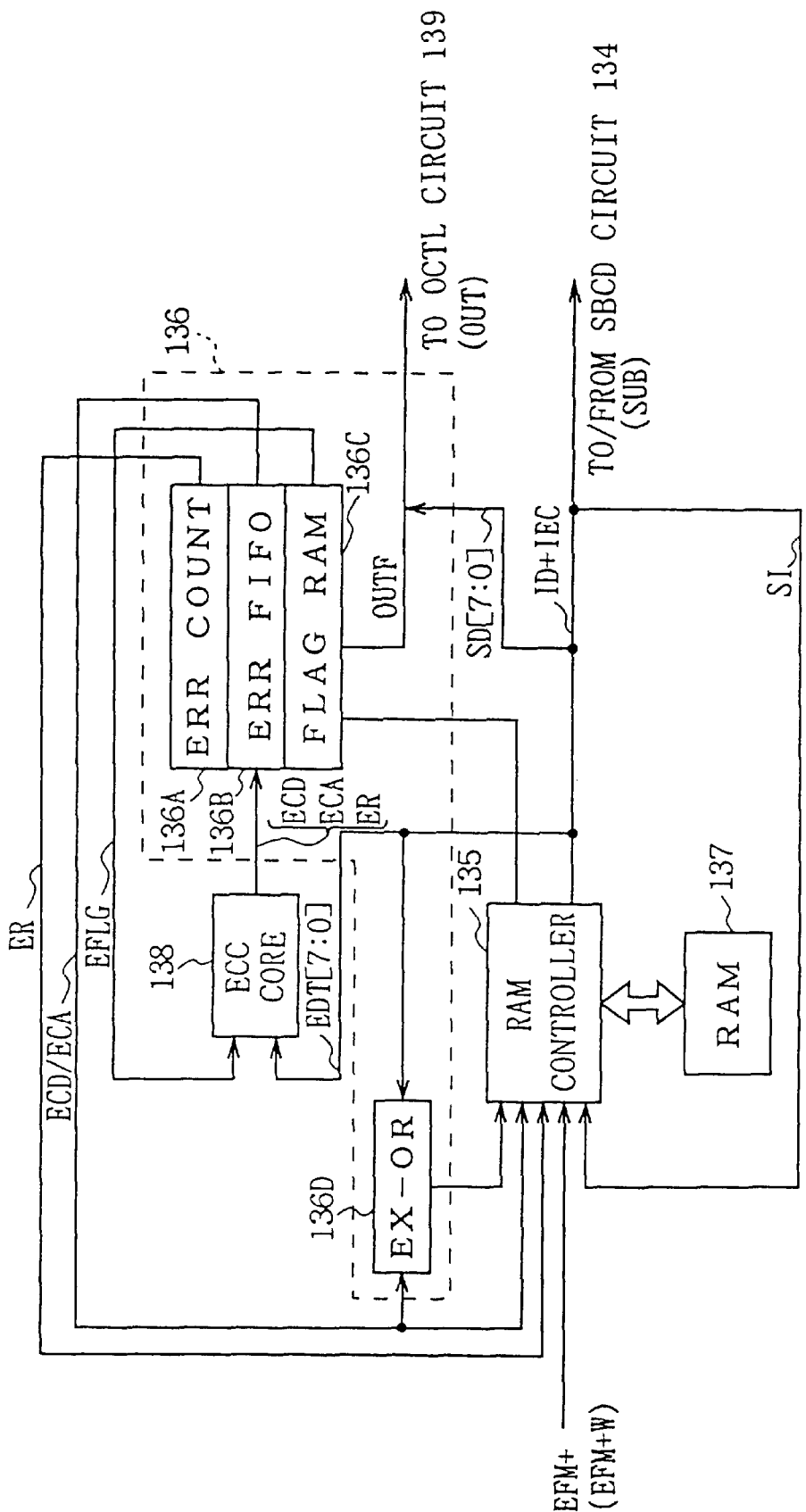
FIG. 53 is a block diagram showing the configuration of an error correction circuit system according to the second embodiment.

FIG. 53, in which the same components as in FIG. 31 has the same reference numerals, is a block diagram showing the flow of signals when errors are corrected. The ECC control circuit 136 comprises an ERR COUNT 136A, an ERR FIFO 136B, a FLAG RAM 136C, and an EX-OR circuit 136D.

Demodulated data output from the EFM+ demodulating circuit 131 is written to the RAM 137 under the control of the RAM controller 135. The SUB data (the ID and IEC) stored at the beginning of each sector is read from the RAM and transferred to the SBCD circuit 134. The SBCD circuit 134 generates sector information SI as shown in FIG. 42. The sector information is transferred from the SBCD circuit 134 and written to the RAM 137.

The RAM controller 135 supplies the data in one PI row which is written to the RAM 137 (the storage means), to the ECC core circuit 138 via the ECC control circuit 136 (the error correction means) (in FIG. 53, EDT data is directly supplied to the ECC core circuit 138 for convenience of illustration) as error correction data EDT comprising groups of 8 bits. When the data in one PI row is supplied to the ECC core circuit 138, the circuit 138 uses the PI codes to generate 8 bits of error correction data ECD (FIG. 48H) and 8 bits of an error correction address ECA (FIG. 48I). The error correction data ECD and the error correction address ECA are transferred and written from the ECC core circuit 138 to the ERR FIFO (First In First Out) 136B in the ECC control circuit 136.

Next, to actually correct the error, the RAM controller 135 reads the data EDT in that PI row and supplies it to the EX-OR circuit 136D. The EX-OR circuit 136D is supplied with the error correction data ECD and the error correction address ECA from the ERR FIFO 136B. The EX-OR circuit 136D corrects the error by exclusively logically adding together the error correction data ECD and the data EDT read from the RAM controller 135 at the bit specified by the error correction address ECA. The data, the error in which has been corrected, is written back to the RAM 137 via the RAM controller 135.

In addition, the ECC core circuit 138 produces from the ECD and ECA an error correction result ER comprising 8 bit data as shown in FIG. 54, and supplies it to the ERR COUNT 136A in the ECC control circuit 36, in which it is stored. The error correction result ER of one byte is written to the RAM 137 via the RAM controller 135 so as to correspond to that PI row as shown in FIG. 34.

Each bit of the 8 bit data in the error correction result ER shown in FIG. 54 stores the following information.
Bit 7: Uncorrectable (0: Correctable/1: Uncorrectable) (1 if the errors in the sequence are found to be uncorrectable)
Bit 6: PO (0: PI/1: PO) (an informative bit for determining whether or not the sequence is from a PI row or a PO column)
Bit 5: PI2 (0: PI1/1: PI2) (an informative bit for determining whether or not the sequence is a PI1 or a PI2 sequence)
Bit 4: The number of corrections (the value of the fifth bit (MSB) of the number of error corrections)
Bit 3: The number of corrections (the value of the fourth bit of the four bits indicating the number of error corrections)
Bit 2: The number of corrections (the value of the third bit of the four bits indicating the number of error corrections)
Bit 1: The number of corrections (the value of the second bit of the four bits indicating the number of error corrections)
Bit 0: The number of corrections (the value of the first bit of the four bits indicating the number of error corrections)

The error flag (the PI1 flag) (bit 7 of the error correction results ER) indicating the result of the determination of whether or not the data has not been able to be corrected by the PI1 correction is stored in the ERR COUNT 136A as part of the error correction results ER and in the FLAG RAM 136C (the flag storage means).

Such a PI1 correction is executed for the 208 PI rows shown in FIG. 34.

The RAM controller 135 then reads the 208 bytes of data in the first PO column from the RAM 137 and supplies it to the ECC core circuit 138 via the ECC control circuit 136 as the EDT. The PI1 flag that has been written to the FLAG RAM 136C are also read and supplied to the ECC core circuit 138. The ECC core circuit 138 uses the pattern PO and the PI1 flag to generate an ECD and an ECA for normal or erasure corrections. The ECD and ECA are supplied from the ECC core circuit 138 to the ERR FIFO 136B in the ECC control circuit 136 and stored therein. The error correction results ER for this PO column which are generated by the ECC core circuit 138 on the basis of the ECD and ECA are also transferred to and stored in the ERR COUNT 136A. The PO flag corresponding to the bit 7 of the error correction results ER is also written to the FLAG RAM 136C.

The data EDT in this PO column, which has been read from the RAM 137, is supplied to the EX-OR circuit 136D. The EX-OR circuit 136D is also supplied with the ECD and ECA from the ERR FIFO 136B. The EX-OR circuit 136D corrects the error by exclusively logically adding the ECD and EDT together so as to correspond to the bits of the address specified by the ECA. The data, for which the error has been corrected, is written back to the RAM 137.

In addition, the error correction results ER for this PO column are read from the ERR COUNT 36A and written to the RAM 137. The error correction results ER for this PO column are sequentially written to the positions corresponding to the 172 PI rows beginning from the top as shown in FIG. 34.

Such a PO correction is executed for the 172 PO columns.

If a PI2 correction is carried out, after the PI1 and PO corrections, the data in the first PI row is read from the RAM 137 as the EDT and supplied to the CC core circuit 138. The PO flag that has been written to the FLAG RAM 136C are also read and supplied to the ECC core circuit 138. The ECC core circuit 138 uses this PO flag and the parity PI to generate an ECD and an ECA and supply them to the ERR FIFO 136B in the ECC control circuit 136.

The ECD and ECA which have been written to the ERR FIFO 136B and the data in the PI column supplied to the EX-OR circuit 136D and read from the RAM 137 are exclusively logically added together to correct the error. The data, for which the error has been corrected, is written back from the EX-OR circuit 136D via the RAM controller 135 to the RAM 137.

The ECC core circuit 138 also produces error correction results ER from the ECD and ECA and supplies them to the ERR COUNT 136A in the ECC control circuit 136, in which they is stored. The PI2 flag corresponding to bit 7 is also written to the FLAG RAM 136C.

The error correction results ER for the PI2 row which have been written to the ERR COUNT 136A are read therefrom and written to the RAM 137. The error correction results ER for the PI2 row are written to the positions each corresponding to each of the 208 PI rows as shown in FIG. 34.

Such a PI2 correction is executed for the 208 PI columns.

FIGS. 55A to 55G are timing charts showing bus arbitration for accesses to the RAM 137. In this figure, EFMREG (FIG. 55A) is a signal output to the RAM controller 135 by the EFM+ demodulating circuit 131 to request a write of EFM+-demodulated data to the RAM 137. OUTREG (FIG. 55B) is a signal output to the RAM controller 135 by the OCTL circuit 139 to request a read of ECC-processed data from the RAM 137. ECCREG (FIG. 55C) is a signal output to the RAM controller 135 by the ECC control circuit 136 to access to the RAM 137 in order to transfer data to the ECC core circuit 138 to allow it to correct errors or in order to obtain error-corrected data, or output to request a SUB transfer (an ID and an IEC) to the SBCD circuit 134.

The RAM controller 135 presets priority levels for these three signals, and sequentially outputs an ACK (acknowledge) signal to the RAM 137 according to the priority levels if these requests are simultaneously submitted. EFCKC (FIG. 55D), OUTACK (FIG. 55E), and ECCACK (FIG. 55F) are acknowledge signals for EFMREG, OUTREG, and ECCREG, respectively. According to this embodiment, the priority levels are set in the order of OUTREG, EFMREG, and ECCREG. Thus, the RAM controller 135 outputs an ACK signal for the corresponding REG signal according to the priority levels, as shown in FIGS. 55A to 55G. These signals are received in synchronism with C11M (FIG. 55G) used as a system clock.

As described above, according to this invention, an access to the RAM 137 is granted in response to EFMREG, ECCREG, or OUTREG during each specified cycle. This cycle, however, can be changed according to the configuration or type of the RAM 137 or the access speed.

FIG. 56 shows the number of accesses to the RAM 137 which are required to execute the PI1, PI2, and PO corrections of the data in one ECC block. As shown in this figure, the number of accesses to the RAM 137 which are required to execute PI1, PO, and PI2 corrections is 214,716 per ECC block, and the average value per main frame is 1,033. For example, the number of accesses to the RAM 137 during a write of EFM+-demodulated data is 182 per main frame, and the ECC execution cycle length is 208 bytes (208 main frames), so 37,856 (=182×208) accesses are required per block. The above value is obtained by calculating the number of required accesses for each operation and adding together all the values obtained.

FIGS. 57A to 57F are timing charts showing the timing for the output of error correction results data ER from the RAM 137 via the OCTL circuit 139. In this figure, the time base for the portion prior to the 182 SDCKs shown in FIGS. 49E, 50E, and 51E is extended. SDCK (FIG. 57A) designates a clock signal used to output ER as stream data. SINF (FIG. 57B) is a sector information strobe signal that becomes H at the beginning of a sector and which indicates that transferred data is sector information (SI). ESTB (FIG. 57C) is an error correction results strobe signal that, upon becoming H, indicates that error correction results ER will be transferred. In each PI row, one byte is assigned to each of the error correction results ER for the PI1, PO, and PI2 sequences, so the results data occupies three bytes in total. Since this data is output in the order in which it is stored as shown in FIG. 34, the sequence with which a particular result is associated can be identified by checking bits 5 and 6 (FIG. 54) of the data. For the PI rows for which the results of PO corrections are not output, ESTB becomes L when such results are output.

DSTB (FIG. 57D) is a data strobe signal that is H when a signal SD[7:0] (FIG. 57E) is main data. Three of these signals, SINF, ESTB, and DSTB are generated by the OCTL circuit 139. The sector information SI and the error correction results ER are output immediately before the data in the direction of the PI rows is output using 182 SDCKs, as shown in FIG. 57E.

OUTG (the interpolation flag) (FIG. 57F) is an error flag for main data which is added to main data before output based on the PI and PO uncorrectable error flags stored in the FLAG RAM 136C in FIG. 53.

The OCTL circuit 139 determines from the bits 4 and 5 (FIG. 42) of the sector information generated by the SBCD circuit 134 whether or not the data in the sector for which decoding has been finished should be output. The bits 4 and 5 of the sector information indicate an end and a start sectors, respectively, as shown in FIG. 42. The OCTL circuit 139 thus outputs sector data with bit 4=0 and bit 5=1 as the data in the specified sector (the data in which should be output).

The OCTL circuit also determines whether, for example, the presence of error flags for the main data or the EDC results meets conditions preset by the host CPU 140, and if so, outputs decode data. Otherwise, it stops outputting decode data and informs the host CPU 140 of the error.

For example, data output conditions are as follows:

(1) The data shall be specified as one to be output.

(2) No errors shall be detected from the ECC results.

(3) No error flags shall be added to the main data.

If these output conditions have been set, data meeting all these conditions is finally output. In addition, despite these conditions, the host CPU 140 can compulsorily prohibit outputs.

Figure 58:
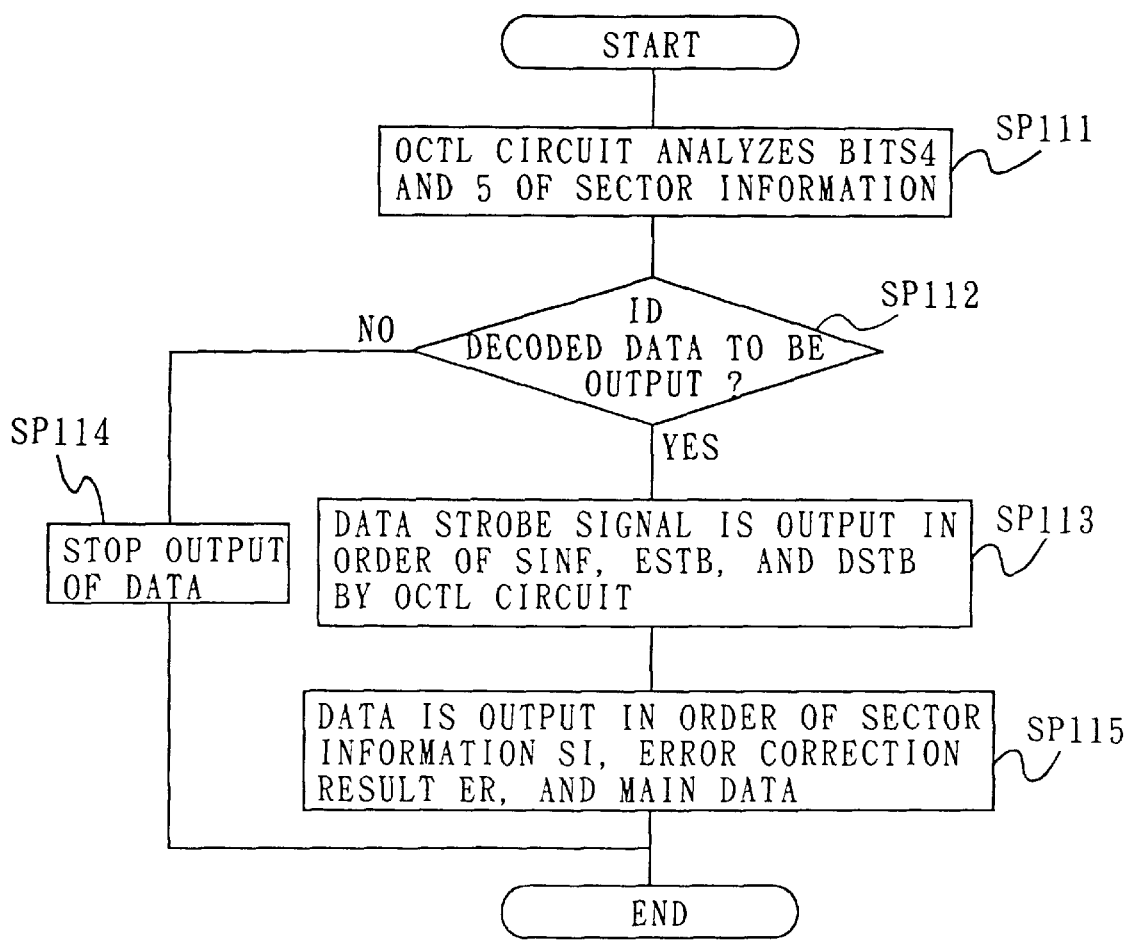
FIG. 58 is a flow chart describing the output of the sector data according to the second embodiment.

The OCTL circuit 139 sequentially outputs the main data, the sector information SI, and the error correction result ER in accordance with the sector data output procedure shown in FIG. 58.

First, the OCTL circuit 139, at step SP111, analyzes the result of the end sector detection which is stored in the bit 4 in the sector information SI (FIG. 42) and the result of the start sector detection which is stored in the bit 5, and then determines that a sector data having the bit 4 of zero and the bit 5 of one is the sector data to be output.

At next step SP112, when it is determined that the decode data is not the data to be output, the procedure proceeds to step SP114 to stop the output of data. On the contrary, when it is determined that the decode data meets the output condition and is the data to be output, the procedure proceeds to step SP113.

The OCTL circuit 139, at step SP113, generates a strobe signal of each output data and outputs a strobe signal SINF (FIG. 57B) of the sector information SI, a strobe signal ESTB (FIG. 57C of the error correction result ER, and a strobe signal DSBT (FIG. 57D) of the main data in order. As a result, at next step SP115, the OCTL circuit 139 outputs data in order of the sector information SI, the error correction result ER, and the main data (D0, D1, D2, . . . ). When all sector data are output, the sector data output procedure is terminated.

(2-3) Operations and Effects of the Second Embodiment

In the above configuration, the data transferred from the RAM 137 to the ECC core circuit 138 during a period of 182 MWRQs (PI1-R, PO-R, and PI2-R (FIGS. 49A to 49E, 50A to 50E, and 51A to 51E) is read from the RAM according to the transfer clock (ECCK). In this case, by stopping the transfer clock (ECCK) for a specified period of time between the data transfer periods (PI1-R, PO-R, and PI2-R), the transfer of the data (PI1-R, PO-R, and PI2-R) is stopped during this stop period. That is, a period of time in which data is not transferred can be formed between the sequences of data (PI1-R, PO-R, and PI2-R).

In the stop period, after executing the PI1 corrections (PI1-W), the RAM controller 135 reads the sector address information (ID) stored in the main frame of number zero in the RAM 137 and the error detection code (IED) to the ID at a timing of the SUB (FIGS. 49B and 51B) and transfers them to the SBCD circuit 134. When the SBCD circuit 134 detects the sector address information ID, the SBCD circuit 134 compares the start sector address BSA and the end sector address ESA of its sector with the sector address of the desired address to be output which is designated beforehand by the host CPU 140. That is, when the sector is the desired sector, the bit 5 in the sector information SI is set to "1" to show the start sector address BSA of the desired address, and the detection bit 4 of the end sector address ESA is set to "0". After the bits 4 and 5 in the sector information SI are set to show whether the sector data, in which the sector address information ID is detected, is the desired sector or not, the SBCD circuit 134 stores the sector information SI in a small area, provided in the RAM 137, so as to correspond to the predetermined PI row.

The RAM controller 135 transfers the sector data, which is decoded by the ECC circuit 50 when the EFM+-demodulated data is written in the RAM 137, to the OCTL circuit 139.

When the OCTL 139 detects the sector information SI from the transferred sector data, the OCTL 139 determines based on the bits 4 and 5 in the sector information SI whether or not the sector data is the desired sector, and controls the output to the next stage of the ring buffer memory 10.

In this way, the SBCD circuit 134 detects the start sector address BSA and the end sector address ESA, generates the sector information SI showing whether the sector is the desired sector set beforehand by the host CPU 140 or not, and stores it in the small area which is provided in the RAM 137. Thereby, at the time of outputting the decoded data, the OCTL circuit 139 can control the output of the decoded data on the basis of the sector information SI.

Thereby, for example, the comparison step for comparing the detected sector address with the sector address of the desired sector which is set beforehand by the host CPU 140 on the basis of the detected sector address information ID can be omitted.

According to the above configuration, in the case where the main data of the ECC-decoded ECC block data is output to the next stage of the ring buffer 10, information showing whether or not the sector data is the desired sector is recorded beforehand in the bits 4 and 5 in the sector information SI at ECC-decoding, so that a step for comparing the sector address information ID with the sector address of the desired sector again to detect whether data should be output or not can be omitted.

Thus, in the case where the ECC decoded data is output for each sector, a circuit for detecting the sector address information ID from the ECC decode data and comparing it with the sector address is unnecessary to be provided, thereby the overall circuit configuration can be simplified and the access to the sector data can be speedily and surely executed.

Further, according to the above embodiment, the sector information SI is stored in a small area provided in the RAM 137, thereby a memory for detecting sector is unnecessary to be provided specially, thus capacity of a memory can be saved.

Furthermore, according to the above embodiment, the PI and PO sequences of the data is blocked and ECC-processed, thereby without waiting for finishing decoding of the diagonal directional C2 sequence extend to the next ECC block as ECC coding of the C1 and C2 sequences, it can be determined at once whether or not data can be output to the ring buffer memory 10 at the time of finishing the decode of the ECC block.

(3) Other Embodiment

In the above embodiment, data is coded by the C1/C2 convolutional Reed-Solomon code, or by adding the error correction inner codes in the direction of the rows and adding the error correction outer codes in the direction of the columns is decoded, however the present invention is not limited thereto and coded data to which the error correction codes is added by interleaving or cross-interleaving can be decoded.

In addition, in the above embodiment, the coded data is used as the error code, the present invention is not limited thereto and can be applied for decoding generally coded data.

Further, in the above embodiment, coded data which is recorded on the optical disc 2 is decoded and reproduced by the data reproduction apparatus 40, however, the present invention is not limited thereto and can be applied for reading the coded data from a recording medium in which the coded data is recorded, and decoding and reproducing it.

As described above, according to the present invention, in the middle of decoding coded data recorded in the recording medium, data information of data to be read is detected and stored in a data information storage means, thereby a data decoding apparatus and the method which can control the output of the decoded data on the basis of the data information independent of the decoding of the coded data can be realized.

Further, according to the present invention, in the middle of decoding the coded data recorded in the recording medium, the data information of data to be read is detected and stored in the data information storage means, thereby a data reproduction apparatus which can control the output of the decoded data on the basis of the data information independent of the decoding of the coded data and can reproduce speedily the decoded data can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data reproduction apparatus for decoding coded data which is recorded in a recording medium, said apparatus comprising:

reproduce means for reproducing said coded data from a preceding position of a desired address on said recording medium;

detect means for detecting a sector address of the reproduced data;

compare means for comparing said sector address with said desired address;

store means for storing the comparing result provided by said compare means;

error correction means for error correcting said coded data;

control means for controlling the output of said error corrected data in response to said comparing result; and decode means for decoding the output of said error correction means.

2. The data reproduction apparatus according to claim 1, wherein said coded data include error correction codes which include C1/C2 convolutional Reed-Solomon codes.

3. The data reproduction apparatus according to claim 1, wherein said coded data include error correction codes which include an inner-code added to the coded data in the direction of the rows and an outer-code added to the coded data in the direction of the columns.

4. The data reproduction apparatus according to claim 1, wherein said recording medium is a disc recording medium.

* * * * *